United States Patent
Gupta et al.

(10) Patent No.: US 9,607,058 B1
(45) Date of Patent: Mar. 28, 2017

(54) SYSTEMS AND METHODS FOR MANAGING DOCUMENTS ASSOCIATED WITH ONE OR MORE PATENT APPLICATIONS

(71) Applicant: BlackBox IP Corporation, New York, NY (US)

(72) Inventors: Vivek Gupta, Ghaziabad (IN); Amit Kumar Mohapatro, Greater Noida (IN); Anand Sharma, Delhi (IN); Amit Chauhan, Noida (IN)

(73) Assignee: BlackBox IP Corporation, New York, NY (US)

( * ) Notice: Subject to any disclaimer, the term of this patent is extended or adjusted under 35 U.S.C. 154(b) by 0 days.

(21) Appl. No.: 15/160,751

(22) Filed: May 20, 2016

(51) Int. Cl.
*G06F 17/30* (2006.01)
*H04L 29/08* (2006.01)
*G06K 9/00* (2006.01)
*G06F 3/0482* (2013.01)

(52) U.S. Cl.
CPC ........ *G06F 17/3056* (2013.01); *G06F 3/0482* (2013.01); *G06F 17/30864* (2013.01); *G06K 9/00442* (2013.01); *H04L 67/02* (2013.01); *H04L 67/06* (2013.01); *H04L 67/10* (2013.01); *G06F 2216/11* (2013.01)

(58) Field of Classification Search
CPC ..................... G06F 17/30856; G06F 17/30864
See application file for complete search history.

(56) References Cited

U.S. PATENT DOCUMENTS

| | | | |
|---|---|---|---|
| 7,853,629 B2 | 12/2010 | Duncan et al. | |
| 9,021,345 B2 | 4/2015 | Lukawski et al. | |
| 9,098,888 B1* | 8/2015 | Lin .................... | G06K 9/18 |
| 9,239,958 B2* | 1/2016 | Deng ................ | G06K 9/00711 |
| 9,251,253 B2 | 2/2016 | Brown et al. | |
| 9,311,518 B2* | 4/2016 | Rahmes ............. | G06K 9/00006 |
| 2002/0065677 A1* | 5/2002 | Grainger ............... | G06Q 10/10 705/310 |
| 2002/0072920 A1* | 6/2002 | Grainger ............... | G06Q 10/10 705/310 |
| 2003/0069877 A1* | 4/2003 | Grefenstette ..... | G06F 17/30643 |
| 2004/0044688 A1* | 3/2004 | Brudz .................... | G06Q 10/10 |
| 2005/0038818 A1* | 2/2005 | Hooks ................ | G06F 11/0748 |
| 2006/0218188 A1* | 9/2006 | Duncan ................ | G06Q 10/10 |
| 2007/0003135 A1* | 1/2007 | Mattausch ........... | G06K 9/6272 382/159 |
| 2007/0182540 A1* | 8/2007 | Marman ............. | G06K 9/00362 340/506 |

(Continued)

*Primary Examiner* — Noosha Arjomandi
(74) *Attorney, Agent, or Firm* — Baker & Hostetler LLP

(57) ABSTRACT

The present disclosure relates to systems and methods for managing documents such as a prior art documents and documents for submission to government agencies such as an information disclosure statement (IDS) configured for submission to a patent office. In certain aspects, the system and methods include automatic retrieval of relevant documents, for example using a crawler service over a network such as the Internet. In certain aspects, the systems and methods include automatic optical character recognition and template matching to facilitate the extraction of information relating to certain documents. In certain aspects, the system and methods include a generating interface configured to present information to a generating user and to allow the generating user to select options relating to the citation of references in a particular patent family.

18 Claims, 51 Drawing Sheets

(56) References Cited

U.S. PATENT DOCUMENTS

| | | | | |
|---|---|---|---|---|
| 2007/0294232 | A1* | 12/2007 | Gibbs | G06F 17/30637 |
| 2008/0243787 | A1* | 10/2008 | Stading | G06F 17/30864 |
| 2008/0243837 | A1* | 10/2008 | Davis | G06F 17/30011 |
| 2009/0100041 | A1* | 4/2009 | Wilson | G06F 21/645 |
| 2011/0231449 | A1 | 9/2011 | Ashley et al. | |
| 2012/0240026 | A1 | 9/2012 | Iyer et al. | |
| 2013/0086042 | A1 | 4/2013 | Lundberg | |
| 2013/0086080 | A1 | 4/2013 | Lundberg | |
| 2013/0110804 | A1* | 5/2013 | Davis | G06F 17/30967 707/706 |
| 2013/0290824 | A1* | 10/2013 | Lukawski | G06Q 50/184 715/222 |
| 2014/0067696 | A1 | 3/2014 | Lee et al. | |
| 2014/0278727 | A1 | 9/2014 | Crawford et al. | |
| 2014/0365386 | A1* | 12/2014 | Carstens | G06Q 50/184 705/310 |
| 2015/0206260 | A1* | 7/2015 | Lundberg | G06Q 50/184 705/310 |
| 2016/0042460 | A1* | 2/2016 | Hudak | G06Q 40/06 705/310 |
| 2016/0048936 | A1* | 2/2016 | Perkowski | G06Q 10/063 705/310 |
| 2016/0217212 | A1* | 7/2016 | Won | G06F 17/30864 |

* cited by examiner

| Family Flow Exceptions | | | |
|---|---|---|---|
| Source Application Jurisdiction Application # Attorney Docket # | Destination Application Jurisdiction Application # Attorney Docket # | Last Edit | Status Change Comment |
| | | | |
| | | | |
| | | | |

Showing [10 ▼] Per Page  [1] [2] [3] [4] [5]

*FIG. 10*

| My Dashboard | Reference Management | Reference Flow Rules |

Review Reference Flow Rules
Family ID

| Family Link | Subject Matter Link |

Showing

| Source Application Jurisdiction Application # Attorney Docket # | Destination Application Jurisdiction Application # Attorney Docket # | Status | Status | Status Change Comment |
|---|---|---|---|---|
| ☐ | | | | |
| | | ☐ | | |
| | | ☐ | | |

Delete Family Link

| Family ID | Jurisdiction | Application # | Last IDS Filing Date | Prosecution Status | Reference Count | IDS Prepared By | Comments | Actions |
|---|---|---|---|---|---|---|---|---|
| | | | | | | | | Approve IDS / Do not File |
| | | | | | | | | Approve IDS / Do not File |
| | | | | | | | | Approve IDS / Do not File |
| | | | | | | | | Approve IDS / Do not File |
| | | | | | | | | Approve IDS / Do not File |

My Dashboard | Reference Record | New IDS

List of Records

My Dashboard | Approve IDS

| Information Disclosure STATEMENT BY APPLICANT (Not for submission under 37 CFR 1.99) | Application # | Filing Date | First name Inventor | Attorney Docket # |
|---|---|---|---|---|
| | Art Unit | Examiner Name | | View Reference Record |

4 New References since IDS was prepared

| | Include All | Do Not Include |
|---|---|---|

3714

- US Patent (4) ☐
- US Publication (4) ☐
- Foreign Patents (5) ☐
- NPL (3) ☐

| Examiner Initials | Cite No. | Pages, Columns, Lines... | T | Review Source Document |
|---|---|---|---|---|
| | 17 | | | ☐ ☐ ☐ ☐ |
| | 18 | | | ☐ |
| | 19 | | | ☐ |

| Approve | Request Changes | | Exit | Do Not File |

FIG. 41

| Source Document | | | | |
|---|---|---|---|---|
| Jurisdiction | Application | Document Description | Mailing Date | Reference Entered By |
| ▼ | ▼ | Non-final Rejection ▼ | | |

Source Document

| Jurisdiction | Application | Document Description | Mailing Date | Reference Entered By |
|---|---|---|---|---|
| | ▼ | Non-final Rejection ▼ | | |

OCR - Scanned

Added Reference Entities

US ☐ Review 4 Others
Publication Number    Publication Date

Foreign ☐ Review 4 Others
Jurisdiction    Publication Number    Kind Code

NPL ☐ Review
Examiner Cited

Add New                    ☐ I will do it myself — 4500

Select Reference Type ▼ — 4502

Cancel    Notify the Attorney    Do Not Notify

SYSTEMS AND METHODS FOR MANAGING DOCUMENTS ASSOCIATED WITH ONE OR MORE PATENT APPLICATIONS

BACKGROUND

During the prosecution of patent applications, certain jurisdictions require that an applicant submit documents such as prior art documents to an agency of the jurisdiction. Such submission may include tens or hundreds of prior art documents. The applicant may also be required to cross cite the prior art in related applications. However, this process is tedious and time consuming. Moreover, as patent families grow the risk of human error increases. These and other shortcomings are addressed by the present disclosure.

SUMMARY

The present disclosure relates to systems and methods for managing documents such as a prior art documents and documents for submission to government agencies such as an information disclosure statement (IDS) configured for submission to a patent office. In certain aspects, the system and methods include automatic retrieval of relevant documents, for example using a crawler service over a network such as the Internet. In certain aspects, the systems and methods include automatic optical character recognition and template matching to facilitate the extraction of information relating to certain documents. In certain aspects, the system and methods include a generating interface configured to present information to a generating user and to allow the generating user to select options relating to the citation of references in a particular patent family. The generating interface may facilitate the selection and/or modification of reference flow rules that control the cross citation of reference within or outside a patent family. A review interface may be presented to allow a reviewing user to review the generated forms and to approve or modify before submission to the agency.

In one aspect, a method of managing documents associated with one or more patent applications comprises: associating a first database record and a second database record with a patent family identifier, wherein the first database record corresponds to a first patent application and the second database record corresponds to a second patent application; retrieving a reference from a patent data resource using a crawler service based on one or more of the patent family identifier, the first patent application, and the second patent application; based on a determination that automatic text extraction is applicable to the reference, generating an optical character recognition (OCR) version of the reference; based on a determination that the OCR version of the reference meets or exceeds a confidence level threshold, matching the OCR version of the reference to a template; extracting data from the OCR version of the reference; validating the extracted data; populating a plurality of input fields of an information disclosure statement (IDS) form using at least the validated extracted data, wherein at least one of the plurality of input fields includes descriptive data corresponding to the reference; presenting an IDS generating interface to a generating user, the IDS generating interface comprising a representation of the populated IDS form and a reference flow rule option configured to allow the generating user to modify a reference flow rule associated with the patent family identifier, wherein the reference flow rule is configured to control a cross citation of the reference between database records; receiving a selection of the reference flow rule option via the IDS generating interface; presenting an IDS review interface to a reviewing user, the IDS review interface comprising a representation of a review version of the populated IDS form and a representation of the reference; presenting a set of selectable options to the reviewing user, wherein the set of selectable options includes an approve option and a do not file option; receiving, via the IDS review interface, a selection of the approve option; and notifying the generating user that the IDS form is ready to be filed.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 10 is a diagram of an example interface according to aspects of the present disclosure.

FIG. 12 is a diagram of an example interface according to aspects of the present disclosure.

FIG. 21 is a diagram of an example interface according to aspects of the present disclosure.

FIG. 24 is a diagram of an example interface according to aspects of the present disclosure.

FIG. 25 is a diagram of an example interface according to aspects of the present disclosure.

Figure 30:
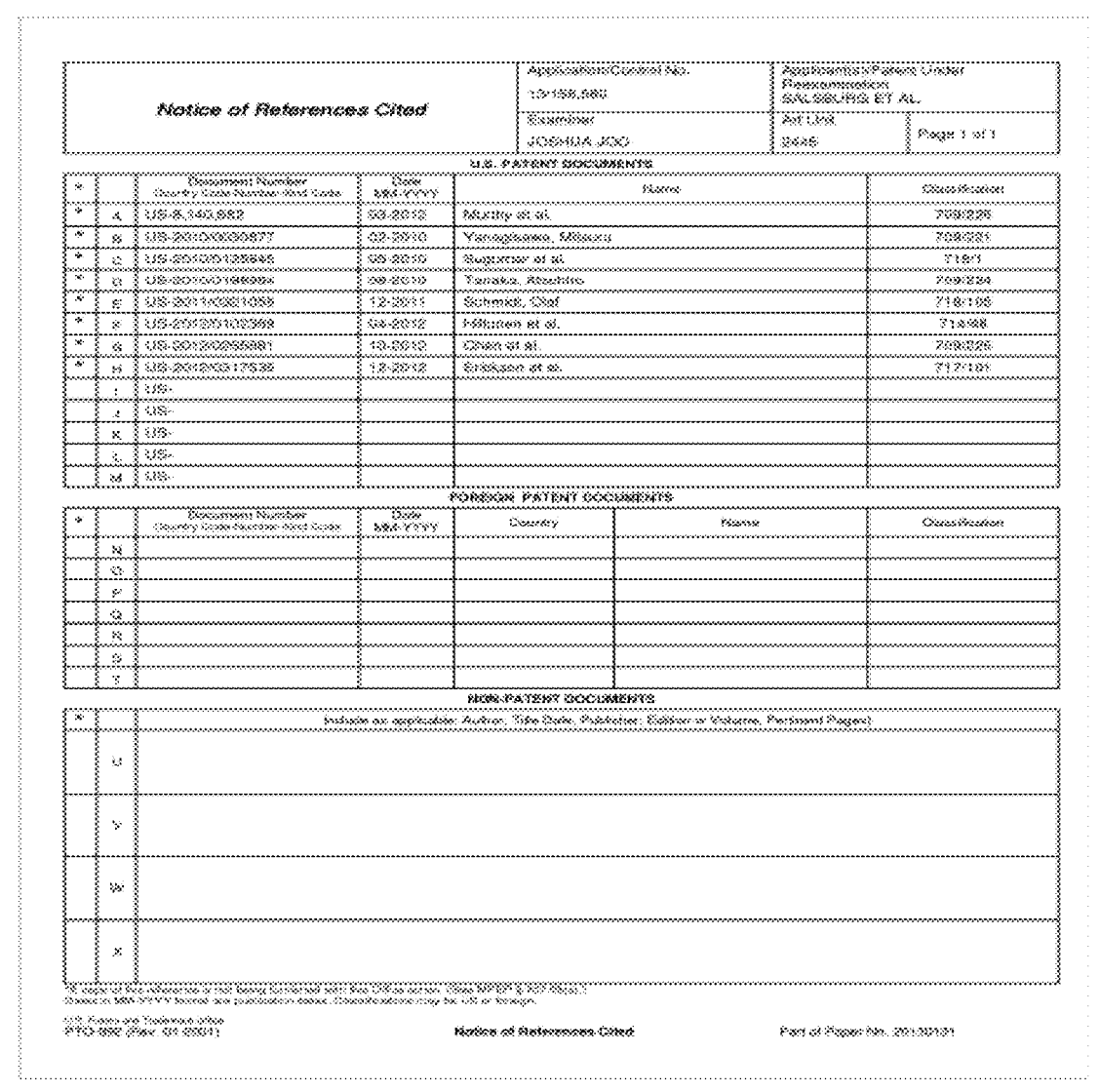

FIG. 30 is a diagram of an example interface according to aspects of the present disclosure.

FIG. 36 is a schematic diagram of an example data flow according to aspects of the present disclosure.

FIG. 37 is a schematic diagram of an example data flow according to aspects of the present disclosure.

FIG. 38 is a schematic diagram of an example data flow according to aspects of the present disclosure.

FIG. 39 is a schematic diagram of an example data flow according to aspects of the present disclosure.

FIG. 40 is a schematic diagram of an example data flow according to aspects of the present disclosure.

FIG. 41 is a schematic diagram of an example data flow according to aspects of the present disclosure.

FIG. 44 is a schematic diagram of an example data flow according to aspects of the present disclosure.

FIG. 45 is a schematic diagram of an example data flow according to aspects of the present disclosure.

FIG. 49 is a schematic diagram of an example data flow according to aspects of the present disclosure.

FIG. 50 is a schematic diagram of an example data flow according to aspects of the present disclosure.

DETAILED DESCRIPTION

The present disclosure relates to systems and methods for managing documents such as a prior art documents and documents for submission to government agencies such as an information disclosure statement (IDS) configured for submission to a patent office. In certain aspects, the system and methods include automatic retrieval of relevant documents, for example using a crawler service over a network such as the Internet. In certain aspects, the systems and methods include automatic optical character recognition and template matching to facilitate the extraction of information relating to certain documents. In certain aspects, the system and methods include a generating interface configured to present information to a generating user and to allow the generating user to select options relating to the citation of references in a particular patent family. The generating interface may facilitate the selection and/or modification of reference flow rules that control the cross citation of reference within or outside a patent family. A review interface may be presented to allow a reviewing user to review the generated forms and to approve or modify before submission to the agency.

Figure 1:
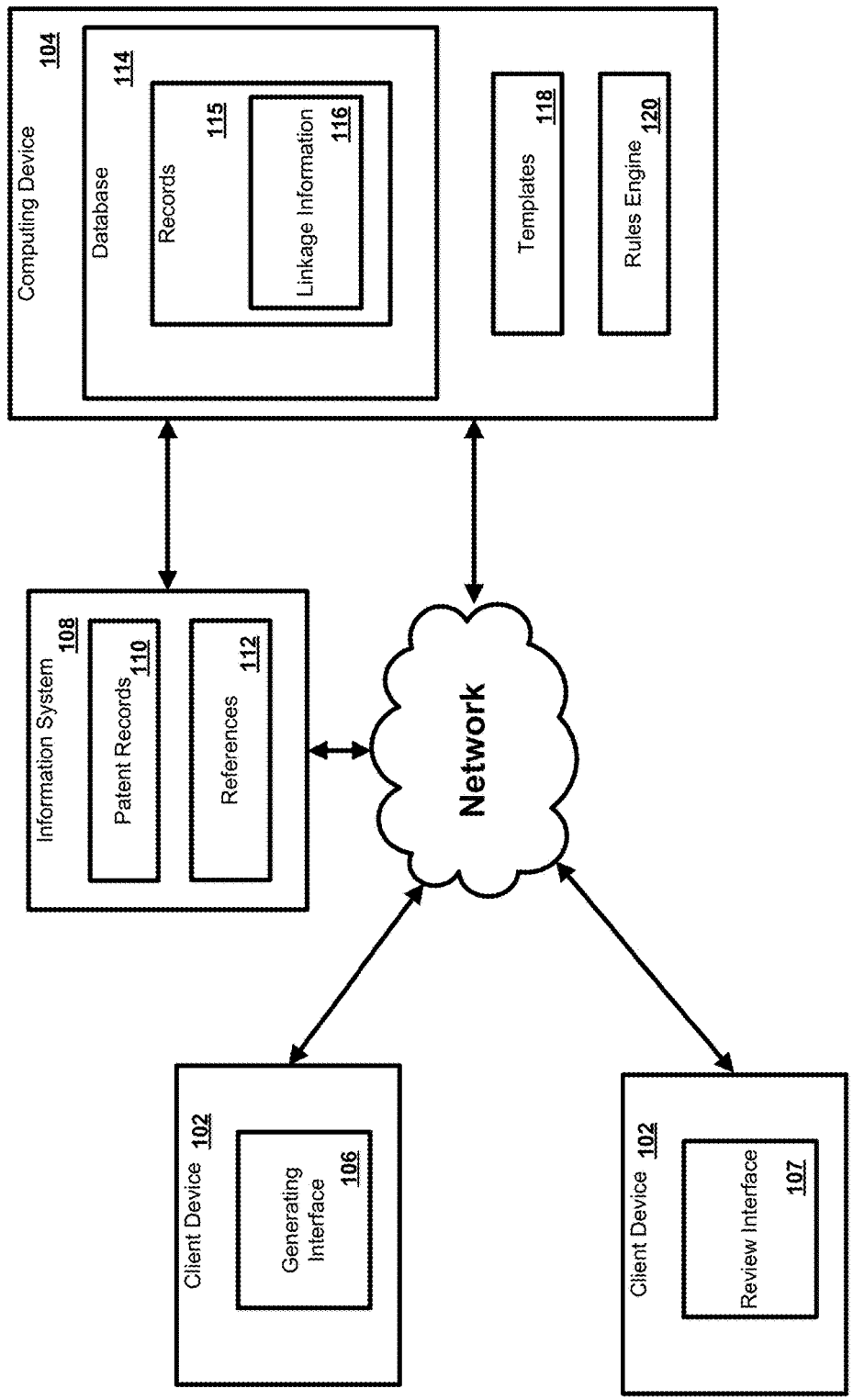
FIG. 1 is a schematic diagram of an example system according to aspects of the present disclosure.

FIG. 1 illustrates various aspects of an exemplary network in which the present methods and systems can operate. The present disclosure relates to systems and methods for managing documents such as a prior art documents and documents for submission to government agencies such as an information disclosure statement (IDS) configured for submission to a patent office. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise one or more client devices 102 in communication (e.g., directly and/or via a network) with a computing device 104 such as a server, for example. The computing device 104 can be disposed locally or remotely relative to the client device 102. As an example, the client device 102 and the computing device 104 can be in communication via a private or public network such as the Internet. Other forms of communications can be used such as wired and wireless telecommunication channels, for example.

The client devices 102 can be an electronic device such as a computer, a server, a smartphone, a laptop, a tablet, or other device capable of communicating with the computing device 104. As an example, the client devices 102 can comprise a web browser for providing an interface to a user to interact with the client devices 102 and/or the computing device 104. The web browser can be any interface for presenting information to the user and receiving a user feedback such as Internet Explorer, Mozilla Firefox, Google Chrome, Safari, or the like. Other software, hardware, and/or interfaces can be used to provide communication between the user and one or more of the client devices 102 and the computing device 104. As an example, the web browser can request or query various files from a local source and/or a remote source. As a further example, the client devices 102 can be configured to transmit data to the computing device 104. Other devices and interfaces can be used to allow a user to intercommunicate with the computing device 104. In certain aspects, software may be executed locally on a device to facilitate the disclosed methods.

One or more of the client devices 102 may comprise a generating interface. The generating interface such as an IDS generating interface may be presented to a user such as a generating user (e.g., paralegal, IDS specialist, attorney, staff, or other user) to facilitate the generation of certain forms (e.g., IDS form). The IDS generating interface may comprise a representation of a populated IDS form and a reference flow rule option configured to allow the generating user to modify a reference flow rule associated with the patent family identifier. In certain aspects, the reference flow rule is configured to control a cross citation of the reference between database records.

One or more of the client devices 102 may comprise a review interface such as an IDS review interface. The IDS review interface may be presented to a user such as a reviewing user to facilitate the review of certain forms (e.g., IDS form). The IDS review interface may comprise a representation of a review version of the populated IDS form and a representation of the reference. The review version of the IDS form may include a water mark and may include additional measure to indicate the version is not intended to be filed without review. The IDS review interface may include a set of selectable options presented to the reviewing user. The set of selectable options may include an approve option and a do not file option, for example.

The client device 102 can be configured to communicate (e.g., directly and/or via a network) with an information system 108 (e.g. patent information resource, United States Patent and Trademark Office (USPTO) PAIR system, patent data system, government database, etc.). As an example, the information system 108 can comprise a database. As a further example, the information system 108 can comprise hardware (e.g., terminal) and or software components for storing and/or processing. The information system 108 can comprise patent records 110 including data relating to patents, patent applications, and references 112 such as prior art documents. Other data can be stored and processed by the information system 108. As an example, the information system 108 can be located remotely from the client device 102. As a further example, the information system 108 can be integrated with the client device 102 or in communication with the client device over a local network.

The computing device 104 can be a server for communicating with the client device 102. As an example, the computing device 104 can be configured to receive message requests (e.g., diagnostic messages) from another device such as the client device 102. The computing device 104 can be configured to process the message request and generate/transmit a message in response to the request. As a further example, the computing device 104 can manage the intercommunication between the client device 102 and a database 114 for sending and receiving data therebetween. The database 114 can store a plurality of files (e.g. web pages). As an example, the client device 102 can request a file from the database 114. As a further example, the client device 102 can retrieve a file from the database 114.

The database 114 can store a plurality of records 115. As an example, one or more of the records 115 can comprise information such as patent family identifier, jurisdiction associated with a patent application, application number associated with a patent application, attorney docket number associated with a patent application, and filing date associated with a patent application. One or more of the records 115 may include linkage information 116 relating to associations between records such as a parent-child, child-parent, foreign priority chain, and/or subject matter linkages.

One or more templates 118 such as patent document templates can be retrieved by the computing device 104 (e.g., stored in the database 114 or in other storage devices/media). As an example one or more templates 118 can comprise a pre-defined layout of a plurality of information fields. As a further example, each of the templates 118 can comprise a plurality of information fields. The templates 118 may include office actions from a government agency, search reports, written opinions, formal communications from government agencies, prior art publications and forms, etc.

The computing device 104 can comprise a rules engine 120 for applying one or more rules/filter/instructions/settings to the references that are processed by the systems and methods of the present disclosure. As an example, the rules engine 122 may be configured to execute rules such as a reference flow rule configured to control a cross citation of the reference between database records. As an example, the reference flow rule comprises the patent family identifier, a count of family members, a count of records related by subject matter, and an action. The action may comprise a change status and a change status comment option.

In one embodiment, a method of managing documents comprises: associating a first database record and a second database record with a patent family identifier, wherein the first database record corresponds to a first patent application and the second database record corresponds to a second patent application; retrieving a reference from a patent data resource (e.g., information system 108) using a crawler service based on one or more of the patent family identifier, the first patent application, and the second patent application; based on a determination that automatic text extraction is applicable to the reference, generating an optical character recognition (OCR) version of the reference; based on a determination that the OCR version of the reference meets or exceeds a confidence level threshold, matching the OCR version of the reference to a template; extracting data from the OCR version of the reference; validate the extracted data; populating a plurality of input fields of an information disclosure statement (IDS) form using at least the validated extracted data, wherein at least one of the plurality of input fields includes descriptive data corresponding to the reference; presenting an IDS generating interface to a generating user, the IDS generating interface comprising a representation of the populated IDS form and a reference flow rule option configured to allow the generating user to modify a reference flow rule associated with the patent family identifier, wherein the reference flow rule is configured to control a cross citation of the reference between database records; receiving a selection of the reference flow rule option via the IDS generating interface; presenting an IDS review interface to a reviewing user, the IDS review interface comprising a representation of a review version of the populated IDS form and a representation of the reference; presenting a set of selectable options to the reviewing user, wherein the set of selectable options includes an approve option and a do not file option; receiving, via the IDS review interface, a selection of the approve option; and notifying the generating user that the IDS form is ready to be filed.

In one embodiment, a method of managing documents comprises: associating a first database record and a second database record with a patent family identifier, wherein the first database record corresponds to a first patent application and the second database record corresponds to a second patent application; retrieving a reference from a patent data resource using a crawler service based on one or more of the patent family identifier, the first patent application, and the second patent application; based on a determination that automatic text extraction is applicable to the reference, generating an optical character recognition (OCR) version of the reference; based on a determination that the OCR version of the reference meets or exceeds a confidence level threshold, matching the OCR version of the reference to a template; extracting data from the OCR version of the reference; validate the extracted data; populating a plurality of input fields of an information disclosure statement (IDS) form using at least the validated extracted data, wherein at least one of the plurality of input fields includes descriptive data corresponding to the reference; presenting an IDS review interface to a reviewing user, the IDS review interface comprising a representation of a review version of the populated IDS form and a representation of the reference indicating a new reference; and presenting a set of selectable new reference options to the reviewing user, wherein the set of selectable new reference options comprise: a self-citation option; an include option; a do not include option; and a do not file option.

In one embodiment, a method of managing documents comprises: associating a first database record and a second database record with a patent family identifier, wherein the first database record corresponds to a first patent application and the second database record corresponds to a second patent application; retrieving a reference from a patent data resource using a crawler service based on one or more of the patent family identifier, the first patent application, and the second patent application; based on a determination that automatic text extraction is applicable to the reference, generating an optical character recognition (OCR) version of the reference; based on a determination that the OCR version of the reference meets or exceeds a confidence level threshold, matching the OCR version of the reference to a template; extracting data from the OCR version of the reference; populating a plurality of input fields of an information disclosure statement (IDS) form using at least the validated extracted data, wherein at least one of the plurality of input fields includes descriptive data corresponding to the reference; presenting an IDS generating interface to a generating user, the IDS generating interface comprising a representation of the populated IDS form and a reference flow rule option configured to allow the generating user to modify a reference flow rule associated with the patent family identifier, wherein the reference flow rule is configured to control a cross citation of the reference between database records, the reference flow rule comprising the patent family identifier, a count of family members, a count of records related by subject matter, and an action option including a change status and a change status comment option; receiving a selection of the reference flow rule option via the IDS generating interface; presenting an IDS review interface to a reviewing user, the IDS review interface comprising a representation of a review version of the populated IDS form and a representation of the reference; presenting a set of selectable options to the reviewing user, wherein the set of selectable options includes an approve option and a do not file option; receiving, via the IDS review interface, a selection of the approve option; and notifying the generating user that the IDS form is ready to be filed.

In certain embodiments, the associating a first database record and a second database record with a patent family identifier comprise a linkage type of: a parent linkage; a child linkage; or a foreign priority linkage.

In certain embodiments, the validating the data extracted from the OCR version of the reference comprises determining that the OCR version of the reference is not a duplicate of information already cited in the IDS form. In certain embodiments, the determining that the OCR version of the reference is not a duplicate of information already cited in the IDS form comprises: identifying a superset/subset relationship or a not equal relationship; and comparing the superset/subset relationship or the not equal relationship to a predetermined matching threshold.

In certain embodiments, the IDS generating interface indicates the patent family identifier, jurisdiction associated with the first patent application, application number associated with the first patent application, attorney docket number associated with the first patent application, and filing date associated with the first patent application.

In certain embodiments, the IDS generating interface comprises menu options including download, search, cited in IDS tab, uncited tab, examiner cited tab, cited in parent tab, do not file tab, and deleted tab.

In certain embodiments, the IDS review interface indicates the patent family identifier, jurisdiction associated with the first patent application, application number associated with the first patent application, last IDS filing date; prosecution status associated with the first patent application, reference count, and an identifier associated with the generating user IDS.

Figure 2:
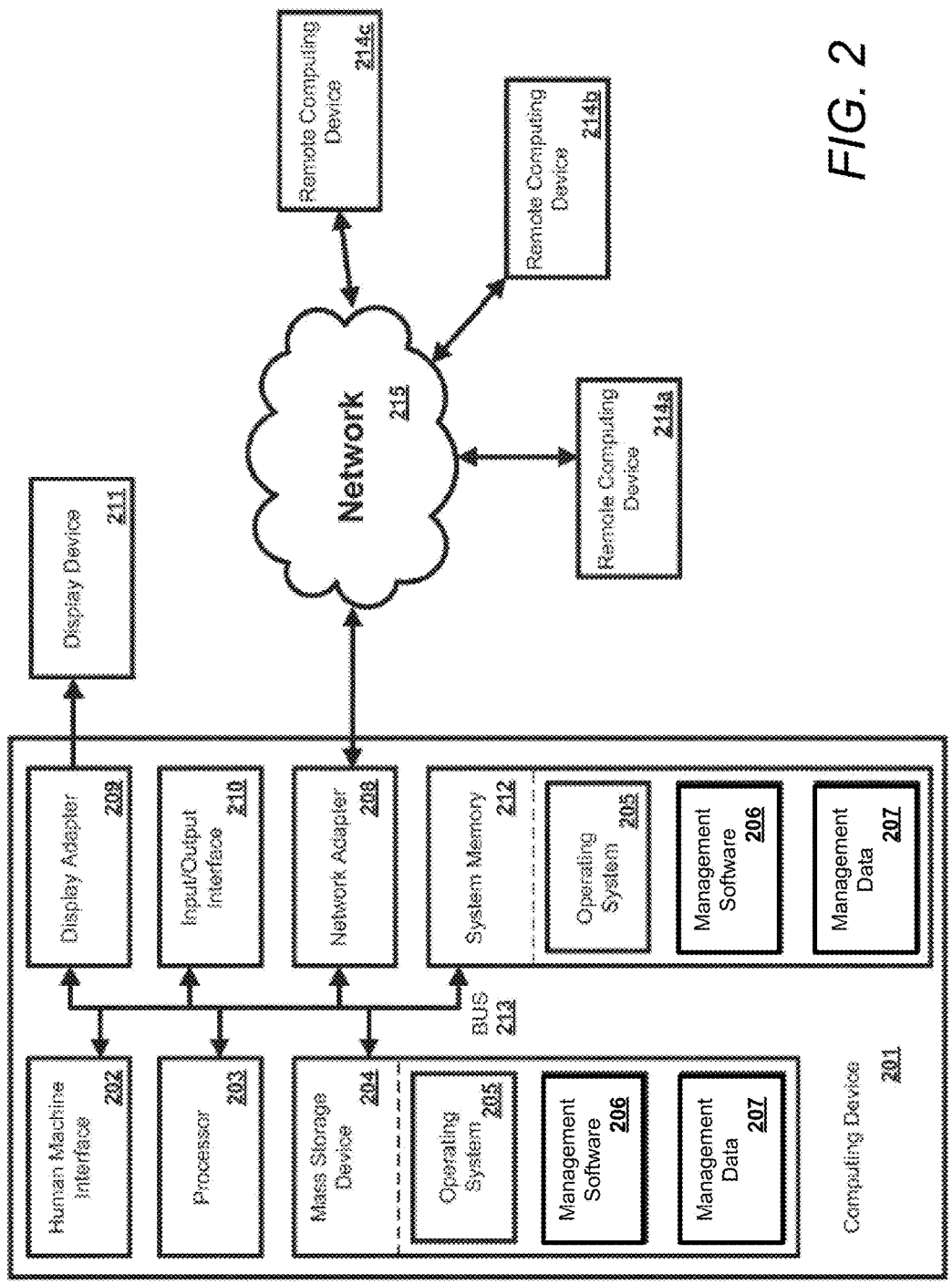
FIG. 2 is a schematic diagram of an example system according to aspects of the present disclosure.

In an exemplary aspect, the methods and systems can be implemented on a computing system such as computing device 201 as illustrated in FIG. 2 and described below. By way of example, one or more of the client device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, management software 206, management data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as management data 207 and/or program modules such as operating system 205 and management software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and management software 206. Each of the operating system 205 and management software 206 (or some combination thereof) can comprise elements of the programming and the management software 206. Management data 207 can also be stored on the mass storage device 104. Management data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like.

The computer 201 can operate in a networked environment using logical connections to one or more remote computing devices 214a,b,c. By way of example, a remote computing device can be a personal computer, portable computer, a server, a router, a network computer, a peer device or other common network node, and so on. Logical connections between the computer 201 and a remote computing device 214a,b,c can be made via a local area network (LAN) and a general wide area network (WAN). Such network connections can be through a network adapter 208. A network adapter 208 can be implemented in both wired and wireless environments. Such networking environments are conventional and commonplace in offices, enterprise-wide computer networks, intranets, and the Internet 215.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of management software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Examples

Figure 3:
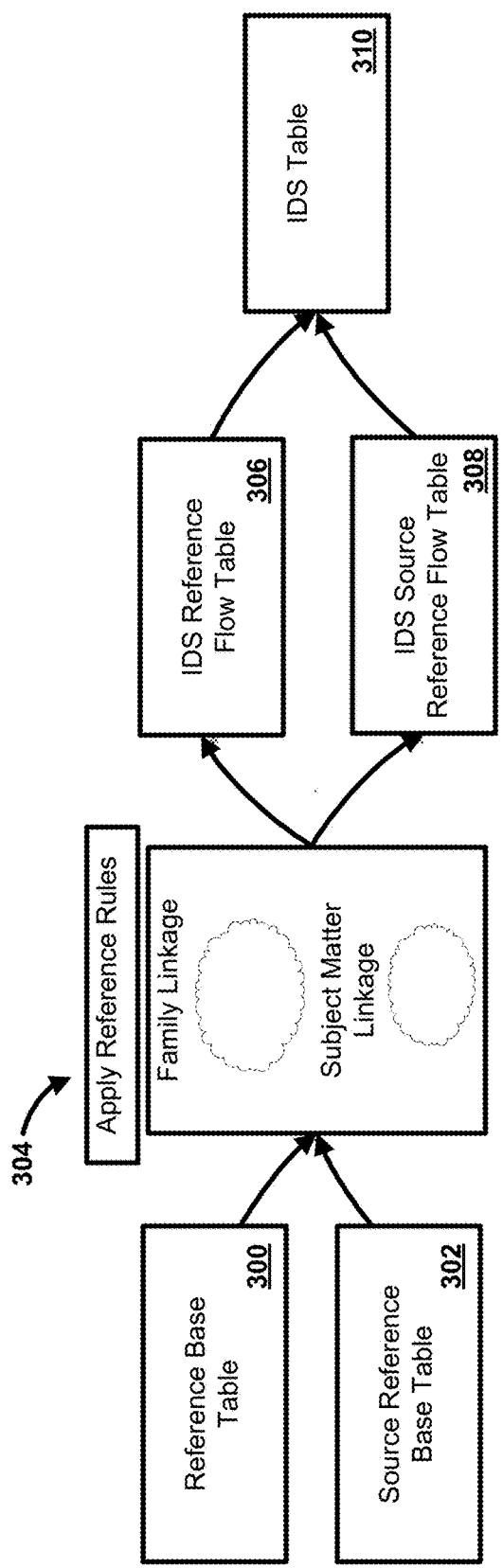
FIG. 3 is a schematic diagram of an example data flow according to aspects of the present disclosure.

FIG. 3 illustrates an example architecture and data flow in accordance with aspects of the present disclosure. It is understood that certain examples may be shown in capital letters; however, such a reference is only intended as an example is not meant to be construed as a formal term or to limit the scope of such a term if written in lower case. As shown, a reference base table 300 and a source reference base table 302 may represent the workflow for references that are to be processed in accordance with the present disclosure. As illustrated, reference rules may be applied at 304 and may include family linkages and subject matter linkages, as will be described in further detail below. Various reference rules may be applied and may control the relationship between reference documents having relationships with various patent applications and application families. An IDS reference flow table 306 and an IDS source reference flow table 308 may represent the workflow for linked references being processed for inclusion in an IDS document or record. The IDS table 310 may represent the workflow for the generation (e.g., populating the IDS) for storage and or submission to an agency such as a patent office. Each of the tables 300, 302, 306, 308, 310 represented in FIG. 3 may be linked via workflow, as will describe din further detail below.

Figure 4:
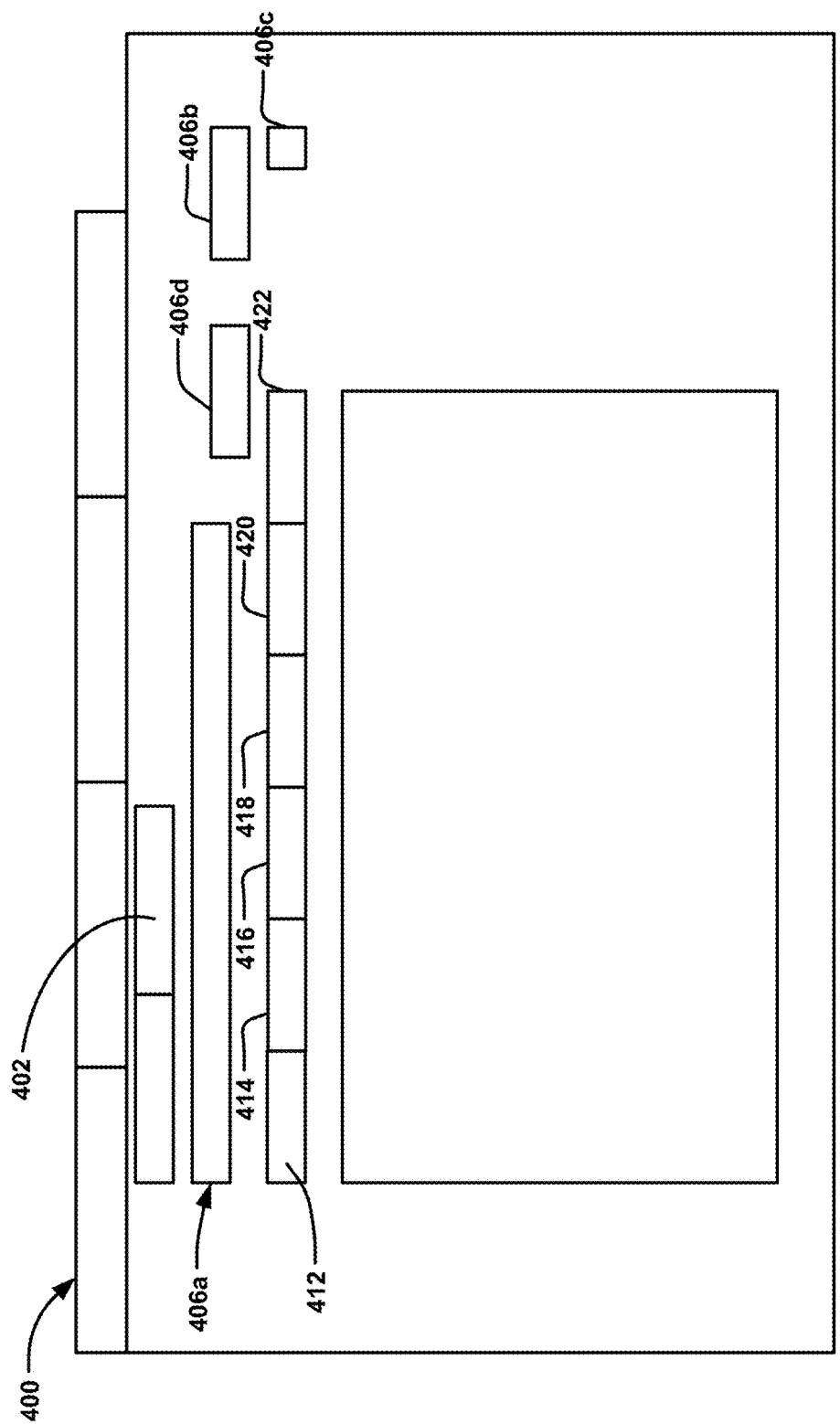
FIG. 4 is a schematic diagram of an example interface according to aspects of the present disclosure.

FIG. 4 illustrates a user interface 400 illustrating a reference record tab 402. A reference record may be associated with a prior art reference such as a document (e.g., source document). Various menu tabs may be included in the user interface 400, engagement of which may facilitate display of certain options and information.

The reference record tab 402 may be engaged to display an IDS view page 404, from where the user can review information associated with a filed IDS. As an example, the view page 404 may be rendered in four sections: header 406, download 406b, search 406c, and view reference flow rule 406d.

The header 406a may be configured to include the following details: Family ID, Jurisdiction, Application #, Attorney Docket #, and Filing Date. Other information may be included in the header and may be hyperlinked to other interface elements and menus. As an example, the Family ID may be hyperlinked such that when the user engages the Family ID, a pop-up may be presented. Family members that are linked to the Family ID may be displayed. For each related application, the jurisdiction and application number may be displayed. If the user intends to view the IDS records of any other family member, the user can engage a "select" option and a new version of the IDS view page 404 will be displayed relating to the selected family member.

The download option 406b may be engaged to initiate a download of the entire reference record (e.g., including all status & sub-status & associated fields) for the jurisdiction and application number for which the reference record 402 is open. When the user clicks on download 406b, a download progress indicator may be displayed to show the progress.

Figure 5:
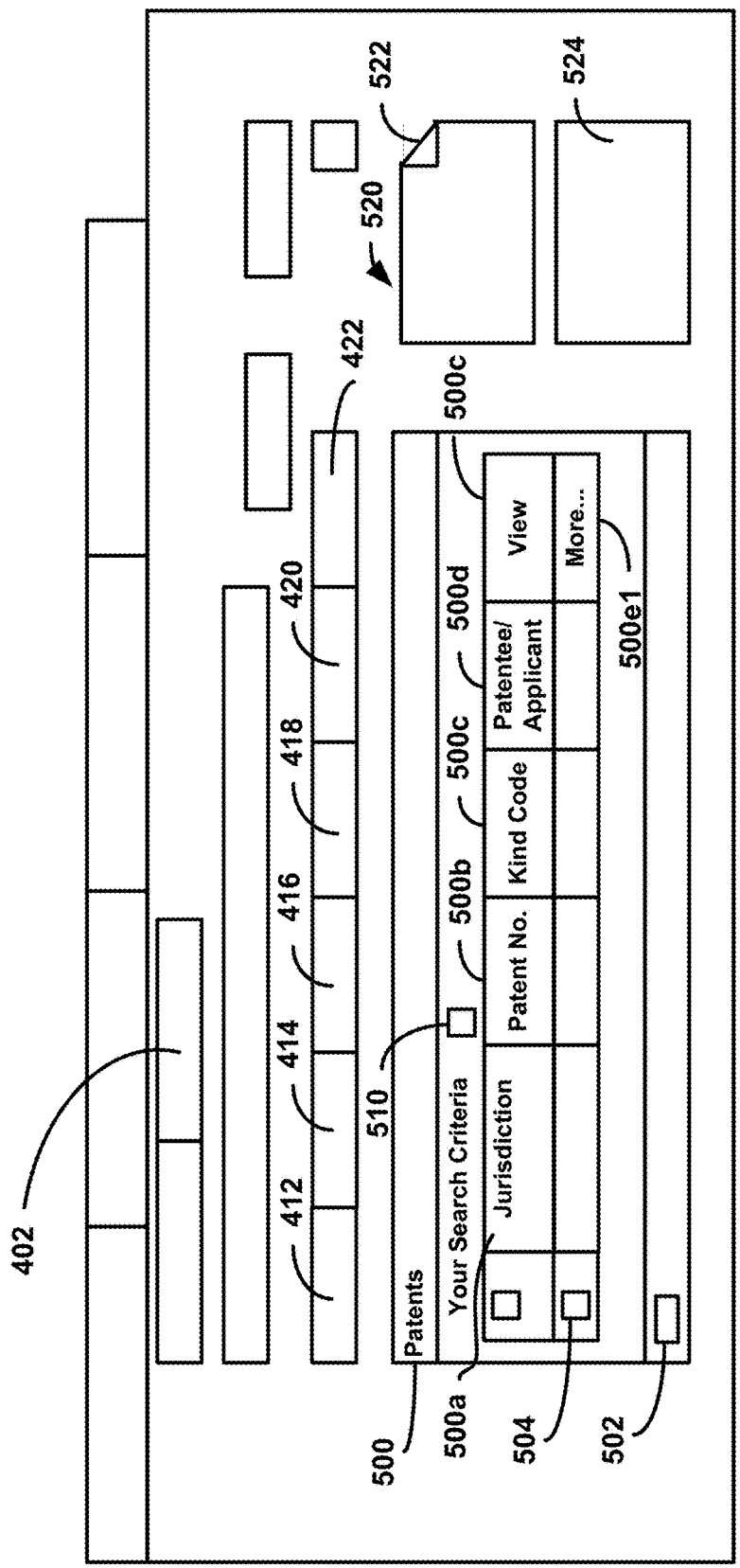
FIG. 5 is a diagram of an example interface according to aspects of the present disclosure.

The search option 406c may be engaged to initiate a search dialogue. As an example, a pop-up window may be displayed to enable a user to input a search for a reference. As a further example, the user may input a reference type. Based on the received inputs, the system may conduct a search for the reference in an entire reference record (across different status and sub-status). If the search reference is found, the pop-up may close and the system may open a relevant tab to display search references and other associated information, for example, as illustrated in FIG. 5. If the reference does not exist, the system should show an appropriate message on the screen.

With reference to FIG. 4, any of a cited tab 412, an uncited tab 414, an examiner cited tab 416, a cited in parent tab 418, do not file tab 420, and a deleted tab 422 may be engaged to display information relating to references grouped into categories corresponding to the above mentioned tabs. As noted above, FIG. 5 illustrates a tab that is opened as a result of a reference being found through a search request, and in particular, a reference that has been found in the uncited tab 414. For each respective tab, the same information may be displayed for the respective tab when engaged or accessed as a result of a search using the search option 406c.

With reference to FIG. 5, where the uncited tab 414 is engaged or displayed as a result of a search request, a resulting display/user interface 400 may provide expandable sections (e.g. accordion widgets) including a patent section 500 and a non-patent literature (NPL) section 502. References having a sub-status of CITED IN PARENT or DO NOT FILE flag checked will not be listed in the expandable sections for the uncited tab 414. A total count of references falling into each reference category (e.g. patents, NPL references, application publications) may be displayed next to each category as illustrated in FIG. 5.

A list of fields, each of which may be engaged to sort a group of references within a given reference category, is displayed below the reference category of the respective reference section 500, 502. The list of fields for the uncited tab 414 for the patent reference section 500 may include, for example, jurisdiction 500*a*, patent no. 500*b*, kind code 500*c*, patentee/applicant 500*d*, and view 500*e*, as illustrated in FIG. 5. For each reference listed in any reference section 500, 502 a more link 500*e*1 may be provided under the view 500*e* field. Engaging the more link 500*e*1 may result in a pop-up (not shown) being displayed including links for a name corresponding to a name of an individual or entity that entered the particular reference ("Reference Entered By"), a comments link, and an open PDF link to open a PDF document.

With respect engaging the more link 500*e*1 for the patent reference section 500 for the uncited tab 414, subsequent engaging of the comments link or the open PDF link will open respective content in a form that can be edited by a user. In particular, with respect to the comments link, a comment box or indication may be displayed. A user may edit the comments using the comment box and save the new comments using a save tab. The open PDF link may only be available (or otherwise greyed out) for foreign patents. If a PDF file is not available, an Add PDF link will be displayed for the user to engage and edit by adding a PDF file.

The list of fields for the NPL reference section 502 for the uncited tab 414 may include an NPL field (not shown) corresponding to a text string for each reference which may include a title (e.g. website, or book, article, or publication title, etc.) or type of non-patent literature (e.g. advertisement, trade magazine, textbook) of a given reference, and a view field (not shown) similar to the view field 500*e* of the patent reference section 500. The view field of the NPL reference section 502 may include a more link similar to the more link 500*e*1, for which engagement may result in a pop-up (not shown) being displayed including links for a name corresponding to a name of an individual or entity that entered the particular reference ("Reference Entered By"), a comments link, and an open PDF link to open a PDF document. Subsequent engaging of the comments link or the open PDF link will open respective content in a form that can be edited by a user.

Figure 6:
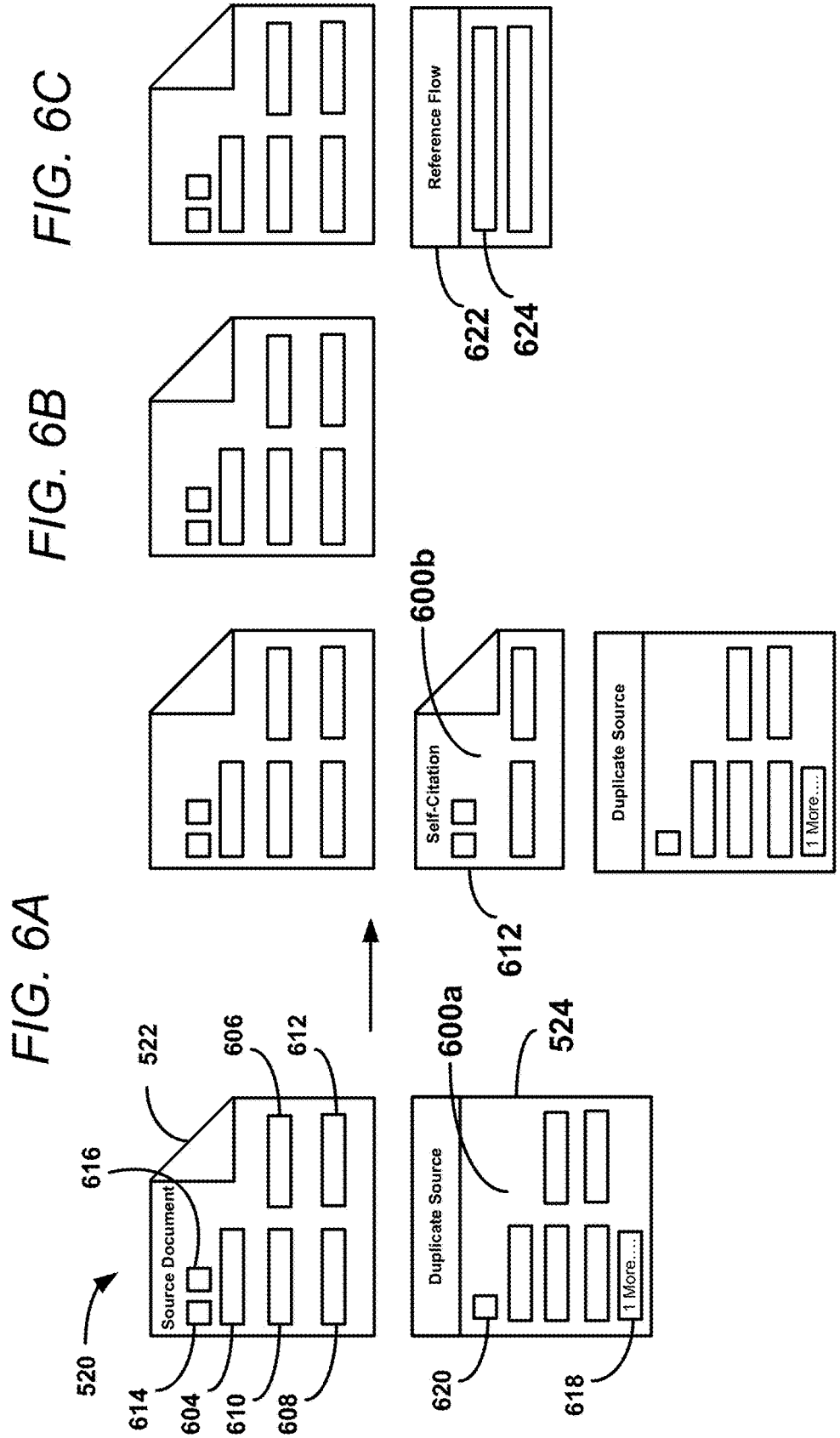
FIGS. 6A, 6B, and 6C are diagrams of an example interface according to aspects of the present disclosure.

For the Uncited tab 414, where a creation of an IDS is in progress, uncited references which have a temporary IDS ID may be indicated by an asterisk (*) or other symbol before the patent number in the patent reference section 500 or the NPL text string in the NPL reference section 502. These references may not be able to be selected for a 'Do Not File' action discussed in more detail below.

Where the patent reference section 500 is expanded, a source document module 520 may open including information with respect to a reference in the patent reference section 500. The source document module 520 will include a source document box 522 and a bottom box 524. The source document box 522 will display a source document 600 as illustrated in FIG. 6A corresponding to a selected patent (i.e. a patent for which a check box 504 has been filled) in the patent reference section 500. If no patent is selected, the source document module 520 will show the source document 600 in the source document box 522 for a reference in a 1st row of the patent reference section 500. Any duplicate source 600*a* for the source document 600 will be displayed in the bottom box 524 by default. When the user selects a reference by engaging a respective checkbox 524, a source of the document may open in the source document module 520. As illustrated with a version of the source document module 520 to the right of an arrow in FIG. 6A, a self-citation box 602 will show-up when the source of a reference is a self-citation 600*b*. For any highlighted cited reference, the bottom box 524 will show its associated source document.

Figure 7:
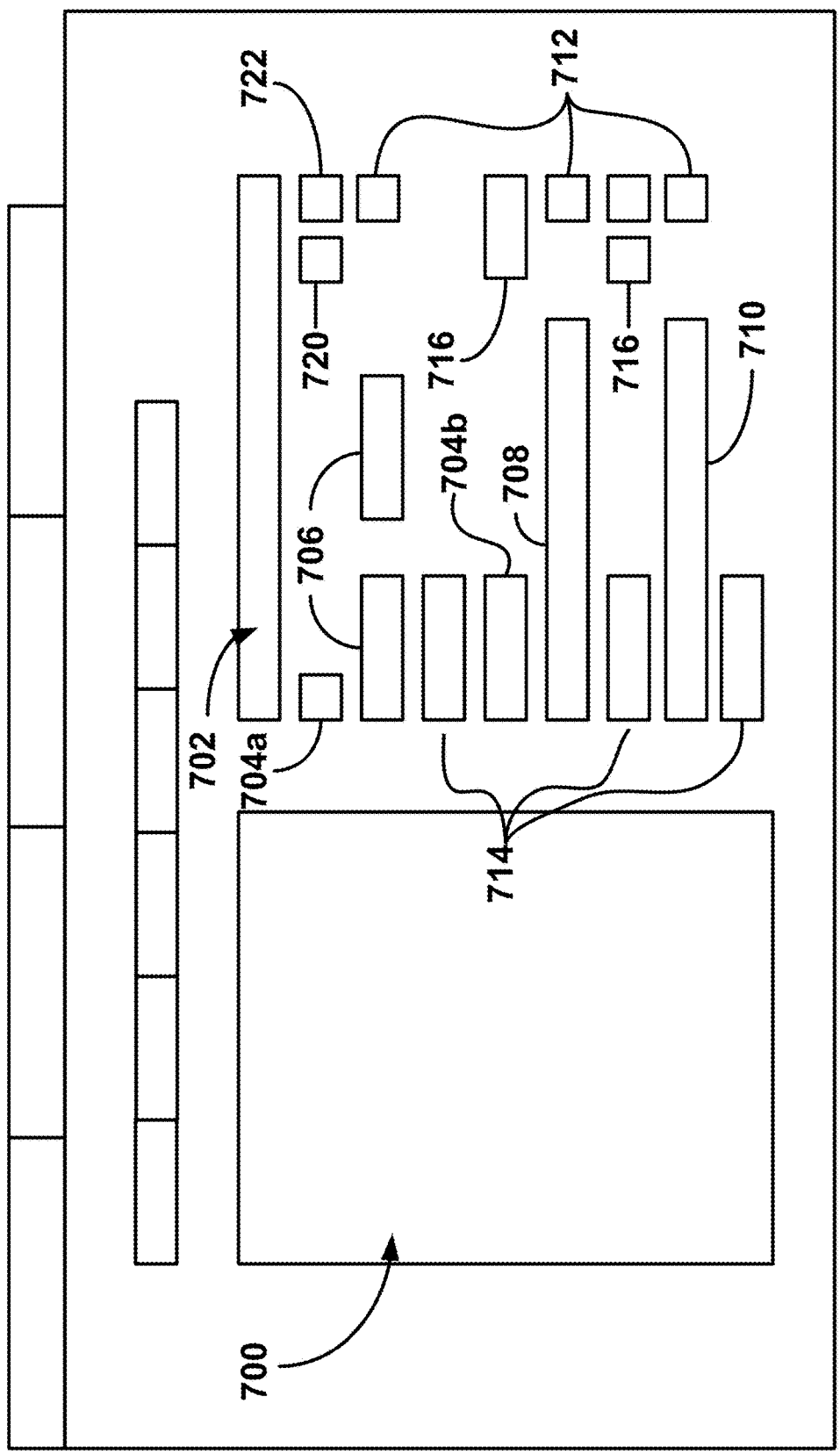
FIG. 7 is a diagram of an example interface according to aspects of the present disclosure.

The source document box 522 may include information categorized in fields including document description 604, family ID 606, mailing date 610, application #612, and include an attachment clip 614 and an edit references icon 616. Engagement of the attachment clip 614 may result in a PDF of the source document 600 opening in a separate window. Engagement of the edit references icon 616 may result in a separate window, as illustrated in FIG. 7, opening which displays an associated reference 700 for the source document 600 and permits access to all associated references of the source document 600.

A reference details page 702 may be displayed next to the associated reference 700 and include reference type sections such a US reference type section 704*a*, a foreign reference type section 704*b*, and an NPL reference type section 704*c*. Reference information 706 for references in the US reference type section 704*a* may include Publication Number and publication date, and reference information 708 for each reference in the foreign reference type section 704*b* may include jurisdiction, Publication Number, and publication date. Regarding the NPL reference type section 704*c*, an NPL text string 710 may include a title (e.g. website, or book, article, or publication title, etc.) or type of non-patent literature (e.g. advertisement, trade magazine, textbook) of a given reference.

A user may engage a more link 714 in any of the reference type sections 704*a*, 704*b*, 704*c* to access additional information regarding a particular associated reference. The US reference type section 704*a* may expand to display other fields such as a kind code and a comments link.

The comments link of the expanded US reference type section 704*b* may be engaged to allow a user to access content that may be edited. The foreign reference type section 704*b* may expand to display other fields such as a kind code, a comments link, a translation link, and a PDF link. The comments, translation, and PDF links of the expanded foreign reference type section 704*b* may be engaged to allow a user access to respective content that may be edited. The NPL reference type section 704*c* may expand to display other fields such as a translation link and a PDF link. Each of the links of the expanded NPL reference type section 704*c* may be engaged to allow a user access to respective content that may be edited.

For each reference in each reference type section 704*a*, 704*b*, 704*c*, a reference linkage table status 712 with respect to a jurisdiction and application for which an IDS is being prepared may be displayed and selectable. The different status types of the reference linkage table status 712 may include IDS in progress, cited in IDS, examiner cited, do not file, deleted, cited in parent, and uncited. The reference linkage table status 712 may be IDS in progress status when an associated reference has temp IDS ID attached to it.

The reference linkage table status of cited in IDS may include a <date> (date format: May 10, 2015) that is hyperlinked to an IDS drill down which may be engaged to open an IDS against the IDS filing date in an IDS table and display the related reference selected with respective source details open on the right. For each of the examiner cited, deleted, cited in parent, and uncited reference linkage table statuses, a text string hyperlinked to a reference record of a jurisdiction and publication number for which an IDS is being prepared may be included. According to an aspect of the present disclosure, a respective text string will open a reference record 402 to the applicable examiner cited tab 416, deleted tab 422, cited in parent tab 418, or uncited tab 414, and the system will show the checkbox 504 related to the reference having the reference linkage table status as selected, with respective source details shown in the source document module 520.

Review flags indicating whether a reference has been reviewed by a user previously may be displayed in the reference details page 702. The review flags may come from the reference base table 300 as opposed to a reference linkage table. A reference that has been previously reviewed ONLY by a current user of the user interface 400 will indicate the same with a check icon 718 such as a "thumbs up" icon or other graphical display. If the reference has been previously reviewed by a current user and other users, the check icon will indicate the number of reviews as listed adjacent the check icon 718, for example, the terms "me, 3 others" may be displayed adjacent the check icon 718 to indicate that a current user and three others have reviewed the reference.

A current user may hover over the check icon and a pop-up showing the names of the other reviewers may be displayed. A reference that has not been previously reviewed by the user (but has been reviewed by other users) may have a review by other icon 720 which may be displayed as a flag or other graphic. Text may be displayed adjacent the icon 720 to indicate a number or identification of users that are designated to review the reference.

Where the current user engages the review by others icon 720, the flag may change to the check icon 718. A current user may be able to review all types of references with the review flag automatically updating in the base table when the current user engages an update action link (not shown) at a bottom of the page the reference details page 702.

A current user may delete a reference from the reference base table through the reference details page 702 by engaging on a cross icon 722 for any each reference type section 704a, 704b, 704c. A current user may also add a new reference for the same source document 600. In this case, the user will be able to add references in a 'I will do it myself' mode. The system will give the option to select "Automated: 24 hours turnaround." An NPL will remain unchanged, and a US reference may have fields including Patent/Publication No., Issue/Publication date, Patentee/Applicant Name, Kind Code, and Comment. For a foreign reference the fields may include Patent/Publication No., Jurisdiction, Publication Number, Kind Code, Comment, Publication date, Patentee/Applicant name, Attachment, and a checkbox for translated.

Referring to FIG. 6A, the bottom document box 524 may indicated a duplicate source 600a for the source document 600 of a referent in the uncited tab 416 with a checkbox 504 selected. A sorting criterion for duplicates for the uncited tab 416 includes a first level criterion and a second level criterion. The first level sorting criteria being ascending order of mailing date of source documents in case of a PTO correspondence or, self-citation creation date in case of self-citation, and a second level criteria of alphabetical order of jurisdiction (Z to A).

As part of the data flow illustrated in FIG. 3, duplicate sources will be checked, for such as the duplicate source 600a in the bottom box 524 illustrated in FIG. 6A. Logic for checking for duplicate reference entries may be executed to find duplicate entries in the reference base table 300 according to an attribute list for a source document associated with the duplicate references. If there is more than one duplicate source, details will be shown for the duplicate source having an earliest mailing date which may include the document description, family ID, mailing date, application number, an attachment clip which a user may engage to show the source document PDF in a separate window, and an edit references icon. Where a user engages a more link 618 in the source document module 520, as illustrated in FIG. 6A, the same data for all duplicate sources will be shown in a tabular format such as in a pop-up.

From the view tab in the above pop-up a user may initiate an IDS, such that a user may initiate an IDS interaction to file all the uncited references in an IDS. The user may also mark a reference (or more than one) as 'DO NOT FILE', by engaging a link to the reference. As soon as the reference is selected (multiple selections may be enabled), an INITIATE IDS action will be deactivated and a DO NOT FILE action will be activated. The user may then engage the DO NOT FILE link.

With reference to FIG. 4 and as previously noted, any of the cited tab 412, the uncited tab 414, the examiner cited tab 416, the cited in parent tab 418, the do not file tab 420, and the deleted tab 422 may be engaged on the view page 404 to display information relating to references grouped into categories corresponding to the above mentioned tabs from the user interface 400. While the same information may be displayed for a respective tab when engaged or accessed as a result of a search using the search 406c option, information provided for one tab versus another tab may be different.

A user may engage the cited in IDS tab 412 and filter a list of references using a drop down box (not shown) having values including All (which will be a default value), list of IDS filing dates, and Pending USPTO filing (in the event that there cited references with a sub-status of pending USPTO filing). A list of fields for a patent reference section 500 of the cited in IDS tab 412 may include an IDS filing date and a USPTO status in addition to jurisdiction 500a, patent no. 500b, kind code 500c, patentee/applicant 500d, and view 500e, similar to the uncited tab 414 illustrated in FIG. 5. For each reference listed in any reference section 500, a more link 500e1 may be provided under a view 500e field. Engaging the more link of the patent reference section 500 of the cited in IDS tab 412 will provide a link for which engagement may result in a pop-up being displayed which includes links for a name corresponding to a name of an individual or entity that entered the particular reference ("Reference Entered By"), a comments link, and an open PDF link to open a PDF document. Subsequent engaging of the comments link or the open PDF link will open respective content in a form that may not be edited by a user.

A list of fields for an NPL reference section 502 for the Cited in IDS tab 412 may include an NPL field, and a View field similar to the view field 500e of the patent reference section 500. The view field of the NPL reference section 502 for the cited in IDS tab 414 may include an IDS filing date and an agency (e.g. USPTO) status field in addition to a more link 500e1. Engagement of the more link 500e1 may result in a pop-up being displayed including links for a name, a comments link, and an open PDF link. Subsequent engaging of the comments link or the open PDF link will open respective content in a form that may not be edited by a user.

A source document module 520 for the cited in IDS tab 412 is illustrated in FIG. 6B. By default, a source document 600 in the source document box 522 will correspond to a patent of the first row in the patent reference section 500. A user may change a status of the source document to one of 1449 pending, accepted, and rejected via the source document module 520. A sorting criterion for source documents for the cited in IDS tab 412 includes a first level criteria and a second level criteria. Categories for the first level sorting criteria corresponding to USPTO status include pending USPTO filing, 1449 pending, accepted, and rejected. Categories for a second level criteria corresponding to an IDS filing date include filing, pending, and descending order of IDS filing date.

A user may engage the examiner cited tab 416 as illustrated in FIG. 4, and the same informational data fields may be displayed in a patent reference section 500 as with the uncited tab 412. In addition the list of fields for a NPL reference section 502 will be the same as the uncited tab 412. However, upon selection of a reference, the source document module 520 will display the source document box 522 and a reference flow box 622 as the bottom box 524 as illustrated in FIG. 6D. The reference flow box 622 may include a reference flow 624 showing a reference table status of a highlighted reference with respect to all destination applications where it has been transmitted. This status text string may be a hyperlink and will open in a new window if engaged by a user. All hyperlinks in the reference flow box 622 will access different jurisdictions and application numbers and open in a different window.

Sorting of source documents for the examiner cited tab 416 may be according to a first level criteria and a second level criteria. The first level sorting criteria corresponds to an ascending order of mailing dates of source documents in case of a PTO correspondence. The second level criterion includes an alphabetical order of jurisdiction.

A user may engage the cited in parent tab 418 and the same informational data fields will be displayed in a patent reference section 500 and an NPL reference section 502 as with the uncited tab 412. A sorting criterion for source documents for the cited in parent tab 418 may be the same as the sorting criteria for the uncited tab 414.

A user may engage the do not file tab 420 and the same informational data fields will be displayed in a patent reference section 500 and an NPL reference section 502 as with the uncited tab 412. The do not file tab 420 differs from the uncited tab 414 in that comments and open PDF links accessed via a more link of a view field in the patent reference section 500 and the NPL reference section 502 permit access to content that cannot be edited. A default sorting criteria for the do not file tab 420 may correspond to a descending order of do not file status update dates.

Upon selection of a reference, the source document module 520 will display the source document box 522 and the bottom box 524 may include duplicates and the self-citation box 602 as illustrated in FIG. 6A. If there is more than one duplicate source, the system may show the details for the duplicate source having earliest mailing date. If no reference is selected, the source document module 520 will include the source document 600 corresponding to a first reference of an expanded one of the patent reference section 500 and the NPL reference section 502. For the do not file tab 420, a user may perform additional actions via the bottom box 524. In particular, a user may include a reference (or more than one) in a future IDS. A user may first select a reference via a respective checkbox 504 in the expanded section and an INCLUDE IN IDS action link will be activated which the user may engage.

A user may engage the deleted tab 422 and the same informational data fields may be displayed in a patent reference section 500 and an NPL reference section 502 as with uncited tab 412. The do not file tab 422 differs from the uncited tab 414 in that comments and open PDF links accessed via a more link of a View field in the patent reference section 500 and the NPL reference section 502 permit access to content that cannot be edited. A default sorting criteria for the deleted tab 424 may correspond to a descending order of delete status update dates.

For each of the cited tab 412, the uncited tab 414, the examiner cited tab 416, the cited in parent tab 418, the do not file tab 420, and the deleted tab 422, when a hyperlink from another page is directed to reference record with a reference category value (NPL or patent), a single reference will be shown in a related fab along with respective associated information. An option to remove a search criterion and show all references in the related tab may be provided in each. The user interface 400 may limit only one reference section (e.g. patent reference section 500, NPL reference section 502) to be expanded at one time.

Figure 8:
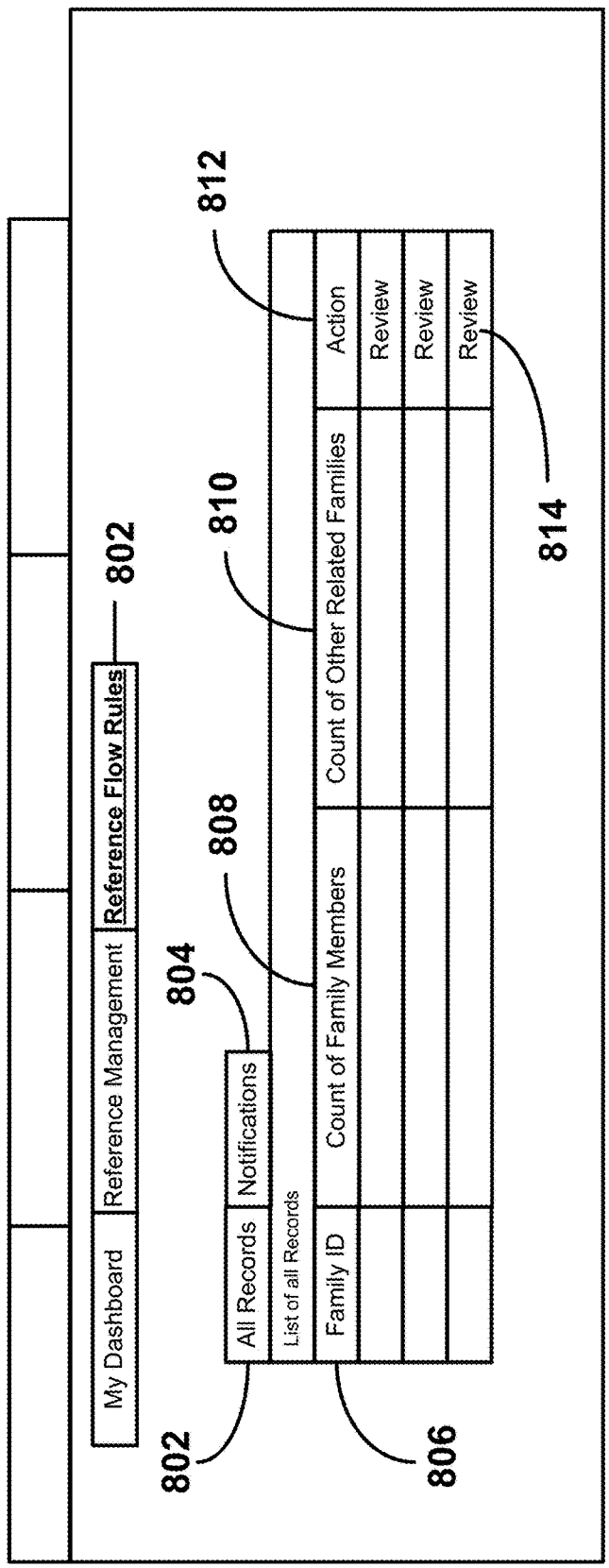
FIG. 8 is a diagram of an example interface according to aspects of the present disclosure.
Figure 9:
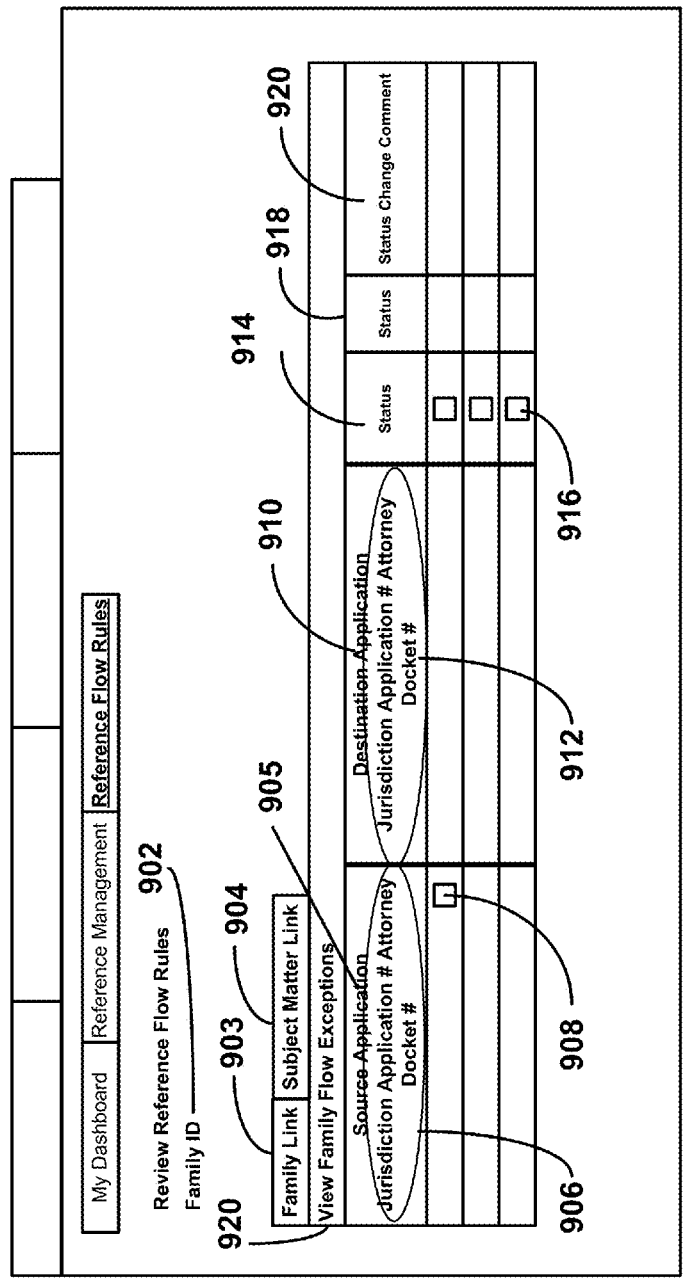
FIG. 9 is a diagram of an example interface according to aspects of the present disclosure.

Referring to FIG. 4, the view reference flow rule 410 option tab may be engaged to separately display a detailed reference flow rule page 800 of an associated family of a respective reference record 402, as illustrated in FIG. 8. Reference flow rule page 800 may include tabs for all records 802 and notifications 804. The reference flow rule page 800 may indicate a total count of open subject matter link notifications 804. Informational data fields for the reference flow rule page 800 may include family ID 806, count of family members 808, count of other related matters (subject matter link) 810, and action 812. A review link 814 may be provided for each family, that when engaged will result in a review reference flow rule page 900 being displayed as illustrated in FIG. 9.

The review reference flow rule page 900 may include a Family Link 902 and a Subject Matter Link 920 associated to a family, and a Family ID 902 on top will be hyperlinked. Engaging the Family ID 902 it will open the list of family members in a pop-up. Source application information 905 displayed on the review reference flow rule page 900 relates to source application information 906 including jurisdiction, application no., and attorney docket no. for a member of a family. Default values in a source application drop down box 908 may include US National—first US Filing/PCT US— first US filing. A user may select other family members from the drop down 908. A field for destination application 910 relates to destination application information 912 including jurisdiction, application no., attorney docket no. for each destination application associated with a source application.

Each destination application will include a status switch 916 for a status field 914 that is set to off by default. Other fields may include last edit 918 and status change comments field 916. Whenever a status of the link is changed with switch on/off link 912, it may be mandatory, in certain aspects, to add comments for inclusion in a status change comments field 920 via comment box such as a pop-up. The system may display comments that a last edit user may have entered at the time of changing the status. If a switch 912 is switched off, an exception rule will be created in active status. If the switch 912 is switched on (was switched off previously), it will update exception rule table to deactivate the exception rule.

When the user clicks on 'View Family Flow Exceptions" 920, the system will show all reference flow exceptions in a family (in active status) in a pop-up as illustrated in FIG. 10. The "View Family Flow Exceptions" link 920 should be greyed out when no data is populated in a reference rule exception table for a respective family.

Figure 11:
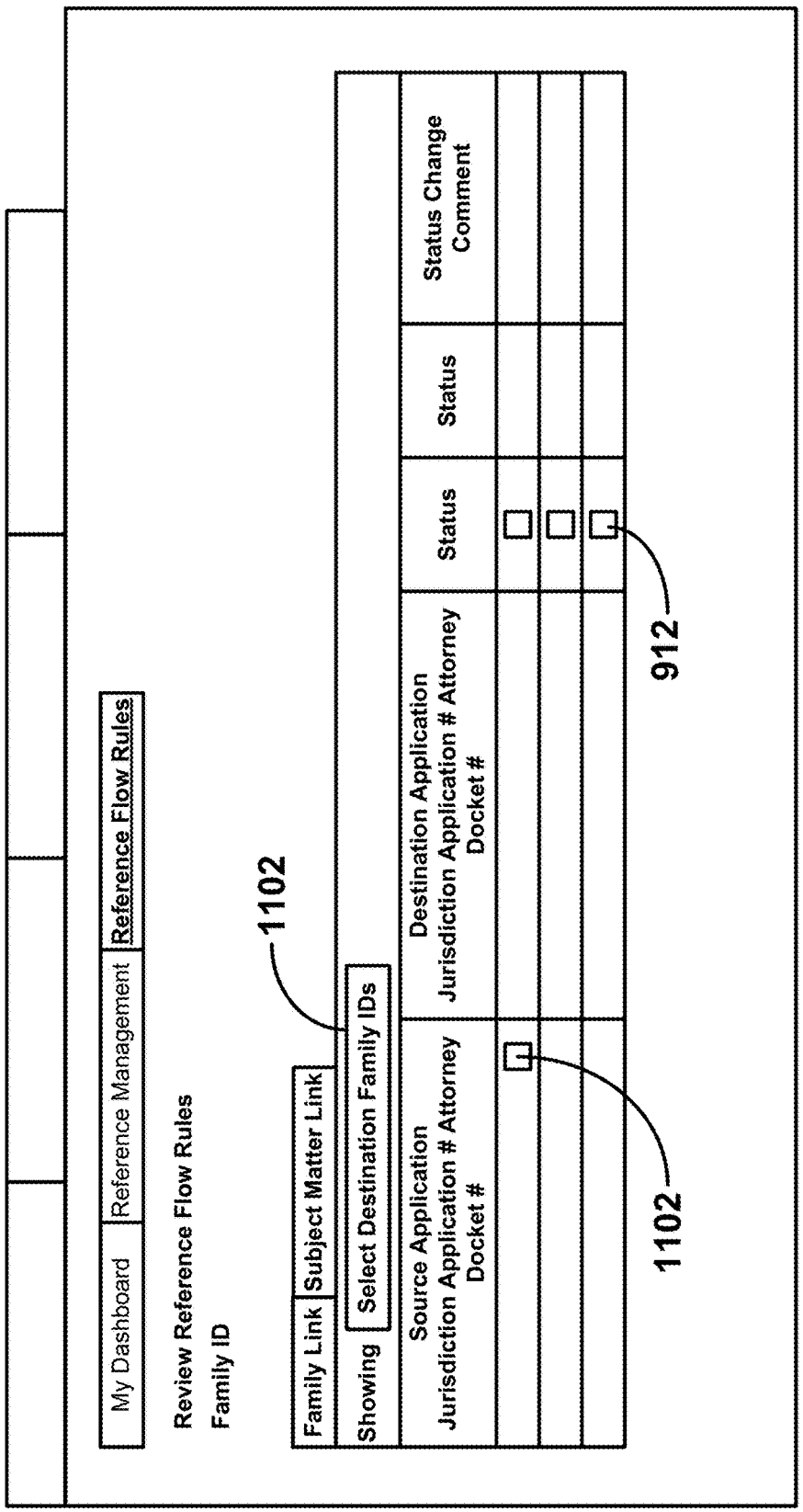
FIG. 11 is a diagram of an example interface according to aspects of the present disclosure.

When a user engages the subject matter link 905 illustrated in FIG. 9, a version of the review reference flow rule page 900 as illustrated in FIG. 11 may be displayed. The user may select a destination family ID 1100, and source and destination values may be populated for the family ID selected. A drop down 1102 in source application may be provided with values including—US National—first US Filing/PCT US—first US filing for a source family. If the subject matter link is not applicable then there will be an option to associate a first US filing member with a source family member with earliest filing date. A list of all source and destination application numbers (and corresponding jurisdiction and attorney docket numbers) values will be listed in the drop down 1102.

When a user selects a destination family ID, a delete family link action button 1200 will be activated. The system may prompt the user for a double confirmation with mandatory status change comment, for example. If the user decides to delete a subject matter family link as illustrated in FIG. 12, all links between the family will switch off.

Figure 13:
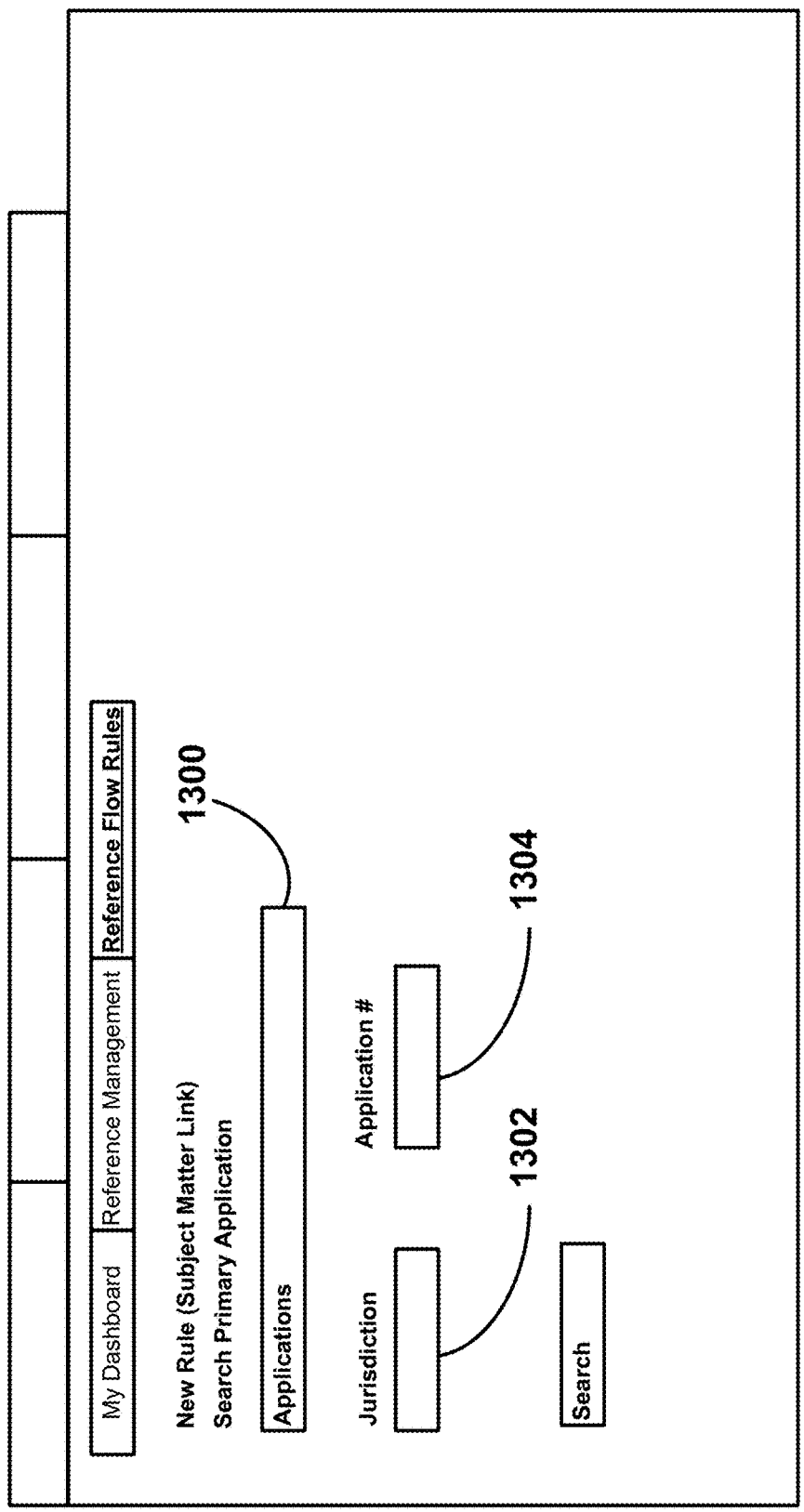
FIG. 13 is a diagram of an example interface according to aspects of the present disclosure.

A user may create a new rule via a new rule (subject matter link) search page as illustrated in FIG. 13. A user may use a drop down 1300 to search for/by an application number. The user will be prompted to first search for jurisdiction 1302 and application no. 1304 in which the references has to be entered. The user can search using four options as illustrated in FIG. 14—jurisdiction 1402, application no. 1404, family ID 1406, and attorney docket number 1408.

Figure 14:
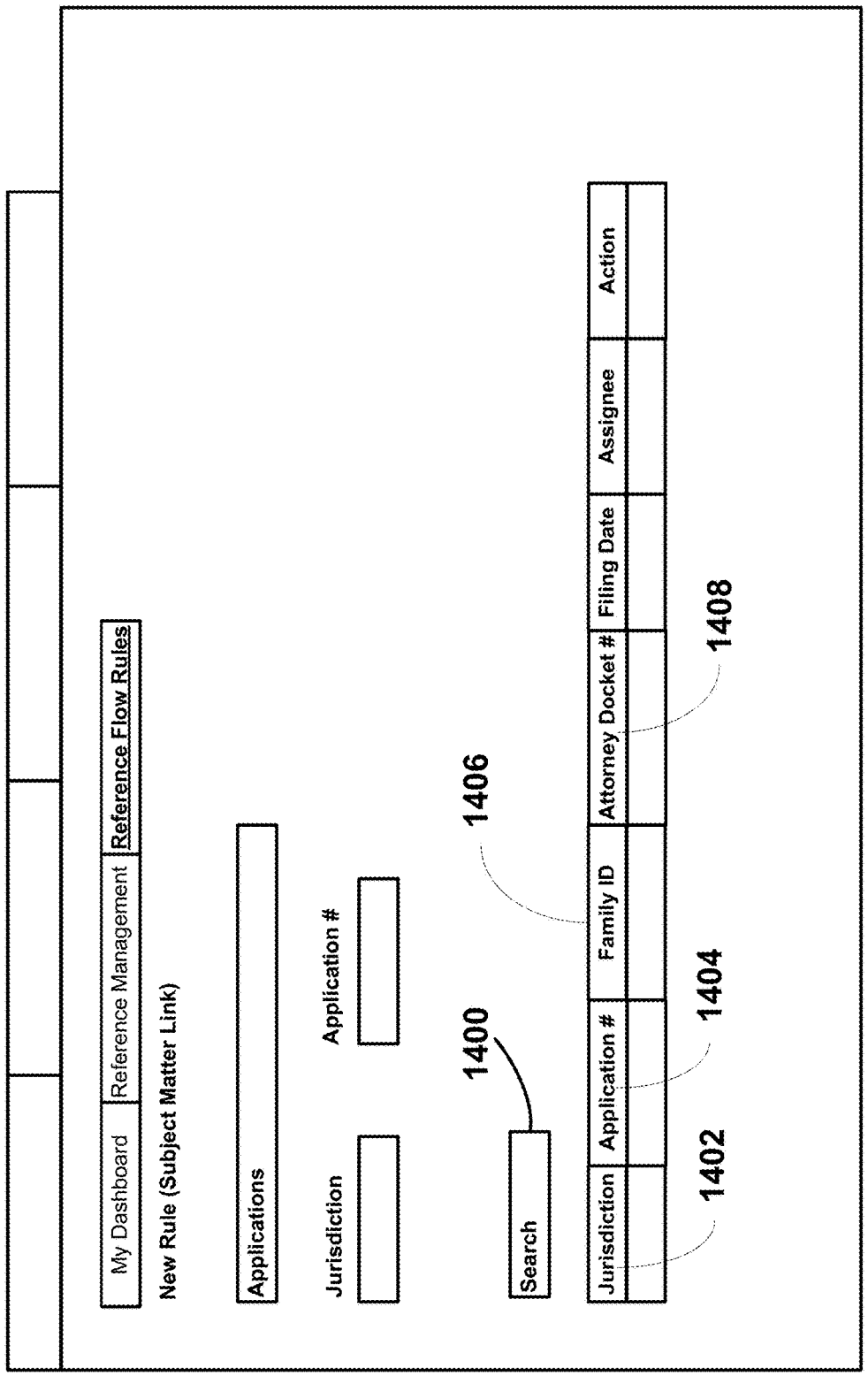
FIG. 14 is a diagram of an example interface according to aspects of the present disclosure.
Figure 15:
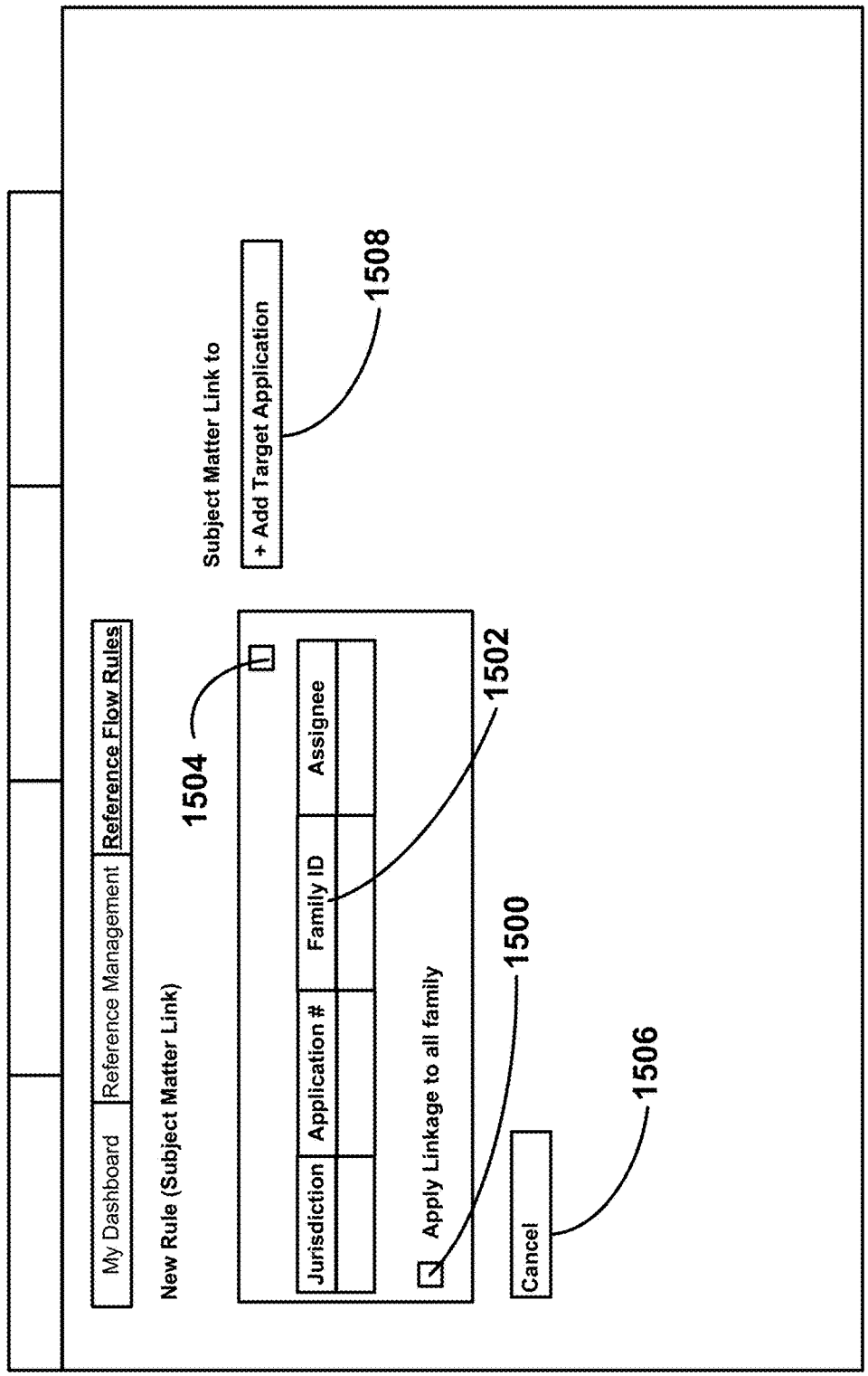
FIG. 15 is a diagram of an example interface according to aspects of the present disclosure.

When the user searches an application a version of the new rule (subject matter link) page as illustrated in FIG. 14 will be displayed. Where the user selects an application a version of the new rule (subject matter link) page as illustrated in FIG. 15, may be displayed including an "Apply linkage to all family" checkbox 1500 that will be in editable mode may be checked by default. A family ID 1502 will be hyperlinked to a pop-up where family details will be displayed. If a user has selected an incorrect family member, the user can click on cross button 1504 and go back to the search page. If a user engages on a cancel option 1506, the user will go back reference flow landing page 800 as illustrated in FIG. 8.

A user may add the target application in the page illustrated in FIG. 15. The user clicks on "Add target application" 1508 and be prompted to conduct a similar search as with the new rule (subject matter link) search page illustrated in FIG. 13.

Figure 16:
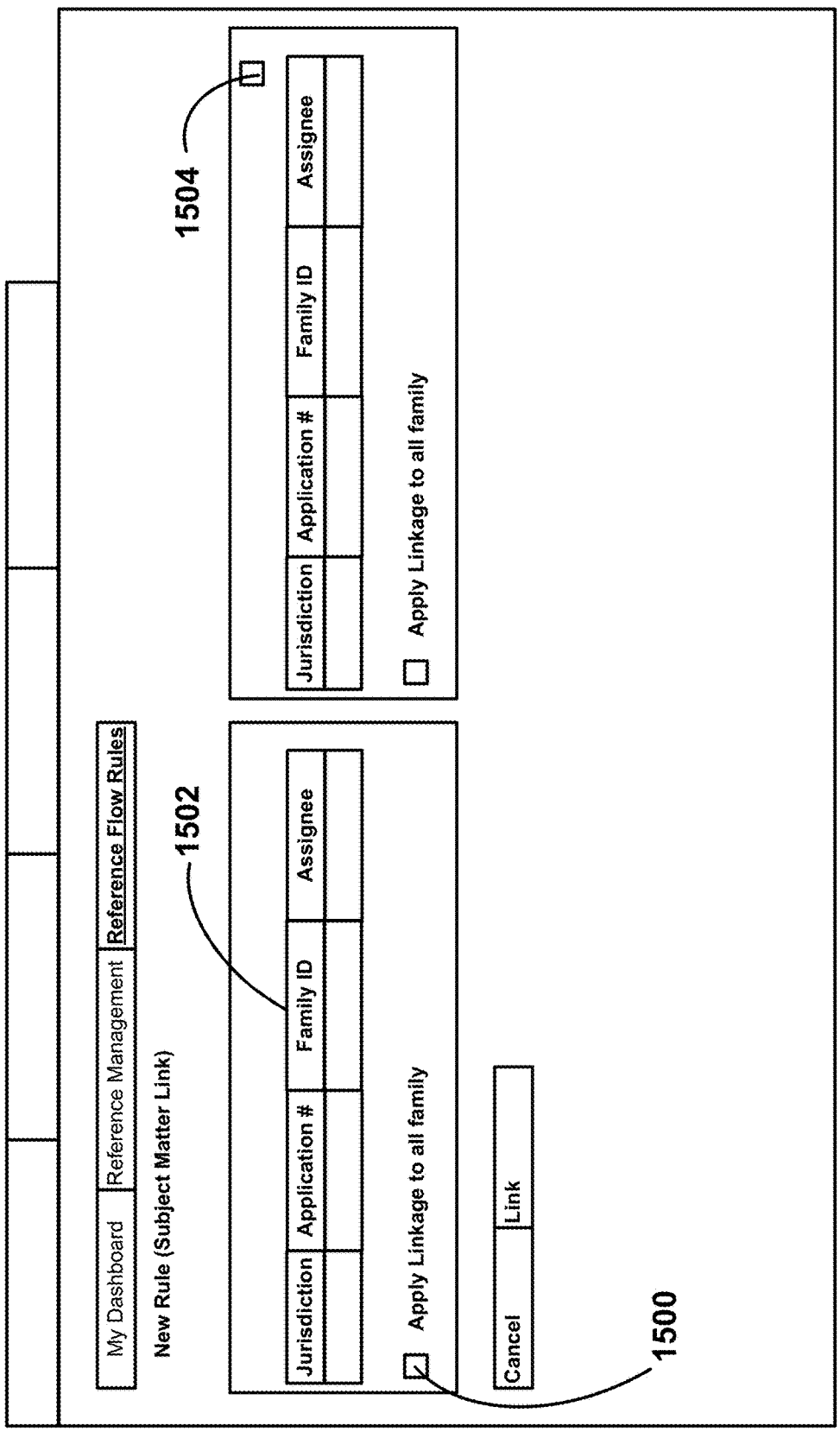
FIG. 16 is a diagram of an example interface according to aspects of the present disclosure.

After the user has selected an application no., a new rule (subject matter link) page as illustrated in FIG. 16 may be displayed in which the family ID 1502 will be hyperlinked to a pop-up where family details will be displayed. If a user doesn't want to apply the link to all family members of target application, the user can uncheck the "apply linkage to all family" 1500. The user can click on cross button 1504 to select a different target application & will go back to search target application page.

Once the user engages Link option 1600 as illustrated in FIG. 16, a subject matter link ("SML") will be created, reference flow rule landing page 900 will show the family IDs of the primary & target application at the top of the table. When a subject matter link is created—by default bi-directional flows are created. Further, SML links are possible through this user interface 400 including primary family to target family, primary application to target application, primary application to target family, and primary family to target application. For example in a scenario in which a first family F1 including applications X1, X2, and X3, and a second family F2 include applications X4, X5, and X6, the user may first create a subject matter link between X1 and X4. Per the design, the system will create exceptions for all bidirectional flows except between X1 and X4. At a later date, the user (can be a different user) creates another subject matter link for X1 and X5 using the same user interface 400. In this case, the system will deactivate the exceptions relating to bidirectional flow between X1 and X5 to enable this subject matter link.

Figure 17:
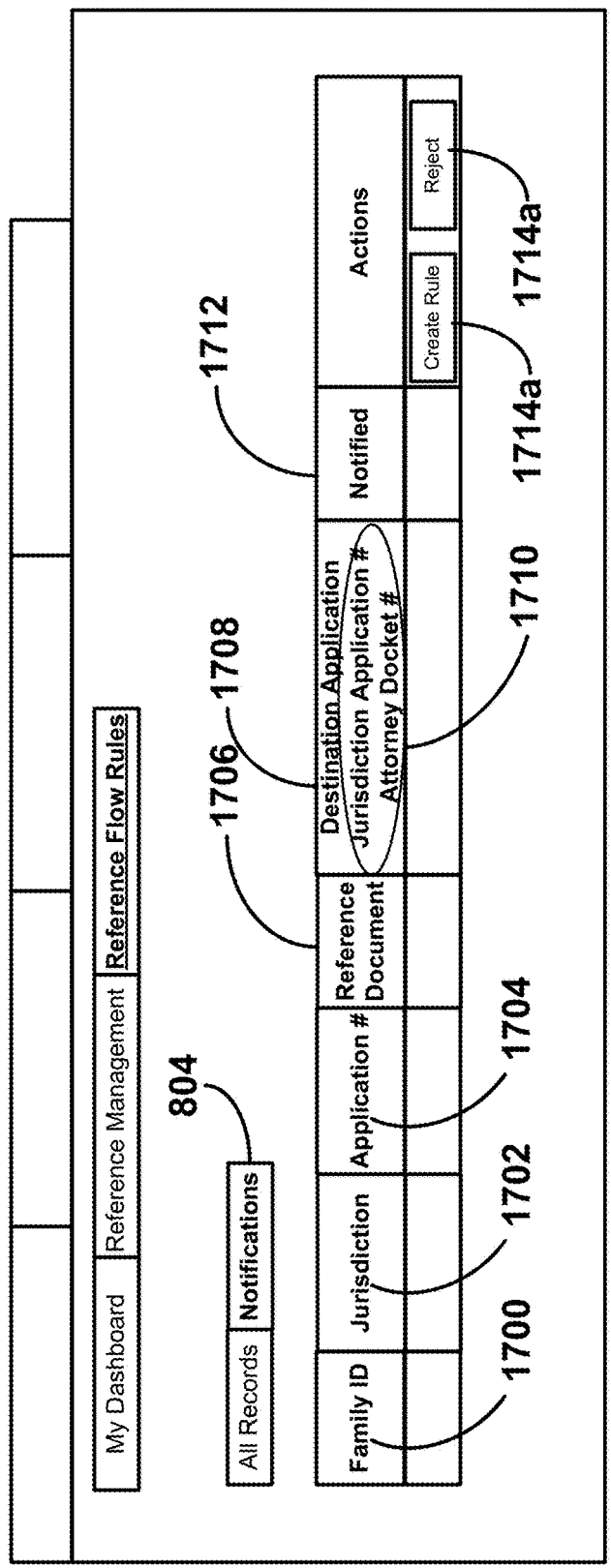
FIG. 17 is a diagram of an example interface according to aspects of the present disclosure.
Figure 18:
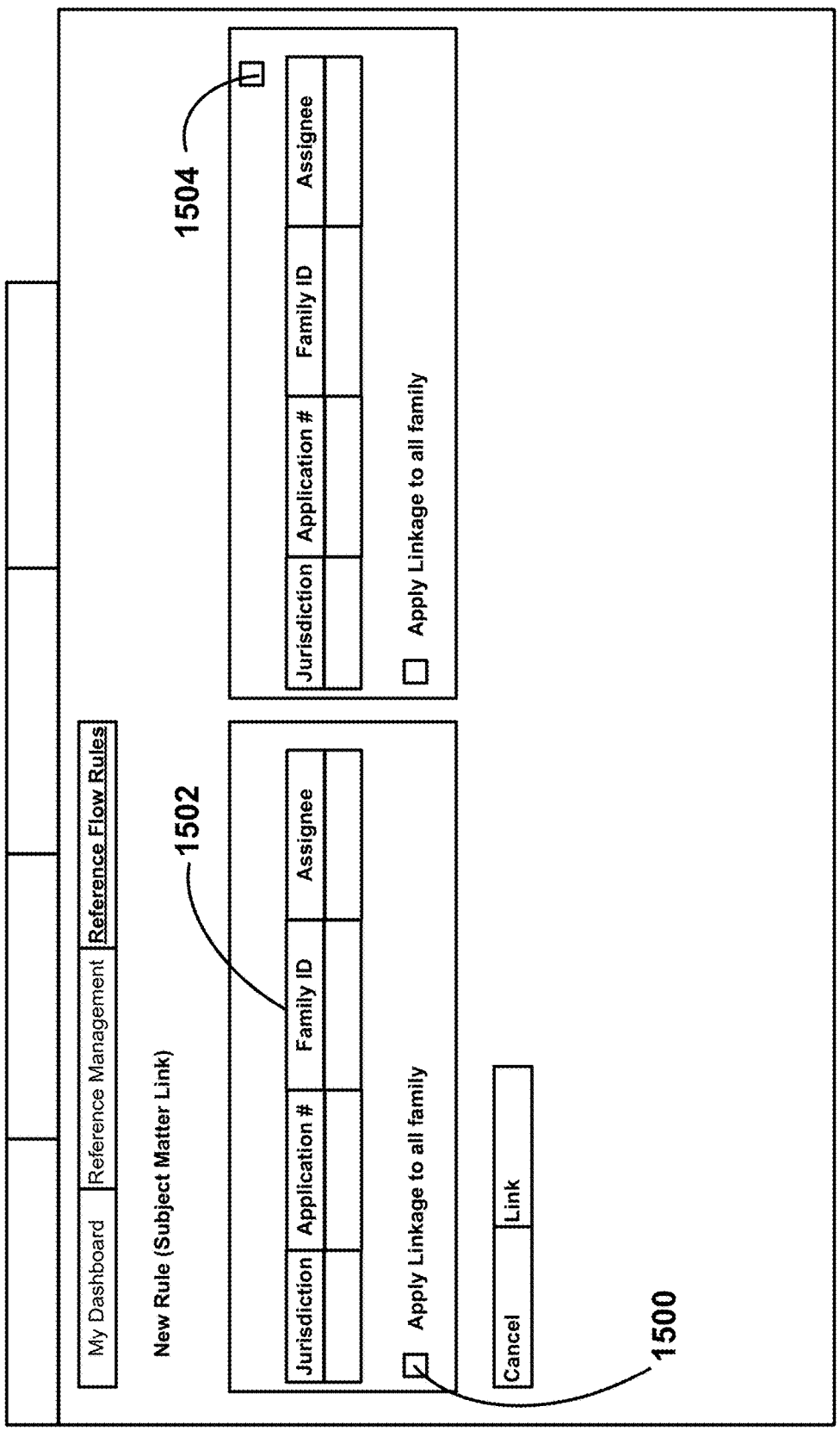
FIG. 18 is a diagram of an example interface according to aspects of the present disclosure.
Figure 19:
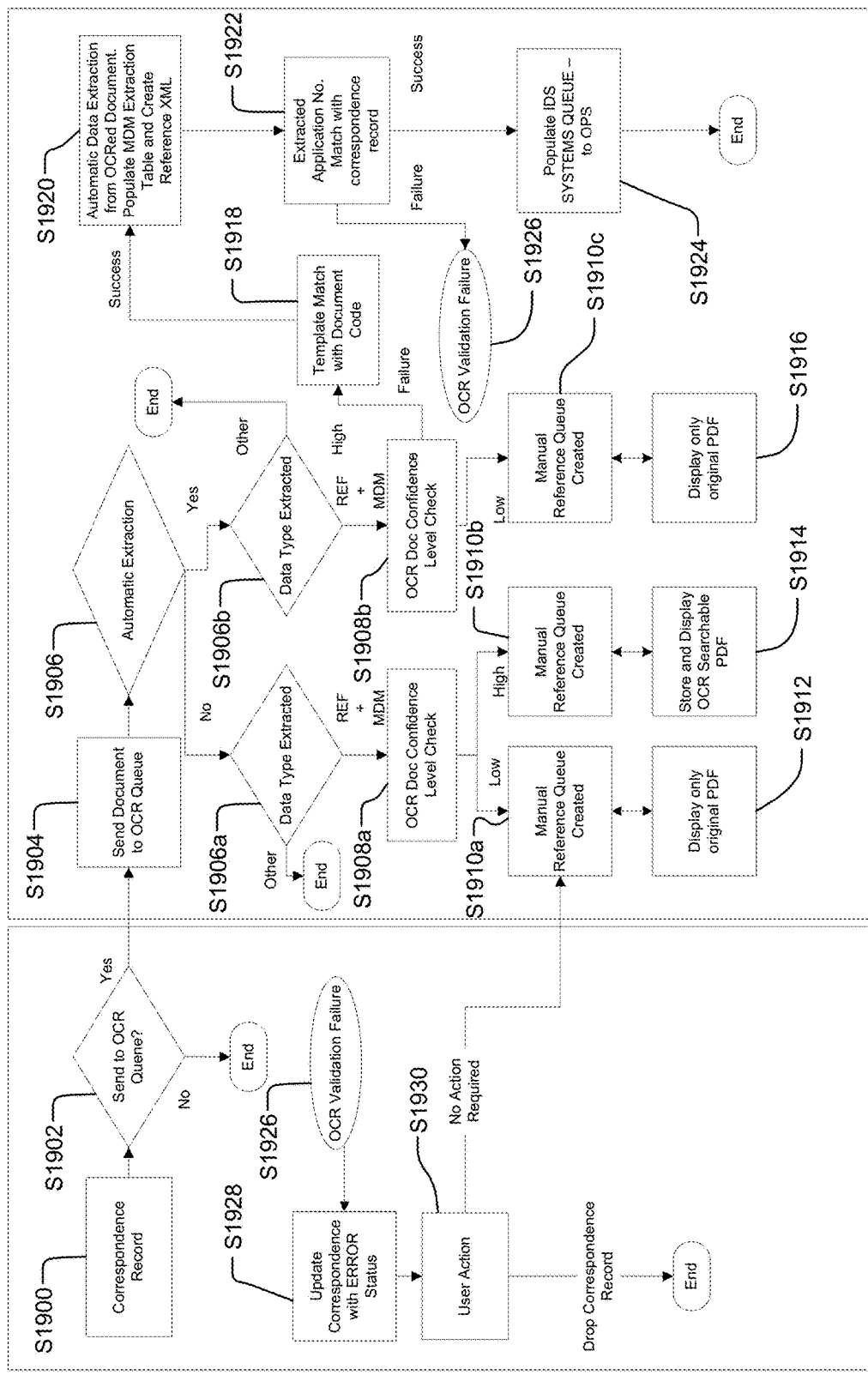
FIG. 19 is a schematic diagram of an example data flow according to aspects of the present disclosure.

A Notifications page is illustrated in FIG. 17 which includes the fields of family ID 1700, jurisdiction 1702, application no. 1704, reference document 1706, subject matter link to: 1708 including family ID, jurisdiction, and application no. information 1710, notified 1712, and actions 1714 which includes create rule 1714a/reject 1714b links. A notification message just above the grid, "subject matter link" notification message value will be displayed. A notification may come when a reference entered in the application is available in the system as an application attached to another family ID. This search will be done for US, Foreign, and NPL references where US unpublished application checkbox is ticked, for example, where an application serial number column is used to search with jurisdiction=US & application number=application serial number column. The system will send a notification to make a subject matter link. When the user clicks on create a pages as illustrated in FIG. 18 will be displayed.

The system may execute reference linkage rules including family linkage (FL) (intra family linkages between applications) rules, and subject matter linkage (SML) (inter family linkages between applications) rules. With respect to the family linkage rules, default inclusions may be ALL members to ALL members within family (both ways). The exclusions may be defined in the system manually through the user interface 400 and exclusion rules may be stored in a reference rule exclusion List. With respect to subject matter linkage rules, default inclusions may be ALL members to ALL members within family (both ways). The exclusions may be defined in the system manually through the user interface 400 and exclusion rules may be stored in the reference rule exclusion list.

As an example, a reference rule table may including at least the following fields, which are intended as non-limiting examples:

Reference Rule ID: Generated for each rule created in REFERENCE RULE Table.

Rule Type: Value is Family, if rule is created out of Family Linkage Value is SML, if Rule is created out of Subject Matter Linkage Source Application: Application Number Jurisdiction Source Application: System Populated from a record associated with the selected application Jurisdiction Destination Application: System Populated from a record associated with the selected application Destination Application: Application Number Status: ACTIVE/INACTIVE/DROPPED Comment: Text Field—100 characters. When status of a linkage is changed, comment field may require entry.

Regarding reference rule exceptions, a status of a reference rule exception may be active or dropped. With active, which is a default status of reference rules created, this status does not allow reference records to move to IDS reference flow table and IDS source reference flow table for the particular exception. A reference rule exception that is in a dropped status does not stop a reference record from a move to IDS reference flow table and IDS source reference flow table for the specific rule that has been dropped. A dropped status is not reversible and therefore cannot be changed. When an application is dropped/deactivated, any exception involving the application (as source or target) is dropped.

The system performs a duplicate check when a new reference rule is created source to destination combinations. For example:

(JURISDICTION+SOURCE APPLICATION)→(JURISDICTION+DESTINATION APPLICATION)

Here, there can exist only one ACTIVE Combination Source: (US-X1)→Destination: (JP-X2). Dropped rules are not included in a duplicate check will use a converted number format for the application.

A reference flow for creating a reference is as follows:

CREATE/CHANGE/DROP Reference in Reference Base→CREATE/CHANGE/DROP flow in IDS Reference Flow/IDS Source Reference Flow Table A reference may be created in the reference base table 300 either through import from a staging table or by a manual submitted through the user interface 400. A source reference is created in a source reference base table 302 automatically when the first reference of any correspondence document is created. The system may run a reference flow creation package, every time the reference is created/changed/dropped through staging import or manually through the user interface 400. Tables 2-5 4 below show a combined exemplary data structure for a creating a reference according to an exemplary reference flow creation package. The system may populate data sub-structure in one or more system tables (IDS reference flow, IDS base, internal IDS filing info, external IDS filing) according to exemplary data sub-structure creation/population process provided herein.

TABLE 2

| IDS Reference Flow Table | |
|---|---|
| Data Sub-Structure | Data Sub-Structure Possible Values/Value Determination or Population Process |
| Reference Base ID | System generated ID for reference record from reference base table 300 |
| Reference Flow ID Document ID | Unique Reference Flow Record ID - System generated
1. Correspondence Record ID for the Reference in base table from Correspondence Store if Reference category is PTO CORRESPONDENCE
2. Null if reference category is SELF CITATION |
| Reference Number_INPUT | 1. Input U.S. Publication/Pat. No. if Reference Type is PUS (Fetched from PUS table)
2. Input Foreign Document Number if Reference Type is FP (Fetched from FP table) |
| Reference Number_Converted | 1. Converted U.S. Publication/Pat. No. if Reference Type is PUS (Fetched from PUS table)
2. Converted Foreign Document Number if Reference Type is FP (Fetched from FP table)
Refer: number Format validation matrix used in the system and Ref Management |
| NPL String | NPL String, if Reference Type is NPL (Fetched from NPL Table) |
| Source Application Number_INPUT | Input Source Application number for the reference in reference base table 300 |
| Source Application Number_Converted | Converted Source Application number for the reference in reference base table 300 |

TABLE 2-continued

| IDS Reference Flow Table | |
|---|---|
| Data Sub-Structure | Data Sub-Structure Possible Values/Value Determination or Population Process |
| Target Application Number_INPUT | Input Target Application Number for the reference flow (based on Applicable family linkage or Subject Matter Linkage) from the system |
| Target Application Number_Converted | Converted Target Application Number for the reference flow (based on Applicable family linkage or Subject Matter Linkage) from the system |
| Temp IDS id | 1. System generated Initial IDS ID assigned to a reference flow when it's picked up in an IDS Build.
2. While the Temp IDS id is assigned to the Reference Flow, the same flow cannot be assigned to another IDS
3. If the Reference Flow is removed from the IDS Build by the user, the Temp IDS id is removed from
4. Once the Temp IDS id is removed from a reference flow can be assigned to other IDS
Conditions for a Reference Flow to be picked up in and IDS:
a/ The Reference Flow Status must be UNCITED and
b/ The Temp IDS id column should be NULL
c/ Do Not File flag should be NO
d/ Target Application Should be ACTIVE in the system
e/ Correspondence Status should be ACTIVE in correspondence store if the reference category is PTO Correspondence |
| Internal Final IDS id | a/ System generated sequence.
b/ When IDS File is Generated from the system, Internal Final IDS id is generated and assigned to the IDS in the IDS Base Table
c/ IDS File can take up limited number of references.
Hence during file generations, original IDS build (withTemp IDS id) is split into multiple IDS depending on number of references that are cited. Details on IDS File Generation in IDS Story
d/ During File generation, each IDS is assigned a Final IDS id
e/ When the FILE UPLOAD STATUS for a final ids id in Internal IDS Filing Info table is SUCCESS, Populate the related reference flows with the Internal Final IDS Id |
| External Final IDS id | System Generated ID. Populated as a result of RECONCILIATION FLOW Process, explained later in this document. When an IDS doc (received in correspondence store) is identified to be filed outside the system, the related references in reference flow table are marked with an external IDS ID along with IDS filing date (extracted from the IDS Document mailing date)
Important: If for any specific IDS Document, External Final IDS ID is generated and populated in any of the related reference flows, INSERT A record into EXTERNAL IDS FILING INFO TABLE with the External Final IDS ID and IDS Filing Date (same as the Mailing date of the IDS Document) |
| IDS Filing Date | a/ When IDS Filing is done from the System, the filing date and file upload status from the system are populated in the Internal IDS Filing Info table
b/ When the FILE UPLOAD STATUS for a final ids id Internal IDS Filing Info table is SUCCESS, Populate in the related reference flows with the filing date for the IDS related to that specific Internal Final IDS Id
b/ When IDS is filed outside the system (EXTERNAL IDS), IDS Filing date (along with a system generated EXTERNAL IDS id) is populated in reference flow |

TABLE 2-continued

IDS Reference Flow Table

| Data Sub-Structure | Data Sub-Structure Possible Values/Value Determination or Population Process |
|---|---|
| | table, as a part of the Reference Flow Process (Discussed later in the document) |
| DO NOT FILE Flag | Yes/No |
| Reference Flow Status | EXAMINER CITED<br>CITED<br>UNCITED<br>DROPPED |
| Reference Flow Sub Status | PENDING US PTO FILING<br>1449 PENDING<br>ACCEPTED<br>REJECTED<br>CITED IN PARENT |
| Cite ID | This is populated only for IDS that are filed from the system.<br>When the FILE UPLOAD STATUS for a final ids id in Internal IDS Filing Info table is SUCCESS, Populate the related reference flows with the CITE ID<br>This is a serial number for references in each section of the IDS (U.S. Publication/U.S. Patent/Foreign Document/NPL) |

TABLE 3

IDS Base Table

| Data Sub-Structure | Data Sub-Structure Possible Values/Value Determination or Population Process |
|---|---|
| Temp IDS id | System Generated sequence for each IDS Build. Created and stamped on selected reference flows when user takes action "Skip & Proceed" or "Continue" after Initiate IDS |
| INTERNAL Final IDS id | System generated sequence. Created when IDS File generated. IDS File generation can result in multiple IDS files. For each IDS File, one Final IDS id is generated. There can be multiple Final IDS ids for one Temp IDS id<br>When IDS File is generated, For each File Cite ID is generated for each reference flow in that IDS. Cite ID will be a system generated sequence. For each IDS, Within each section, the Reference Cite ID will be system generated serial number (starting from 1 for each section). Cite ID will be populated in IDS Source Reference Flow table and IDS reference base table 300 |
| Last Updated By | Last user Name who worked on the IDS |
| Last Submitted for Approval Date | Last the IDS was submitted for approval - Date. Updated every time the IDS is submitted for approval |
| Last Submitted for Approval By | Last the IDS was submitted for approval - user Name that submitted for approval |
| IDS Status | IDS in Progress<br>IDS Approval Pending<br>IDS Approved<br>Generating File Package<br>IDS Filed<br>Pending Filing in US PTO |
| IDS Last Approval Date | Last the IDS was approved - Date |
| IDS Approved by | Last the IDS was Approved By - user Name |
| IDS File Generated By | user who initiated IDS File Generation |
| IDS File Generate Initiation Date | System Date when the File Generation action is taken |
| IDS File Generation Completion Date | System Date when the File Generation action is completed |
| Drop from IDS ID | When a reference is dropped from an IDS, The Temp IDS id is stamped against the Reference flow. The Reference flow will never be picked up in this IDS id again.<br>The reference flow however can be picked up in a new IDS. If the flow is dropped from the new IDS as well, the new TEMP IDS ID overwrites the existing value on the reference flow. |
| IDS Filing Channel | MANUAL/SYSTEM<br>Manual : If user selects option "I want to File Myself" during IDS File Generation<br>Automatic: If user selects options "I want system to File" during IDS File Generation |

TABLE 4

Internal IDS Filing Information Table

| Data Sub-Structure | Data Sub-Structure Possible Values/Value Determination or Population Process |
|---|---|
| Temp IDS id | From IDS BASE Table |
| INTERNAL Final IDS id | From IDS Base Table |
| IDS Filing Date | Filing Date will be populated for each row having anInternal Final IDS id, when the IDS File upload is successful |
| IDS FILE UPLOAD Status | SUCCESS/FAILED<br>Updated Automatically when IDS File is upload is successful<br>When IDS FILE UPLOAD Status becomes SUCCESS,<br>Take Following Actions:<br>Populate Internal Final IDs into the Related Reference Flows<br>Populate IDS Filing Date into Related Reference Flows<br>Change Status of Related Reference Flows to CITED - 1449 Pending |

TABLE 5

External IDS Filing Information Table

| Data Sub-Structure | Data Sub-Structure Possible Values/Value Determination or Population Process |
|---|---|
| EXTERNAL Final IDS id | System generated sequence.<br>Used for IDS NOT Filed from System.<br>Important: If for any specific IDS Document, External Final IDS ID is generated and populated in any of the related reference flows, INSERT A record into EXTERNAL IDS FILING INFO TABLE with the External Final IDS ID and IDS Filing Date (same as the Mailing date of the IDS Document)<br>When IDS document received in correspondence store > references are extracted from it. IDS Reconciliation process runs to identify if the IDS has been filed within system OR its an external IDS. In case its an external IDS, POPULATE:<br>For reference flows Corresponding to this IDS (Newly created from the document or already existing)<br>Create External Final ID (A System generated sequence) and populate in the reference flows in ids reference flow table/ids source reference flow filing info table/External IDS Filing info table<br>Use IDS Document mailing date to populate IDS Filing Date field in reference flows in ids reference flow table/source reference filing info table/external ids filing info table |
| EXTERNAL IDS Filing Date | ******* Refer Information above ***** |

A duplicate check may be performed in the IDS Reference Flow Table. For example, if Reference Type is PUS or FP, a duplicate check may be performed of the combination of Reference Number_Converted—Target Application Number_Converted. As another example, if Reference Type is NPL, a duplicate check may be performed on the combination of NPL String—Target Application Number_Converted. A duplicate check in the IDS Reference Flow Table may not include Flow records with a status of A/DROPPED, or B/CITED—REJECTED.

Table 6 below provides exemplary potential Reference Flow Status-Sub Status combinations for the reference base table 300.

TABLE 6

Reference Base Table 300: Potential Status - Sub Status Combinations

| Status | Sub Status |
|---|---|
| EXAMINER CITED | NULL |
| CITED | Pending US PTO Filing |
|  | 1449 Pending |
|  | Rejected |
|  | Accepted |
| UNCITED | Cited in Parent |
|  | NULL |
| DROPPED | NULL |

DROPPED: Dropped Reference Flows are not included in Duplicate Check. Dropped Reference Flows do not get assigned to New IDS Build.

EXAMINER CITED: Self Flow of References from base table to Reference flow table has status Examiner Cited. In this case the Source and target application are the same. This is applicable when Reference category is PTO CORRESPONDENCE (Document Code is other than IDS and SPEC) and SELF CITATION. Examiner Cited References Do not get picked up in New IDS Build.

UNCITED—NULL: When an application is created in a family, References flow into this application (As target) in references flow table. Some are created in Uncited—Null status and some are created in Uncited—Cited in Parent status. All subsequent flows into this application are created in either Examiner Cited—Null (Self Flow) or Uncited—Null status. Reference Flows in Uncited-Null status are assigned in New IDS Build.

UNCITED—Cited in Parent: Created only First Time an application is created in the system and references flow into this application. Logic in Section BUSINESS RULE—IDS REFERENCE FLOW>CASE 6 of this Document. Reference Flows in Uncited—Cited in Parent status are assigned in New IDS Build.

CITED—Pending US PTO Filing: When IDS file is generated in the system, status—sub status values for related reference flows is cited—pending US PTO Filing. Reference Flows in Cited—Pending US PTO Filing status are NOT assigned in New IDS Build.

CITED—1449 pending: When IDS is successfully filed from system (FILE UPLOAD STATUS=SUCCESS in Internal IDS Filing Info table), status—sub status values for related reference flows is cited—1449 pending. Reference Flows in Cited—1449 Pending status are NOT assigned in New IDS Build.

CITED—Accepted: Current status of reference flow is Cited—1449 Pending>1449 Document received>value passed on to reference flow (through OCR Process or Manual Notification to user)>Flow status changes to Cited—Accepted or Cited—Rejected Reference Flows in Cited—Accepted status are NOT assigned in New IDS Build.

CITED—Rejected: Current status of reference flow is Cited—1449 Pending>1449 Document received>value passed on to reference flow (Changed MANUALLY only)>Flow status changes to Cited—Accepted or Cited—Rejected. Reference Flows in Cited—Rejected status are NOT assigned in New IDS Build.

Table 7 provides an exemplary IDS source reference flow table related to an exemplary source reference.

TABLE 7

IDS Source Reference Flow Table

| Data Sub-Structure | Data Sub-Structure Possible Values/Value Determination or Population Process |
|---|---|
| Source Reference BaseID | From source reference base table 300 |
| Source Reference Flow ID | Unique value - system generated for reference flow |
| Document ID | Correspondence Record ID from source reference base table 302 |
| Source Reference NPL String | Fetched from IDS source reference base table 302 |
| Target Application No_INPUT | |
| Target Application No._Converted | |
| Source Application No_INPUT | |
| Source Application No._Converted | |
| Status | ACTIVE/DROPPED |

The system may perform a duplicate check for the IDS Source Reference Flow Table. The Duplicate check may be done by: Source Reference NPL String+Target Application No_Converted+Source Application No_Converted. Dropped records may not be included in the duplicate check, and may not be picked up as a New IDS Build.

The system may implement exemplary creation and assignment rules for an IDS Source reference flow.

Creation rule—When a first reference for a correspondence document is created in the reference base table 300, a Source Reference may be created in source reference base table 302. If a Source Reference is in ACTIVE status, it will flow to the IDS Source Reference Flow Table based on applicable Family Linkage and Subject Matter Linkages. For example, if applications X1, X2, and X3 are Family Members, then reference (R1) is a first reference created from ID1 in X1 in reference base table 300: ID1-R1-X1-NEW REF. This may trigger creation of a Source Ref in Source Reference Flow Table:

ID1-SRID1-$X1$-$X1$-ACTIVE

ID1-SRID1-$X2$-$X1$-ACTIVE

ID1-SRID1-$X3$-$X1$-ACTIVE

For each Document in correspondence Store, there can be only one source reference record in source reference base table 302. For each record is source reference base table 302, there will be multiple flow records (related to different target applications) in source reference flow table Assignment of IDS Source Reference Flow to IDS Build Rule—Records in Source Reference Flow table can be assigned to a New IDS build multiple times. Every time a reference flow is assigned to an IDS an IDS Build Process, if the reference category is PTO Correspondence, a Corresponding Source Reference Flow (related to the correspondence ID of the reference record) in ACTIVE status is automatically assigned to the same IDS Build. The Temp IDS ID is assigned to the flow in the IDS Source reference flow filing info table. If all the references from a single correspondence document are removed from the IDS Build, the related Source Reference is automatically removed from the same IDS Build. Record corresponding to the Flow is removed from the IDS Source reference flow filing info table. One Reference Flow may be assigned to Multiple IDS and filed multiple times. Thus filing details of the Source Reference Flows may be maintained in a separate table. A same Source Reference Flow can be parallel processed in more than one IDS.

Table 8 provides an exemplary IDS source reference filing table in which multiple rows can exist for the same data sub-structure.

TABLE 8

IDS Source Reference Flow Filing Info Table

| Data Sub-Structure | Data Sub-Structure Possible Values/Value Determination or Population Process |
|---|---|
| Source Reference Flow ID | |
| Temp IDS ID | |
| Internal Final IDS ID | |
| External Final IDS ID | |
| IDS Filing Date | |
| IDS Reference Flow Status | CITED DROPPED |
| IDS Reference Flow Status | Sub Pending US PTO Filing 1449 Pending Accepted Rejected |
| Cite ID | Populated by system, against the flow when the IDS File is generated from system |

CITED—Pending US PTO Filing: When IDS file is generated in the system and NOT FILED from system, status—sub status values for related source reference flows is cited—pending US PTO Filing CITED—1449 pending: When IDS is file is generated in the system and FILED from system, status—sub status values for related source reference flows is cited—1449 pending CITED—Accepted/Cited—Rejected: Current status of reference flow is Cited—1449 Pending>1449 Document received>value passed on to reference flow (through OCR Process or Manual Notification to user)>Flow status changes to Cited—Accepted or Cited—Rejected DROPPED: When Correspondence is dropped, related Source Reference is dropped in source reference base table 302>>Related flows are dropped in IDS Source Reference Flow table>>Related filing info records are dropped in IDS Source reference flow filing info table, if they are not in CITED status.

Records in the filing info table can be either in CITED status or DROPPED status. If IDS is in progress, and Source reference is dropped, the corresponding record in Filing info table would be dropped. CITED record ca not be dropped.

The system may implement exemplary creation and assignment rules for an IDS reference flow.

Creation rule—According to one aspect of the present disclosure, references may flow from the reference base table 300 to the IDS Reference flow table 306/IDS Source Reference Flow Table 308 as illustrated in FIG. 3, based on applicable family linkages and subject matter linkages, and/or if a flow flag on the reference record in the base table is active. Table 9 provides exemplary Reference Flow Table 302 rules.

TABLE 9

Reference Flow Table Rules

| | | | Possible Action in Ref Flow Table | | |
|---|---|---|---|---|---|
| Change No. | Change Type | Change Description | DROP of Flow initiated | New Flow Created | Attribute Change of Flow Initiated |
| 1 | Ref Base Table Change | Ref record created NEW REF - Flow Flag YES | N | Y | N |
| 2 | Ref Base Table Change | Ref record created DUPLICATE REF- Flow Flag NO | N | N | Y |
| 3 | Ref Base Table Change | Ref record created DUPLICATE REF- Flow Flag YES | Y | Y | N |
| 4 | Ref Base Table Change | Ref record Dropped | Y | Y | N |
| 5 | Ref Base Table Change | Ref Record Flow Flag to Change - YES to NO | Y | N | N |
| 6 | Ref Base Table Change | Ref Record Flow Flag to Change - NO to YES | N | Y | N |
| 7 | Change in Family | New Application added to Family | N | Y | N |
| 8 | Change in Family | Application Family ID changed to a different Family | Y | Y | N |

Data may be written into the reference base table 300 under different scenarios. For example, data may be written according to the following exemplary fields: Correspondence ID—DOC Code—Reference No.—Source Application No—Reference Status—Flow Flag. Additionally, data may be written into the IDS Reference Flow Table 306 under different scenarios. For example, data may be written according to the following exemplary fields: Correspondence ID—Reference No.—Target Application No.—Reference Flow Status—Reference Flow Sub Status—Source Application No. For the IDS Source Reference Flow table 308, the fields listed above for the IDS Reference Flow Table 306 may be fetched through a joint query of the IDS Source Reference Flow table 306 and the IDS Source Reference Flow Filing Info Table of Table 8 herein.

Tables 10-13 below include exemplary reference flow logic for changing a reference record in the reference base table 300 according a reference category.

Table 10 includes exemplary reference flow logic for changing a reference record in the reference base table 300 for self-citation reference. In combination with executing the reference flow logic in one of Tables 10-13, the system may implement the following rules for execution:

1. While executing reference flow logic in one of Tables 10-13:
   a. execute the DROP action first for a reference before executing the other actions if the reference category is Self-Citation, or
   b. execute the DROP actions first and then other actions for all references of a particular document if the reference category is PTO Correspondence;
2. If a reference flow has Internal FINAL IDS id populated, Do not UPDATE/OVERWRITE this field. DO not update External FINAL IDS id for this reference flow; and 3. If a reference flow has Final IDS ID (Internal or external) stamped, its status can only be one of the following:
   a. CITED—1449 Pending,
   b. CITED—ACCEPTED, and
   c. CITED—REJECTED Table 10 includes exemplary reference flow logic for changing a reference record in the reference base table 300 where a reference category is self-citation reference.

TABLE 10

| | | |
|---|---|---|
| Reference Flow Logic to Change Reference Record Reference Category - Self-Citation | | |
| Reference Category | Change in Reference Record in Reference Base Table 300 | Reference Flow Logic |
| Self Citation | Ref record created NEW REF - Flow Flag YES | Reference Category: SELF CITATION Family Members: X1, X2, X3 Reference Record created in reference base table 300: R1 - X1 - NEW REF - Y Reference Flows Created in IDS reference flow table: R1 - X1 - UNCITED-NULL - X1 (Self Flow) R1 - X2 - UNCITED-NULL - X1 R1 - X3 - UNCITED-NULL - X1 Since SELF CITATION reference is not associated with a correspondence record, no source reference is created when a self-citation reference is created. |
| | Ref record created DUPLICATE REF - Flow Flag NO | Reference Category: SELF CITATION Family Members: X1, X2, X3 Reference Record created in reference base table 300: R1 - X2 - DUPLICATE REF - N Reference Flow Attribute Change in IDS reference flow table: If Ref Flow Status for R1 in X2 (as target application) is UNCITED Old record in ref flow table: R1 - X2 - UNCITED - NULL - X1 New record in ref flow table: NO CHANGE If Ref Flow Status for R1 in X2 (as target application) is CITED, Make NO changes Old record in ref flow table: R1 - X2 - CITED - Any value - X1 |

TABLE 10-continued

| | | |
|---|---|---|
| Reference Flow Logic to Change Reference Record Reference Category - Self-Citation | | |
| Reference Category | Change in Reference Record in Reference Base Table 300 | Reference Flow Logic |
| | | New record in ref flow table: NO CHANGE Since SELF CITATION reference is not associated with a correspondence record, no source reference is created when a self-citation reference is created. |
| | Ref record created DUPLICATE REF - Flow Flag YES | Self Citation Reference will NEVER be created as a DUPLICATE REF with Flow Flag YES. Because Self citation reference has MAILING DATE as NULL. So whenever compared with a PTO CORRESPONDENCE reference, the PTO CORRESPONDENCE reference will take precedence and retain the flow flag YES. |
| | Ref Record Flow Flag to Change - YES to NO | DROP Initiated in Ref Flow Table: When flow flag changes from YES to NO, Corresponding Flow records in ref flow table are DROPPED in IDS Reference Flow table, if and only if they are in UNCITED status. NO CHANGE REQUIRED, if they are in EXAMINER CITED or CITED status |
| | Ref Record Flow Flag to Change - NO to YES | New Ref Flows are created corresponding to this Reference Record. New reference flow creation is subject to DUPLICATE CHECK. Duplicate Check is performed on Combination: 1. Reference Number Converted - Target Application Number Converted, if Reference Type is PUS or FP 2. NPL String - Target Application Number_Converted, if Reference Type is NPL Duplicate Check in IDS Reference Flow Table does not include Flow records with following status A/ DROPPED B/ CITED - REJECTED |
| | Ref Record Dropped | Go to REFERENCE DROP SECTION later in the document |

Table 11 includes exemplary reference flow logic for changing a reference record in the reference base table 300 where a reference category is PTO CORRESPONDENCE—DOC CODE: Other than IDS and SPEC.

TABLE 11

| | | |
|---|---|---|
| Reference Flow Logic to Change Reference Record Reference Category - PTO CORRESPONDENCE - DOC CODE: Other than IDS and SPEC | | |
| Reference Category | Change in Reference Record in Reference Base Table 300 | Reference Flow Logic |
| PTO CORRESPONDENCE DOC CODE: Other than IDS and SPEC | Ref record created NEW REF - Flow Flag YES | Reference Category: PTO CORRESPONDENCE (For Document Code Other than IDS and SPEC) Family Members: X1, X2, X3 Reference Record created in reference base table 300: ID1- Other than IDS and SPEC - R1 - X1 - NEW REF - Y Reference Flows Created in IDS reference flow table: ID1 - R1- X1 - EXAMINER CITED - NULL - X1 (Self Flow) ID1 - R1 - X2 - UNCITED - NULL - X1 ID1 - R1 - X3 - UNCITED - NULL - X1 If R1 is the First reference for ID1 created in ref base table, Source Reference created in |

TABLE 11-continued

Reference Flow Logic to Change Reference Record
Reference Category -
PTO CORRESPONDENCE - DOC CODE: Other than IDS and SPEC

| Reference Category | Change in Reference Record in Reference Base Table 300 | Reference Flow Logic |
|---|---|---|
| | Ref record created DUPLICATE REF - Flow Flag NO | source reference base table 302 AND flows to IDS Source Reference Flow table basis applicable Family Linkage and SML Reference Category: PTO CORRESPONDENCE (For Document Code Other than IDS and SPEC) Family Members: X1, X2, X3 Reference Record created in reference base table 300: ID2 - Other than IDS and SPEC - R1 - X2 - DUPLICATE REF - N Reference Flow Attribute Change in IDS reference flow table: If Ref Flow Status for R1 in X2 (as target application) is UNCITED, DROP the old Ref Flow and Create a New Ref Flow Old record in ref flow table: ID1 - R1 - X2 - UNCITED - NULL - X1 New Status of Old record in ref flow table: ID1 - R1 - X2 - DROPPED - NULL - X1 New record in ref flow table: ID2 - R1 X2 - EXAMINER CITED - NULL - X2 (Self Flow) If Ref Flow Status for R1 in X2 (as target application) is CITED, Make NO changes Old record in ref flow table: ID1 - R1 - X2 - CITED - Any value - X1 New record in ref flow table: NO CHANGE |
| | Ref record created DUPLICATE REF - Flow Flag YES | If R1 is the First reference for ID2 created in ref base table, Source Reference created in source reference base table 300 AND flows to IDS Source Reference Flow table basis applicable Family Linkage and SML Reference Category: PTO Correspondence (Document Code other than IDS/SPEC) Family Members: X1, X2, X3 Reference Record existing in reference base table 300: ID1- Null - R1 - X1- NEW REF - Y Reference Flows Created in IDS reference flow table: ID1 - R1 - X1- EXAMINER CITED - NULL X1 (Self Flow) ID1 - R1 - X2 - UNCITED - NULL - X1 ID1 - R1 - X3 - UNCITED - NULL - X1 Duplicate Ref (PTO Correspondence - Doc Code: IDS) created in base table with earlier mailing date. Now the changes are: Ref Base table: ID2 - Other than IDS and SPEC - R1 - X2 - DUPLICATE REF - Y ID1- Null - R1 - X1- NEW REF - N IDS Ref Flow table: DROP Initiated Reference Flows originated from ID1- Null - R1 - X1 - NEW REF are DROPPED in IDS Reference Flow table, if and only if they are in UNCITED status. NO CHANGE REQUIRED, if they are in EXAMINER CITED or CITED status ID1 - R1 - X1 - EXAMINER CITED - NULL - X1 has NO CHANGE ID1 - R1 - X2 - UNCITED - NULL - X1 changes to ID1 - R1 - X2 - DROPPED - NULL - X1 ID1 - R1 - X3 - UNCITED - NULL - X1 changes to ID1 - R1 - X3 - DROPPED - NULL - X1 |

TABLE 11-continued

Reference Flow Logic to Change Reference Record
Reference Category -
PTO CORRESPONDENCE - DOC CODE: Other than IDS and SPEC

| Reference Category | Change in Reference Record in Reference Base Table 300 | Reference Flow Logic |
|---|---|---|
| | | New Ref Flows Created<br>New reference flow creation is subject to DUPLICATE CHECK.<br>Duplicate Check is performed on Combination:<br>1. Reference Number_Converted - Target Application Number_Converted, if Reference Type is PUS or FP<br>2. NPL String - Target Application Number_Converted, if Reference Type is NPL<br>Duplicate Check in IDS Reference Flow Table does not include Flow records with following status<br>A/ DROPPED<br>B/ CITED - REJECTED<br>ID2 - R1 - X2 - EXAMINER CITED - NULL - X2<br>ID2 - R1 - X3 - UNCITED - NULL - X1<br>If R1 is the First reference for ID2 created in ref base table, Source Reference created in source reference base table 302 AND flows to IDS Source Reference Flow table basis applicable Family Linkage and SML |
| | Ref Record Flow Flag to Change - YES to NO | DROP Initiated in Ref Flow Table: When flow flag changes from YES to NO, Corresponding Flow records in ref flow table are DROPPED in IDS Reference Flow table, if and only if they are in UNCITED status. NO CHANGE REQUIRED, if they are in EXAMINER CITED or CITED status |
| | Ref Record Flow Flag to Change - NO to YES | New Ref Flows are created corresponding to this Reference Record.<br>New reference flow creation is subject to DUPLICATE CHECK.<br>Duplicate Check is performed on Combination:<br>3. Reference Number_Converted - Target Application Number_Converted, if Reference Type is PUS or FP<br>4. NPL String - Target Application Number_Converted, if Reference Type is NPL<br>Duplicate Check in IDS Reference Flow Table does not include Flow records with following status<br>A/ DROPPED<br>B/ CITED - REJECTED |
| | Ref Record Dropped | Go to REFERENCE DROP SECTION later in the document |

Table 12 includes exemplary reference flow logic for changing a reference record in the reference base table 300 where a reference category is PTO CORRESPONDENCE—DOC CODE: IDS.

TABLE 12

Reference Flow Logic to Change Reference Record
Reference Category -
PTO CORRESPONDENCE - DOC CODE: IDS

| Reference Category | Change in Reference Record in Reference Base Table 300 | Reference Flow Logic |
|---|---|---|
| PTO CORRESPONDENCE - DOC CODE: IDS | Ref record created NEW REF - Flow Flag | Reference Category: PTO CORRESPONDENCE (For Document Code IDS)<br>Family Members: X1, X2, X3<br>Reference Record created in reference base table 300 (For Document Code IDS)<br>DUPLICATE CHECK IN REFERENCE BASE TABLE 300 FOR REFERENCES EXTRACTED |

TABLE 12-continued

Reference Flow Logic to Change Reference Record
Reference Category -
PTO CORRESPONDENCE - DOC CODE: IDS

| Reference Category | Change in Reference Record in Reference Base Table 300 | Reference Flow Logic |
|---|---|---|
| | YES | FROM DOCUMENT CODE "IDS": If reference type is PUS or FP - check for duplicate ref only in ref base table. If not present, create as NEW REF in ref base table If reference type is NPL - check for duplicate ref both in ref base table and source ref base table. If I resent in Source Ref base table, don't create the record in ref base table. If present in ref base table, create as DUPLICTE REF in ref base table. If not present in ref base table, create as NEW REF in ref base table. ID1- IDS - R1 - X1 - NEW REF -Y Reference Flows Created in IDS reference flow table: ID1 - R1 - X1 - CITED - 1449 PENDING - X1 (Self Flow) + Populate IDS Filing Date as the Mailing Date of the IDS Document from the Correspondence Store + System generated External Final IDS ID is populated for this reference flow ID1 - R1 - X2 - UNCITED - NULL - X1 ID1 - R1 - X3 - UNCITED - NULL - X1 If R1 is the First reference for ID1 created in ref base table, Source Reference created in source reference base table 302 AND flows to IDS Source Reference Flow table basis applicable Family Linkage and SML |
| NOTE: For a specific IDS Document, SAME External Final IDS ID would be stamped on all applicable Reference flows If for any specific IDS Document, External Final IDS ID is generated and populated in any of the related reference flows, INSERT A record into EXTERNAL IDS FILING INFO TABLE with the External Final IDS ID and IDS Filing Date ( same as the Mailing date of the IDS Document) | Ref record created DUPLICATE REF - Flow Flag NO | Reference Category: PTO CORRESPONDENCE (For Document Code IDS) Family Members: X1, X2, X3 Reference Record created in reference base table 300: ID2 - IDS - R1 - X1 - DUPLICATE REF - N Reference Flow Attribute Change in IDS reference flow table: DUPLICATE CHECK IN REFERENCE BASE TABLE 300 FOR REFERENCES EXTRACTED FROM DOCUMENT CODE "IDS": If reference type is PUS or FP - check for duplicate ref only in ref base table. If not present, create as NEW REF in ref base table If reference type is NPL - check for duplicate ref both in ref base table and source ref base table. If I resent in Source Ref base table, don't create the record in ref base table. If present in ref base table, create as DUPLICTE REF in ref base table. If not present in ref base table, create as NEW REF in ref base table. A/ When in base table REF TYPE IS PUS or FP or NPL (where this NPL is not Present in Source Reference Base Table 302) If Ref Flow Status for R1 in X1 (as target application) is EXAMINER CITED (Self Flow) Old record in ref flow table: ID1 - R1 - X1 - EXAMINER CITED - NULL - X1 New record in ref flow table: NO CHANGE If Ref Flow Status + Sub Status for R1 in X1 (as target application) is UNCITED + Any value for the Sub Status, Change this to CITED - 1449 Pending + Populate IDS Filing Date as the Mailing Date of the IDS Document from the Correspondence Store + System generated External Final IDS ID is populated for this reference flow Old record in ref flow table: ID1 - R1 - X1 - UNCITED - Any value - X2 New record in ref flow table: ID1 - R1 - X1 - CITED - 1449 Pending - X2 If Ref Flow Status + Sub Status for R1 in X1 (as target application) is CITED + Pending US PTO Filing Change this to CITED - 1449 Pending + Populate IDS Filing Date as the Mailing Date of the IDS Document from the Correspondence Store + |

TABLE 12-continued

Reference Flow Logic to Change Reference Record
Reference Category -
PTO CORRESPONDENCE - DOC CODE: IDS

| Reference Category | Change in Reference Record in Reference Base Table 300 | Reference Flow Logic |
|---|---|---|
| | | System generated External Final IDS ID is populated for this reference flow<br>Old record in ref flow table: ID1 - R1 - X1 - CITED - Pending US PTO Filing - X2<br>New record in ref flow table: ID1 - R1 - X1 - CITED - 1449 Pending - X2<br>If Ref Flow Status + Sub Status for R1 in X1 (as target application) is CITED - 1449 Pending AND EXTERNAL FINAL IDS id or INTERNAL FINAL IDS id fields are NULL<br>Old record in ref flow table: ID1 - R1 - X1 - CITED - 1449 Pending - X2<br>Change Required: Populate IDS Filing Date as the Mailing Date of the IDS Document from the Correspondence Store + System generated External Final IDS ID is populated for this reference flow<br>If Ref Flow Status + Sub Status for R1 in X1 (as target application) is CITED - 1449 Pending AND EXTERNAL FINAL IDS id or INTERNAL FINAL IDS id fields are NOT NULL<br>Old record in ref flow table: ID1 - R1 - X1 - CITED - 1449 Pending - X2<br>NO CHANGE REQUIRED<br>If Ref Flow Status + Sub Status for R1 in X1 (as target application) is CITED + ACCEPTED/REJECTED<br>Old record in ref flow table: ID1 - R1 - X1 - CITED - Accepted/Rejected - X2<br>New record in ref flow table: NO CHANGE<br>B/ When REF TYPE is NPL (and NPL is Present in Source Reference Base Table 302)<br>If Reference type is NPL and reference is present in Source Ref Base Table, reference is not created again in Reference Base Table 300.<br>If Source Ref Flow Status + Sub Status for R1 in X1 (as target application) is CITED - 1449 Pending AND EXTERNAL FINAL IDS id or INTERNAL FINAL IDS id fields are NULL<br>Old record in ref flow table: ID1 - R1 - X1 - CITED - 1449 Pending - X2<br>Change Required: Populate IDS Filing Date as the Mailing Date of the IDS Document from the Correspondence Store + System generated External Final IDS ID is populated for this reference flow<br>If Source Ref Flow Status + Sub Status for R1 in X1 (as target application) is CITED - 1449 Pending AND EXTERNAL FINAL IDS id or INTERNAL FINAL IDS id fields are NOT NULL<br>Old record in ref flow table: ID1 - R1 - X1 - CITED - 1449 Pending - X2<br>NO CHANGE REQUIRED<br>If Source Ref Flow Status + Sub Status for R1 in X1 (as target application) is CITED + ACCEPTED/REJECTED<br>Old record in ref flow table: ID1 - R1 - X1 - CITED - Accepted/Rejected - X2<br>New record in ref flow table: NO CHANGE<br>If Reference type is NPL and reference is present in Source Ref Base Table, reference is not created again in reference base table 300. If Ref Flow Status + Sub Status for R1 in X1 (as target application), in Source Ref Flow Filing Info table is CITED + Pending US PTO Filing,<br>Change this to CITED - 1449 Pending + Populate IDS Filing Date as the Mailing Date of the IDS Document from the Correspondence Store + System generated External Final IDS ID is populated for this reference flow |

TABLE 12-continued

Reference Flow Logic to Change Reference Record
Reference Category -
PTO CORRESPONDENCE - DOC CODE: IDS

| Reference Category | Change in Reference Record in Reference Base Table 300 | Reference Flow Logic |
|---|---|---|
| | Ref record created DUPLICATE REF - Flow Flag YES | Old record in IDS Source Ref Flow Filing Info table: ID1 - R1 - X1 - CITED - Pending US PTO FILING - X2<br>New record in ref flow table: ID 1 - R1 - X1 - CITED - 1449 Pending - X2<br>If R1 is the First reference for ID2 created in ref base table,<br>Source Reference created in source reference base table 302 AND flows to IDS Source Reference Flow table basis applicable Family Linkage and SML<br>Reference Category: PTO Correspondence (Document Code: IDS)<br>Family Members: X1, X2, X3<br>Reference Record existing in reference base table 300:<br>ID1- Null - R1 - X1 - NEW REF - Y<br>Reference Flows Created in IDS reference flow table:<br>ID1 - R1 - X1 - EXAMINER CITED - NULL - X1 (Self Flow)<br>ID1 - R1 - X2 - UNCITED - NULL - X1<br>ID1 - R1 - X3 - UNCITED - NULL - X1<br>Duplicate Ref (PTO Correspondence - Doc Code: IDS) created in base table with earlier mailing date.<br>If reference type is PUS or FP - check for duplicate ref only in ref base table. If not present, create as NEW REF in<br>ref base table. If present, create DUPLICATE REF in ref base table<br>If reference type is NPL - check for duplicate ref both in ref base table and source ref base table. If present in Source<br>Ref base table, don't create the record in ref base table. If present in ref base table, create as DUPLICTE REF in ref base table. If not present in ref base table, create as NEW REF in ref base table.<br>If reference is created as DUPLICATE REF in ref base table with Flow Flag "YES", Now the changes are:<br>Ref Base table:<br>ID2 - IDS - R1 - X2 - DUPLICATE REF - Y<br>ID1- Null - R1 - X1 - NEW REF -N<br>If R1 is the First reference for ID2 created in ref base table,<br>Source Reference created in source reference base table 302 AND flows to IDS Source Reference Flow table basis applicable Family Linkage and SML<br>IDS Ref Flow table:<br>DROP Initiated<br>Reference Flows originated from ID1- Null - R1 - X1 - NEW REF are DROPPED in IDS Reference Flow table, if<br>and only if they are in UNCITED status. NO CHANGE REQUIRED, if they are in EXAMINER CITED or CITED<br>status<br>ID1 - R1 - X1 - EXAMINER CITED - NULL - X1 has NO CHANGE<br>ID1 - R1 - X3 - UNCITED - NULL - X1 changes to ID1 -<br>R1 - X3 - DROPPED - NULL - X1<br>New Ref Flows Created<br>New reference flow creation is subject to DUPLICATE CHECK.<br>Duplicate Check is performed on Combination:<br>1. Reference Number_Converted - Target Application Number_Converted, if Reference Type is PUS or FP<br>2. NPL String - Target Application Number_Converted, if Reference Type is NPL<br>Duplicate Check in IDS Reference Flow Table does not include Flow records with following status |

TABLE 12-continued

Reference Flow Logic to Change Reference Record
Reference Category -
PTO CORRESPONDENCE - DOC CODE: IDS

| Reference Category | Change in Reference Record in Reference Base Table 300 | Reference Flow Logic |
|---|---|---|
| | | A/ DROPPED<br>B/ CITED - REJECTED<br>ID2 - R1 - X3 - UNCITED - NULL - X1<br>Treatment of Ref Flow for R1 in X2 (as target application)<br>ID1 - R1 - X2 - UNCITED - NULL - X1 changes to ID1-<br>R1 - X2 - CITED - 1449 Pending - X1<br>A/ When REF TYPE IS PUS or FP or NPL (and NPL is not Present in Source Reference Base Table 302)<br>If Ref Flow Status for R1 in X1 (as target application) is EXAMINER CITED (Self Flow)<br>Old record in ref flow table: ID1 - R1 - X1 - EXAMINER CITED - NULL - X1<br>New record in ref flow table: NO CHANGE<br>If Ref Flow Status + Sub Status for R1 in X1 (as target application) is UNCITED + Any value for the Sub Status,<br>Change this to CITED - 1449 Pending + Populate IDS Filing Date as the Mailing Date of the IDS Document from the Correspondence Store + System generated External Final IDS ID is populated for this reference flow<br>Old record in ref flow table: ID1 - R1 - X1 - UNCITED - Any value - X2<br>New record in ref flow table: ID1 - R1 - X1 - CITED - 1449 Pending - X2<br>If Ref Flow Status + Sub Status for R1 in X1 (as target application) is CITED + Pending US PTO Filing.<br>Change this to CITED - 1449 Pending + Populate IDS Filing Date as the Mailing Date of the IDS Document from the Correspondence Store + System generated External Final IDS ID is populated for this reference flow<br>Old record in ref flow table: ID1 - R1 - X1 - CITED - Pending US PTO Filing - X2<br>New record in ref flow table: ID1 - R1 - X1 - CITED - 1449 Pending - X2<br>If Ref Flow Status + Sub Status for R1 in X1 (as target application) is CITED - 1449 Pending AND EXTERNAL FINAL IDS id or INTERNAL FINAL IDS id fields are NULL<br>Old record in ref flow table: ID1 - R1 - X1 - CITED - 1449 Pending - X2<br>Change Required: Populate IDS Filing Date as the Mailing Date of the IDS Document from the Correspondence Store + System generated External Final IDS ID is populated for this reference flow<br>If Ref Flow Status + Sub Status for R1 in X1 (as target application) is CITED - 1449 Pending AND EXTERNAL FINAL IDS id or INTERNAL FINAL IDS id fields are NOT NULL<br>Old record in ref flow table: ID1 - R1 - X1 - CITED - 1449 Pending - X2<br>NO CHANGE REQUIRED<br>If Ref Flow Status + Sub Status for R1 in X1 (as target application) is CITED + ACCEPTED/REJECTED<br>Old record in ref flow table: ID1 - R1 - X1 - CITED - Accepted/Rejected - X2<br>New record in ref flow table: NO CHANGE<br>B/ When REF TYPE is NPL (and NPL is Present in Source Reference Base Table 302)<br>If Reference type is NPL and reference is present in Source Ref Base Table, reference is not created again in reference base table 300.<br>If Source Ref Flow Status + Sub Status for R1 in X1 (as target application) is CITED - 1449 |

TABLE 12-continued

Reference Flow Logic to Change Reference Record
Reference Category -
PTO CORRESPONDENCE - DOC CODE: IDS

| Reference Category | Change in Reference Record in Reference Base Table 300 | Reference Flow Logic |
|---|---|---|
| | | Pending AND EXTERNAL FINAL IDS id or INTERNAL FINAL IDS id fields are NULL Old record in ref flow table: ID 1 - R1 - X1 - CITED - 1449 Pending - X2 Change Required: Populate IDS Filing Date as the Mailing Date of the IDS Document from the Correspondence Store + System generated External Final IDS ID is populated for this reference flow If Source Ref Flow Status + Sub Status for R1 in X1 (as target application) is CITED - 1449 Pending AND EXTERNAL FINAL IDS id or INTERNAL FINAL IDS id fields are NOT NULL Old record in ref flow table: ID1 - R1 - X1 - CITED - 1449 Pending - X2 NO CHANGE REQUIRED If Source Ref Flow Status + Sub Status for R1 in X1 (as target application) is CITED + ACCEPTED/REJECTED Old record in ref flow table: ID1 - R1 - X1 - CITED - Accepted/Rejected - X2 New record in ref flow table: NO CHANGE If Reference type is NPL and reference is present in Source Ref Base Table, reference is not created again in reference base table 300. If Ref Flow Status + Sub Status for R1 in X1 (as target application), in Source Ref Flow Filing Info table is CITED + Pending US PTO Filing, Change this to CITED - 1449 Pending + Populate IDS Filing Date as the Mailing Date of the IDS Document from the Correspondence Store + System generated External Final IDS ID is populated for this reference flow Old record in IDS Source Ref Flow Filing Info table: ID1 - R1 - X1 - CITED - Pending US PTO FILING - X2 New record in ref flow table: ID1 - R1 - X1 - CITED - 1449 Pending - X2 |
| | Ref Record Flow Flag to Change - YES to NO | DROP Initiated in Ref Flow Table: When flow flag changes from YES to NO, Corresponding Flow records in ref flow table are DROPPED in IDS Reference Flow table, if and only if they are in UNCITED status. NO CHANGE REQUIRED, if they are in EXAMINER CITED or CITED status |
| | Ref Record Flow Flag to Change - NO to YES | New Ref Flows are created corresponding to this Reference Record. New reference flow creation is subject to DUPLICATE CHECK. Duplicate Check is performed on Combination: 3. Reference Number_Converted - Target Application Number_Converted, if Reference Type is PUS or FP 4. NPL String - Target Application Number_Converted, if Reference Type is NPL Duplicate Check in IDS Reference Flow Table does not include Flow records with following status A/ DROPPED B/ CITED - REJECTED |
| | Ref Record Dropped | Go to REFERENCE DROP SECTION later in the document |

Table 13 includes exemplary reference flow logic for changing a reference record in the reference base table 300 where a reference category is PTO CORRESPONDENCE—DOC CODE: SPEC.

TABLE 13

Reference Flow Logic to Change Reference Record
Reference Category -
PTO CORRESPONDENCE - DOC CODE: SPEC

| Reference Category | Change in Reference Record in Reference Base Table 300 | Reference Flow Logic |
|---|---|---|
| PTO CORRESPONDENCE- DOC CODE: SPEC | Ref record created NEW REF-Flow Flag YES | Reference Category: PTO CORRESPONDENCE (For Document Code SPEC)<br>Family Members: X1, X2, X3<br>Reference Record created in reference base table 300:<br>ID1- SPEC - R1 - X1 - NEW REF - Y<br>Reference Flows Created in IDS reference flow table:<br>ID1 - R1 - X1 - UNCITED - NULL - X1 (Self Flow)<br>ID1 - R1 - X2 - UNCITED - NULL - X1<br>ID1 - R1 - X3 - UNCITED - NULL - X1<br>If R1 is the First reference for ID1 created in ref base table, Source Reference created in source reference base table 302 AND flows to IDS Source Reference Flow table basis applicable Family Linkage and SML |
| | Ref record created DUPLICATE REF - Flow Flag NO | Reference Category: PTO CORRESPONDENCE (For Document Code SPEC)<br>Family Members: X1, X2, X3<br>Reference Record created in reference base table 300:<br>ID2 - SPEC - R1 -X1 - DUPLICATE REF - N<br>Reference Flow Attribute Change in IDS reference flow table:<br>NO CHANGE<br>If R1 is the First reference for ID2 created in ref base table, Source Reference created in source reference base table 302 AND flows to IDS Source Reference Flow table basis applicable Family Linkage and SML |
| | Ref record created DUPLICATE REF - Flow Flag YES | Reference Category: PTO Correspondence (Document Code: SPEC)<br>Family Members: X1, X2, X3<br>Reference Record existing in reference base table 300:<br>ID1 - Null - R1 -X1 - NEW REF - Y<br>Reference Flows Created in IDS reference flow table:<br>ID1 - R1 - X1 - EXAMINER CITED - NULL - X1 (Self Flow)<br>ID 1 - R1 - X2 - UNCITED - NULL - X1<br>ID1 - R1 - X3 - UNCITED - NULL - X1<br>Duplicate Ref (PTO Correspondence - Doc Code: SPEC) created in base table with earlier mailing date.<br>Now the changes are:<br>Ref Base table:<br>ID2 - SPEC - R1 - X2 - DUPLICATE REF - Y<br>ID1 - Null - R1 - X1 - NEW REF - N<br>IDS Ref Flow table:<br>DROP Initiated<br>Reference Flows originated from ID1- Null - R1 - X1 - NEW REF are DROPPED in IDS Reference Flow table, if and only if they are in UNCITED status. NO CHANGE REQUIRED, if they are in EXAMINER CITED or CITED status<br>ID1 - R1 - X1 - EXAMINER CITED - NULL - X1 has NO CHANGE<br>ID1 - R1 - X2 - UNCITED - NULL - X1 changes to ID1 - R1 - X2 - DROPPED - NULL - X1<br>ID1 - R1 - X3 - UNCITED - NULL - X1 changes to ID1 - R1 - X3 - DROPPED - NULL- X1<br>New Ref Flows Created |

TABLE 13-continued

Reference Flow Logic to Change Reference Record
Reference Category -
PTO CORRESPONDENCE - DOC CODE: SPEC

| Reference Category | Change in Reference Record in Reference Base Table 300 | Reference Flow Logic |
|---|---|---|
| | | New reference flow creation is subject to DUPLICATE CHECK. Duplicate Check is performed on Combination: 1 Reference Number_Converted - Target Application Number_Converted, if Reference Type is PUS or FP 2. NPL String - Target Application Number_Converted, if Reference Type is NPL Duplicate Check in IDS Reference Flow Table does not include Flow records with following status A/ DROPPED B/ CITED - REJECTED ID2 - R1 - X2 - UNCITED - NULL - X2 ID2 - R1 - X3 - UNCITED - NULL - X2 If R1 is the First reference for ID1 created in ref base table, Source Reference created in source reference base table 302 AND flows to IDS Source Reference Flow table basis applicable Family Linkage and SML |
| Ref Record Flow Flag to Change - YES to NO | | DROP Initiated in Ref Flow Table: When flow flag changes from YES to NO, Corresponding Flow records in ref flow table are DROPPED in IDS Reference Flow table, if and only if they are in UNCITED status. NO CHANGE REQUIRED, if they are in EXAMINER CITED or CITED status |
| Ref Record Flow Flag to Change - NO to YES | | New Ref Flows are created corresponding to this Reference Record. New reference flow creation is subject to DUPLICATE CHECK. Duplicate Check is performed on Combination: 3. Reference Number_Converted - Target Application Number_Converted, if Reference Type is PUS or FP 4. NPL String - Target Application Number_Converted, if Reference Type is NPL Duplicate Check in IDS Reference Flow Table does not include Flow records with following status A/ DROPPED B/ CITED - REJECTED |
| Ref Record Dropped | | Go to REFERENCE DROP SECTION later in the document |

An exemplary reference flow table rule is provided in Table 14 for when a reference record in the reference base table 300 is dropped.

TABLE 14

Reference Flow Table Rule - Reference Record in Base Table Dropped

| Change Type | Change Description | DROP of Flow initiated | New Flow Created | Status Change of Flow Initiated |
|---|---|---|---|---|
| Ref Base Table Change | Ref record Dropped | Y | Y | N |

Where a reference record in the reference base table 300 is dropped, Corresponding ref flows in the UNCITED status and EXAMINER CITED status are dropped in the Reference Flow table. However, If a Flow is in CITED status, it cannot be dropped. Regarding the reference base table 300, when an application record is dropped or a correspondence record is dropped in correspondence store, related references are dropped in the reference base table 300. Records can be manually (through UI) dropped as well in reference base table 300. Regarding the source reference base table 302, When an application record is dropped or a correspondence record is dropped in correspondence store—related references are dropped in the reference base table 300. Records cannot be manually (through UI) dropped in source reference base table 302

A dropped status of a reference record may not be reversed. Reference Records with dropped status are may not be included in a duplicate check. Dropped reference records may not flow to the IDS reference Flow table 306. Dropped reference records may be available in the IDS Drill Down.

When for any document ID, only one reference present in the reference base table 300, and the reference record is dropped (either through Manual DROP action on the record or through system initiated DROP), the system may check if the document ID has NULL Reference Flag available in NULL REFERENCE Table. If NO is the existing value, the system may change the value to YES since YES cannot be the existing value, since the reference record was already present. If the record does not exist for the document ID in NULL REFERENCE table, insert a record for the Document ID with the NULL reference flag set to YES.

When Reference Record with NEW REF status is dropped in the reference base table 300, the system may DROP the related reference flows for the NEW REF record. Related Reference flows in UNCITED and EXAMINER CITED status (in related Family Members and Subject Matter Linkage ONLY) in IDS Reference Flow table 306 may be DROPPED. If there is one DUPLICATE REF present in reference table corresponding to this NEW REF record, the system may change the status of the DUPLICATE REF to NEW REF, and since it now becomes NEW REF, and change the Original Reference ID value for the DUPLICATE REF record to NULL. In this situation, the REF FLOW flag for the DUPLICATE REF would be YES, and the DUPLICATE REF flows to IDS REFERENCE FLOW table as in a normal process.

If there are multiple DUPLICATE REF records present in reference table corresponding to this NEW REF record, the system may CHANGE the status of the DUPLICATE REF with earliest Mailing Date to NEW REF. The REF FLOW flag for the DUPLICATE REF with earliest Mailing Date would be updated to YES. The system may change the Original Reference ID value for the DUPLICATE REF with earliest Mailing Date record to NULL, since it now becomes NEW REF, and update the Original Reference ID value for the other DUPLICATE REF records with the Reference Record id of the DUPLICATE REF with earliest Mailing Date. Accordingly, the DUPLICATE REF with earliest Mailing Date flows to IDS REFERENCE FLOW table as normal process.

When Reference Record with DUPLICATE REF status is DROPPED in reference base table 300, if the REF FLOW flag of the DUPLICATE REF record is NO than no change by the system is required. However, if the REF Flow flag for the DUPLICATE REF is YES the system will determine if there is only one DUPLICATE REF or multiple DUPLICATE REF records corresponding to the NEW REF in this group. If there is only one DUPLICATE REF, the system may first, DROP the related reference flows for the DUPLICATE REF with REF FLOW flag=YES. The related reference flows in UNCITED and EXAMINER CITED status (in related Family Members and Subject Matter Linkage ONLY) in IDS Reference Flow table may be DROPPED. Second, the system may change the Ref Flow Flag status of the NEW REF record to YES.

If there is multiple DUPLICATE REF records the system may first, DROP the related reference flows for the DUPLICATE REF with REF FLOW flag=YES. Related Reference flows in UNCITED and EXAMINER CITED status (in related Family Members and Subject Matter Linkage ONLY) in IDS Reference Flow table are DROPPED. Second, the system may determine the Reference Record with the Earliest mailing date among the NEW REF record and remaining DUPLICATE REF records, and set the Ref Flow Flag to YES, for the reference record with the earliest mailing date. As for this new reference record where ref flow flag has been set to YES, the reference flows to IDS Reference Flow table 306 as Normal.

When Reference Record with ACTIVE status is DROPPED in the source reference base table 302, the Corresponding Flows in the IDS SOURCE REFERENCE FLOW Table 308 are DROPPED. In addition the Corresponding Flows in IDS Source Reference Flow Filing Info Table of Table 8 above, if they are not in CITED status, are also DROPPED.

An exemplary reference flow table rule is provided in Table 15 for adding a an application to a family, and more generally going from an uncited to a cited status.

TABLE 15

Reference Flow Table Rule - Uncited to Cited In

| Change Type | Change Description | DROP of Flow initiated | New Flow Created | Status Change of Flow Initiated |
|---|---|---|---|---|
| Change in Family Member | New Application added to Family | N | Y | N |

The system may implement logic to create reference flows from Uncited to Cited in Parent. When a new application is created in a family, existing references flow to reference flow table 306 based on applicable family linkages and subject matter linkages.

The first time, flows are created for the new application they can take up either of two status—sub status values Uncited—NULL, or Uncited—Cited In Parent. Subsequent flows to this application are created either in Uncited—NULL or Cited—Pending US PTO Filing, or Cited—1449 Pending status.

An exemplary reference flow:

```
Family F1              X1, X2, X3, X4, X5, X6
Family F2              X7
Family F1 and Family F2 have SML
X1, X2, X3 - US Family members, NOT granted
x4 - US Family Member, Granted
X5 - Foreign Family Member
X7 - Different family member having SML with F1
X6 - New Member added to F1
```

Event: Application is granted if PROSECUTION STATUS for the application and BASE TABLE is GRANTED, else, application is not granted

```
                Existing Reference records in base table
pto correspondence - ID1- R1 - X1
pto correspondence - ID2 - R2 - X2
pto correspondence - ID3 - R3 - X3
pto correspondence - 1D4 - R4 - X4
pto correspondence - ID5 - R5 - X5
pto correspondence - ID6 - R6 - X6
pto correspondence - 1D7 - R7 - X7
Self Citation - R8 - X1
```

Scenario 1: X6 is a foreign family member, (Jurisdiction NOT=US)
Reference flow: All References R1, R2, R3, R4, R5, R6, R7, R8 flow into X6 in UNCITED—NULL status
Scenario 2: X6 is a US family member, (Jurisdiction=US)
System determines the references that will flow into X6 in Uncited—Cited In Parent status Step 1: Determine reference flows from R1, R2, R3, R4, R5, R7, R8.

Step 2: Select all the flows for a reference where Target Application are family members of X6 and all belong to US jurisdiction and none of them is GRANTED (X1, X2, X3).

Step 3: The System may determine if the selected flows for a particular reference are all in any of the following conditions:

Status of the flow is EXAMINER CITED—NULL and Mailing date of the document for that reference LESS THAN Filing date of X6

Status of the flow is CITED—ACCEPTED and IDS Filing date of that reference LESS THAN Filing date of X6

Status of the flow is UNCITED—CITED IN PARENT and Mailing date of the document (or self-citation creation date) for that reference LESS THAN Filing date of X6

Step 4: System creates flows for references meeting one of the above conditions in X6 in UNCITED—CITED IN PARENT status.

4A: First create the flows for UNCITED—CITED IN PARENT:
R1-X6-X1—UNCITED—CITED IN PARENT
R5-X6-X5—UNCITED—CITED IN PARENT
R7-X6-X7—UNCITED—CITED IN PARENT
R8-X6-X1—UNCITED—CITED IN PARENT 4B: Create flow for rest of the references (R2, R3, R4) in UNCITED—NULL status According to one aspect of the present disclosure, which may be applicable to the above exemplary reference flow, the sequence of flow creation may be First Uncited—Cited in Parent and Second Uncited—Null status. However, this rule may only apply where a new application is added. Subsequent flows may be executed normally (i.e., cited in parent logic will not be applied) thereafter.

An exemplary reference flow table rule is provided in Table 19 for changing a family.

TABLE 19

Reference Flow Table Rule - Family Change

| Change No. | Change Type | Change Description | DROP of Flow initiated | New Flow Created | Attribute Change of Flow Initiated |
|---|---|---|---|---|---|
| 8 | Change in Family | Application Family ID changed to a differentFamily | Y | Y | N |

A family of an application may be changed by/using the system (e.g. application X changes from Family F1 to family F2). With respect to the reference base table 300, when a family linkage of an application X1 is changed, corresponding reference records for the application in reference base table 300 may be dropped via the drop procedure previously discussed. The dropped reference records may be automatically recreated in reference base table 300. When recreated, these reference records may be treated as new record creation in family F2 in the reference base table 300 and Flow to Reference Flow tables 306, 308. With respect to the source reference base table 302, no change is required. However, a reference rules exclusion table will be changed. When a family linkage of the application X1 is changed, corresponding family linkages in the reference rules exclusion table for X1 are dropped. In addition, all related records in the reference rules exclusion table for X1 are dropped with respect to subject matter linkages.

According to one aspect of the present disclosure, the system may implement exemplary rules when a reference flow is in a CITED—REJECTED status. A reference flow may have a status of CITED—1449 Pending status>1449 document received, and a user may manually change status to CITED—REJECTED. While making status change, Double Confirmation needs to be prompted on the user interface 400.

According to one aspect of the present disclosure, the system may implement exemplary rules when a reference flow is in a CITED—1449 PENDING status. Reference Flows in CITED—1449 Pending status may be included in duplicate check for the IDS reference flow table 306. In addition, if a reference flow record is in the CITED—1449 Pending status, any reference from the reference base table 300 that will result in a duplicate of this record, will not flow in. Further, if a status changes from CITED—1449 Pending to CITED—REJECTED, all those references in reference base table 300, that earlier did not flow into IDS reference flow table 306 for being duplicate, will now flow into the application with UNCITED status.

According to one aspect of the present disclosure, the system may implement exemplary rules for references with a coupling ID. Where a primary reference is dropped, reference flows related to the primary reference in the reference base table 300 (flows in UNCITED/EXAMINER CITED status) are dropped. In addition, secondary references and reference flows related to the secondary references (flows in UNCITED/EXAMINER CITED status) are dropped in the reference base table 300. Where a secondary reference is dropped, the system may drop reference flows related to the secondary reference (flows in UNCITED/EXAMINER CITED status) in the reference base table 300. However, primary references may not be dropped in reference base table 300.

FIG. 18 illustrates OCR data flow for checking an OCR confidence level. Once a document is OCRed in blocks S1900-S1906, the system first checks a confidence level of the OCR at the Document Level in block S1908a or S1908b. If a confidence level less than a predetermined threshold, the user will be notified to create a reference manually in block S1910, a drag and tag feature may be disabled for such documents. The system will initiate and create pending task and a create reference queue for the concerned user in blocks S1912-S1916. The OCR status of the Document is OCR FAILED as provided in block S1926. A correspondence record status remain may remain ACTIVE as provided in block S1928.

The system may perform a series of tasks as part of a notification, recipient, outcome, and display routine based on the results OCRing a document and user input in response to the result of the OCR. In the notification phase, the system will provide a notification in block S1928 to a receipt who may be a user who has access to create reference record per block S1930. The notification may include a message, for example of "Manually Create Reference Record. OCR document quality below Threshold. Action Required by user." An outcome phase arising from the notification phase may involve the creation of a reference, no reference being found, or an invalid correspondence determination in which a correspondence is dropped. For reference creation, the system may close the notification even if one reference is created out of the document. Where a reference is not found, the system may add a Null Reference into Reference records in for the correspondence. For an Invalid Correspondence—Drop, the correspondence is dropped and the notification is closed. A user will be able to find out in a correspondence user interface 400 who has dropped a specific transaction and when (Updated by and date). As part of the notification, recipient, outcome, and display routine, the results of the OCR process may be displayed in an IDS review display in blocks S1912, S1914, or S1916.

The system may execute a document layout match procedure according to a document code in a correspondence record. Validation of a layout may be done through the Document Code on the Layout+Title of the document. In the event the is no match the system may change a status of a correspondence record status to ERROR—DOCUMENT TEMPLATE MISMATCH, and send an email to a user who submitted the correspondence record. If the record has been created by a crawler, the email may be sent to an IP Administrator.

In the event there is error as discussed above, a user may drop the transaction or not make a change. For the drop transaction, before the record is dropped, a double confirmation prompt may be displayed in the user interface 400 including information about the impacted transactions—references etc. With the no change option, if the OCR has extracted the data wrongly, the system may send a notification to user to create reference manually from this document, and create a pending task in create reference queue for the concerned user, and thereby complete the notification, recipient, outcome, and display routine based on user input. Alternatively, the system may disable a drag and tag functionality for the OCR version document.

ber. The application number match may be performed using a CONVERTED FORMAT. The attorney docket number match may be performed with an exact string.

In the event there is no match the system may change a status of a correspondence record status to ERROR-DOCUMENT APPLICATION NO. MISMATCH, and send an email to a user who submitted the correspondence record. If the record has been created by a crawler, the email may be sent to an IP Administrator.

In the event there is error as discussed above, a user may drop the transaction or not make a change. For the drop transaction, before the record is dropped, a double confirmation prompt may be displayed in the user interface 400 including information about the impacted transactions—references etc. With the no change option, if the OCR has extracted the data wrongly, the system may send a notification to user to create reference manually from this document, and create a pending task in create reference queue for the concerned user, and thereby complete the notification, recipient, outcome, and display routine based on user input. The notification being "Manually Create Reference Record. OCR document quality not good. Action Required by user." Alternatively, the system may disable a drag and tag functionality for the OCRed Document.

The system may setup an OCR mapping structure according to document codes of typical OCRed documents. Table 20 below provides an example of a setup for extracting data that may be standardized for all users (product level), and reconfigured according to user preference via a user interface 400 (client level).

TABLE 20

| | | | | | | |
|---|---|---|---|---|---|---|
| | | OCR Mapping by Document Code | | | | |
| Jurisdiction (LOV) | Document Code (LOV) | OCR (LOV - YES/ NO) - defined at Document Code Level | OCR Product (List of value) defined at Template Level | Template ID System generated defined at Template Level | Automated Data Extraction (LOV - YES /NO) defined at Document Code Level | TYPE OF DATA EXTRACTION defined at Template Level REF + System Extraction |
| US | 892 | YES | Flexi Capture | TID 1 | YES | AUTOMATIC |
| US | IDS | YES | Flexi Capture | TID 2 | YES | AUTOMATIC |
| US | IDS | YES | Flexi Capture | TID 3 | YES | AUTOMATIC |
| EP | Xxxx | YES | Flexi Capture | xxxx | YES | AUTOMATIC |
| WO | xxxx | YES | Flexi Capture | xxxxx | YES | AUTOMATIC |
| US | NOA | YES | Flexi Capture | TID 4 | NO | MANUAL |
| US | CTNF | YES | Flexi Capture | TID 5 | NO | MANUAL |
| US | 1449 | NO | Not Applicable | Not Applicable | NO | Not Applicable |
| US | ISSUE.NTF | NO | Not Applicable | Not Applicable | NO | Not Applicable |
| JP | OFFICE ACTION | YES | Flexi Capture | Not Applicable | NO | MANUAL |

The system may extract an application number a document to be matched with the application number on the correspondence record. If the application number is not available, the system may match the attorney docket num- The system may send document codes to an OCR queue in accordance with the following exemplary rules:

1. OCR—YES/Automated Extraction—YES→Document Codes would be sent to OCR Queue for recognition (convert to searchable PDF) and data extraction. Data would be extracted automatically from this template.
2. OCR—YES/Automated Extraction—NO→Document Codes would be sent to OCR Queue for recognition ONLY. (Convert to searchable PDF). Extraction of data will be Manual from this template.
3. OCR—NO/Extraction—NO→Document Codes are NOT SENT to OCR Queue.
4. OCR—NO/Extraction—NO→Document Codes are NOT SENT to OCR Queue.
5. OCR—NO/Extraction—YES→Combination will never exist
6. If Extraction—YES, OCR must be YES and Template ID must have a value Table 21 below provides an example of a setup for extracting data according to document codes as configured by a user via a user interface 400.

TABLE 21 user Selected OCR Code Mapping

| Document Code (Where OCR = YES) | Switch ON/OFF |
| --- | --- |
| 892 | ON |
| IDS | ON |
| EP SEARCH REPORT | ON |
| WO SEARCH REPORT | ON |

In table 21, all document codes that have been set as OCR=YES and will be available on the user interface 400 to be switched ON/OFF by a user. If an OCR value is OFF at client level and ON at product level, the document code will not be sent to OCR Queue. If OCR value is ON at client level and ON at product level, the document code will be sent to OCR Queue.

The system may access multiple templates configured for document codes which can be used by OCR Engines. Output from templates may be downloaded into tables that are mapped to the data type extracted. The system may replace an OCR Engine another engine with an input process and output process remaining the same. The system may execute rules to selectively process documents for data extraction or send documents to an OCR queue for converting into searchable PDF based on document codes. In addition, the system may operate the OCR queue to prioritize urgent correspondence requests.

There may be a situation in which a document code from a correspondence store is not sent to the OCR QUEUE (i.e. OCR—NO). For example when 1449 document code is received in correspondence store, notification may be sent to a user for Updating status of references in 1449 pending status. This notification can be viewed in IDS Management>My Dashboard>1449 Notification. When and issue notification document code is received in correspondence store, IDS relevant status for the application is.

The system may perform an OCR validation process based on a template match according to document code. For example, the system may use a left bottom corner of a first Page for Document Code PTO-892 for a template match. Other document codes and specific matching mechanism may be used.

Figure 20:
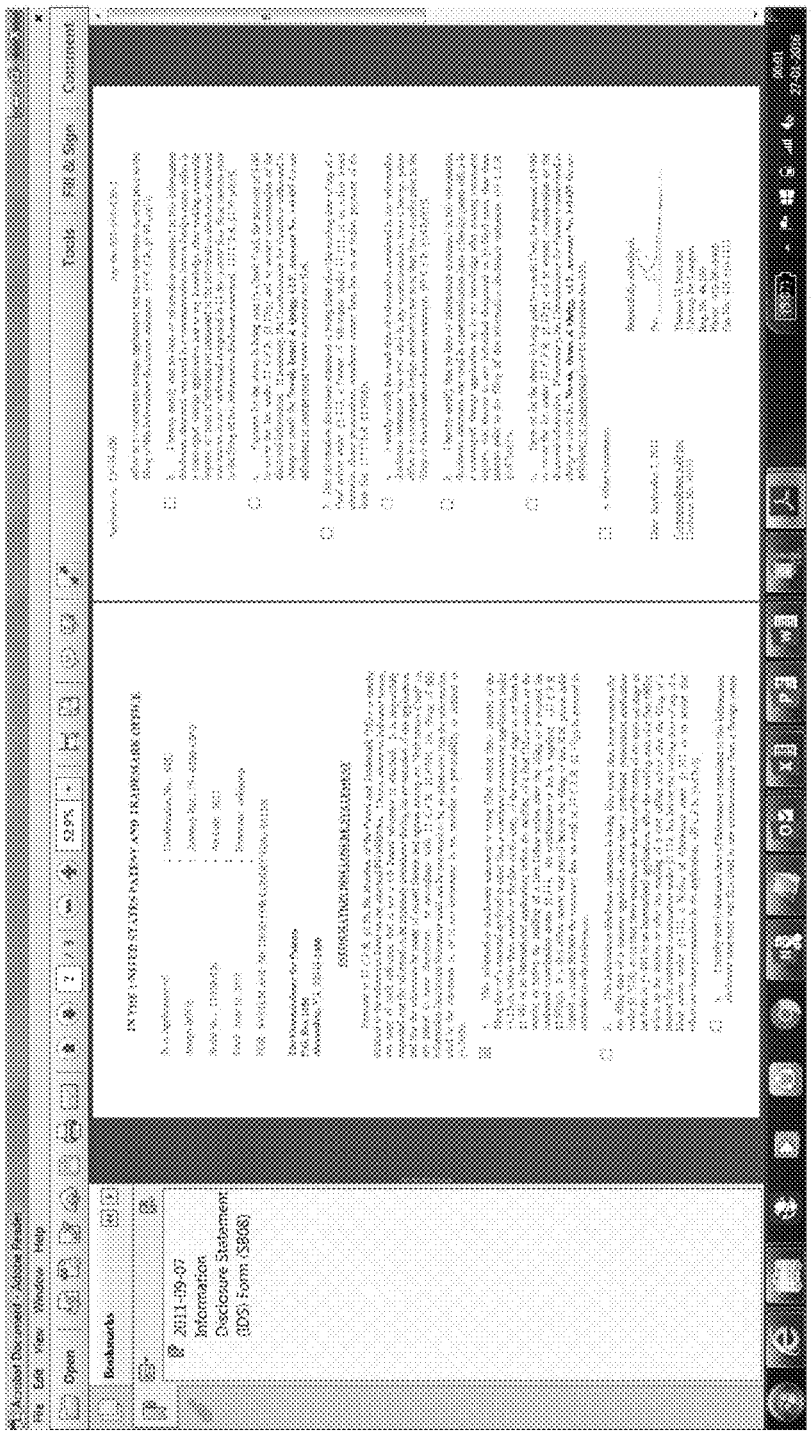
FIG. 20 is a diagram of an example interface according to aspects of the present disclosure.
Figure 21:
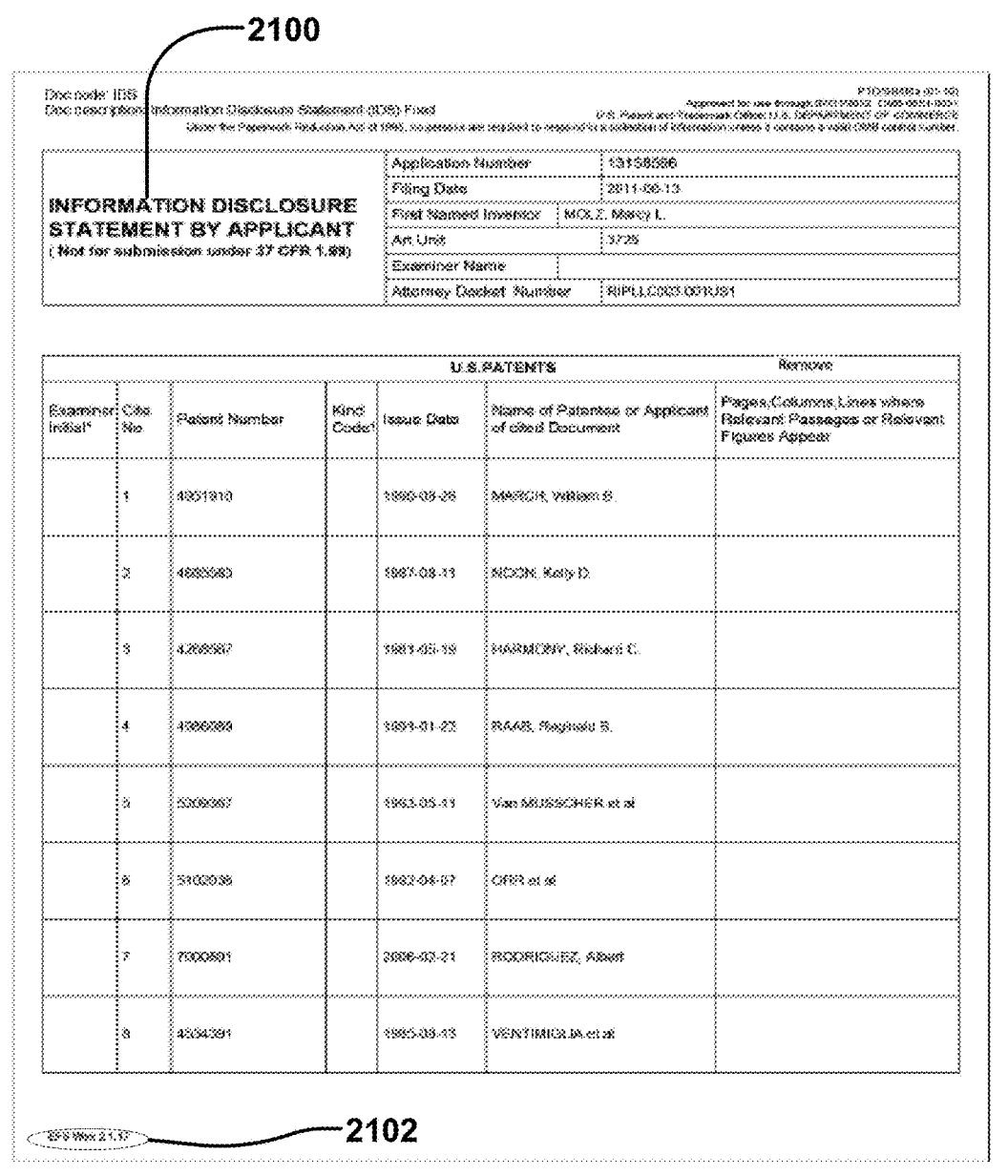

According to another aspect of the present disclosure the system may recognize a document as an IDS according to a template match. An IDS document may contain some pages of communication before the IDS page as illustrated in FIG. 20. The system recognize this document as an "IDS with communication." The actual IDS will start in such cases after the communication, and a TEMPLATE MATCH will be done for the actual IDS page as illustrated in FIG. 21. The system may match the template based on the presence of a string including "Information Disclosure Statement By Applicant" 2100 on a top left side of the first page and string including "EFS Web' code" 2102 at the bottom (left corner).

Figure 22:
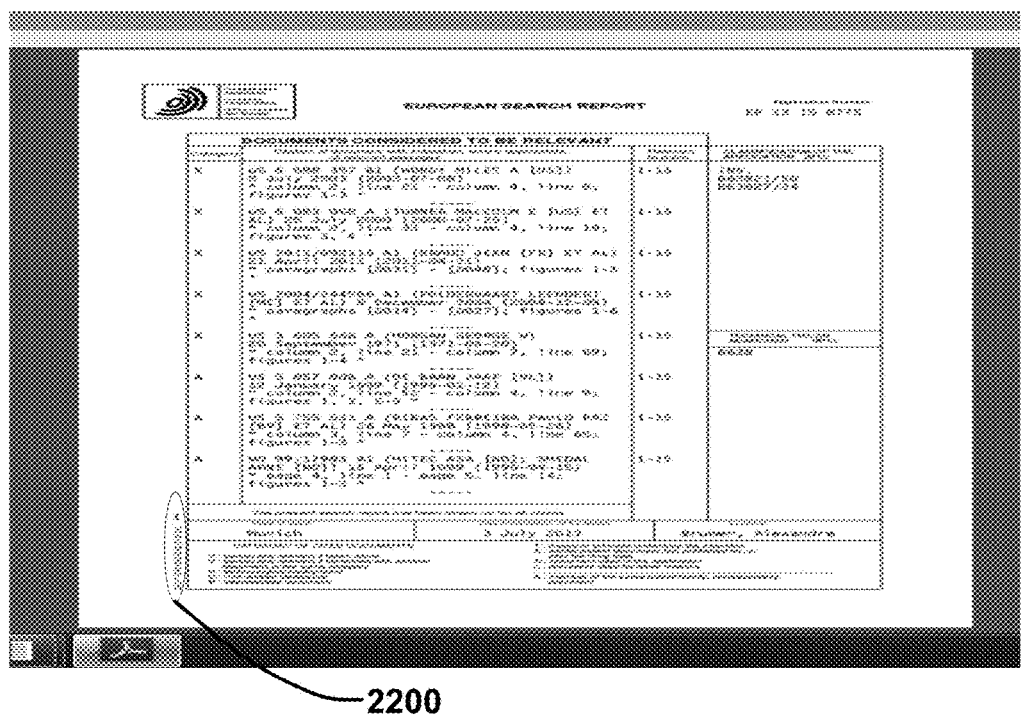
FIG. 22 is a diagram of an example interface according to aspects of the present disclosure.
Figure 23:
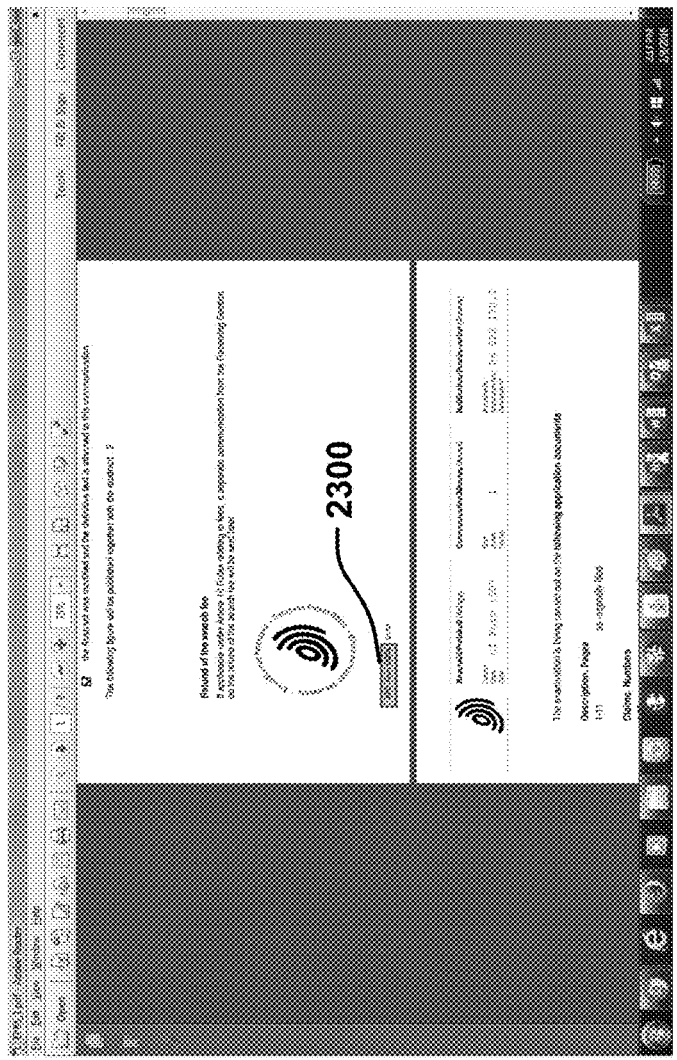
FIG. 23 is a diagram of an example interface according to aspects of the present disclosure.
Figure 24:
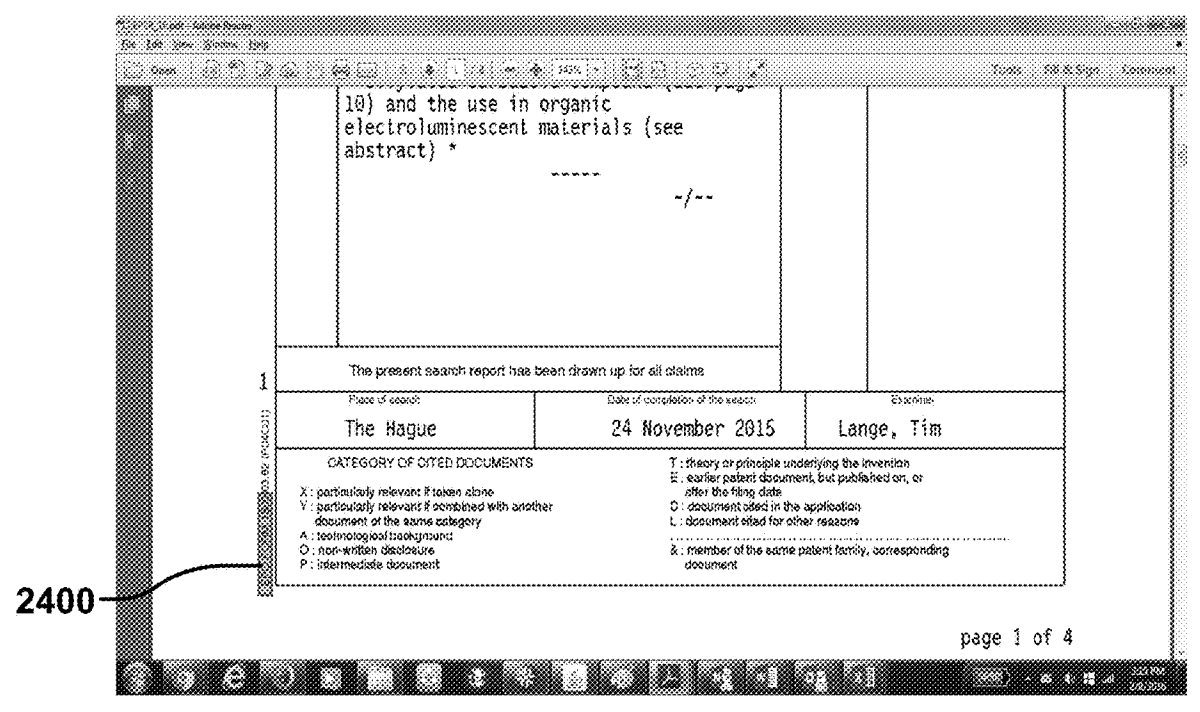

According to another aspect of the present disclosure the system may recognize a document as an EP Search Report according to a template match. A first template in the system may correspond to an EP Search Report—EPO Form 1503, and include criteria for a left bottom (next to table border)—EPO Form 1503. The EPO Form 1503 may several pages in this document which are Annex to the search report having a different code in EPO FORM P0459 as illustrated in FIG. 22. The system can recognize these pages do not have to be OCRed. A second template in the system for an EP Search Report may correspond to a document which comes with a Communication the search string "EPO Form 1507N" 2300 in the left bottom, as illustrated in FIG. 23. A reference will be fetched from the search report only. That has code "EPO Form 1503" 2400 as illustrated in FIG. 24.

Figure 25:
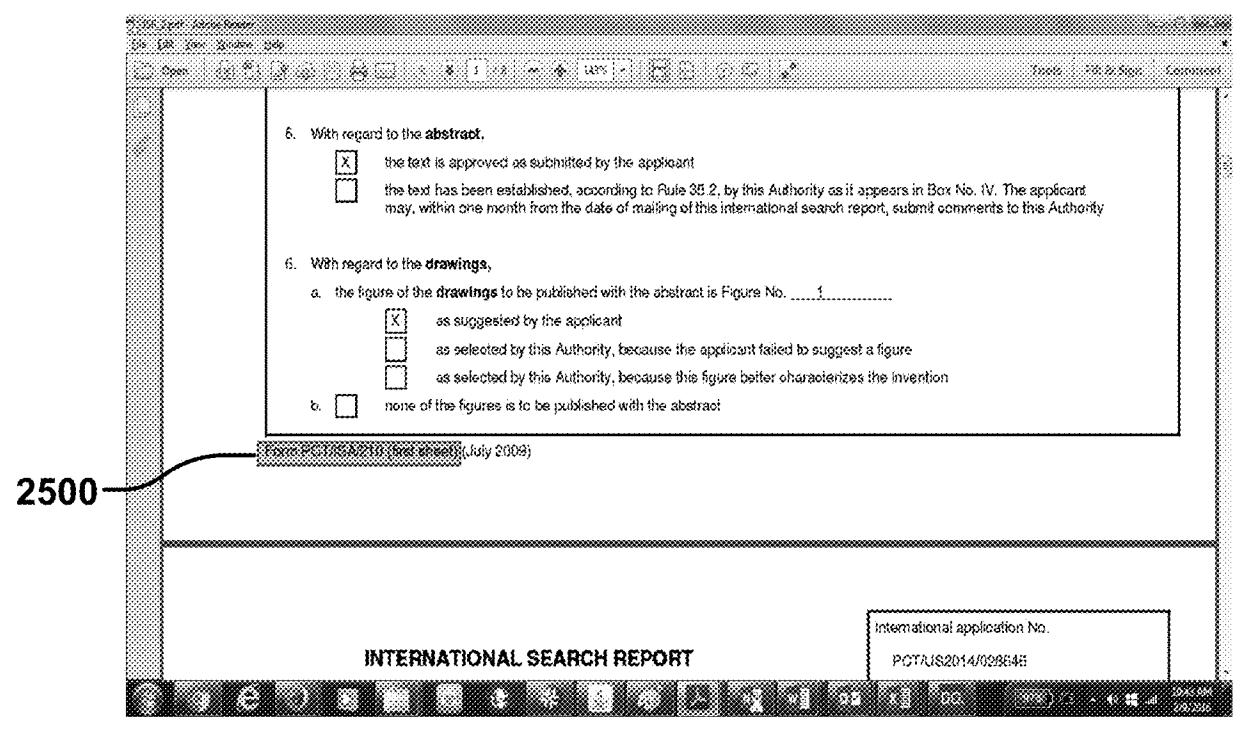
Figure 26:
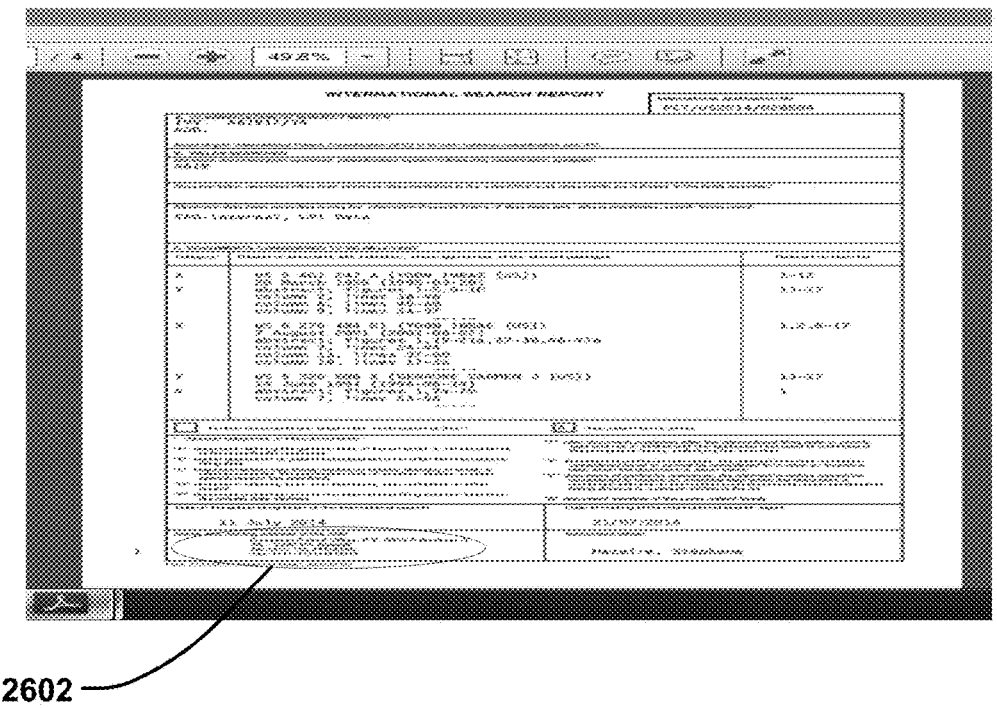
FIG. 26 is a diagram of an example interface according to aspects of the present disclosure.

According to another aspect of the present disclosure the system may recognize a document as an WO Search Report according to a template match. A WO Search Report document contains some pages of communication before the Search Report page. An actual WO Search report will start in such cases after the communication and the template match will be carried out for the actual WO Search Report page. First page contains string "Form PCT/ISA/210 (first sheet)" 2500 as illustrated in FIG. 25. This string may be used for template match. A reference will be extracted from the page that contains string at Left bottom of the page—"Form PCT/ISA/210 (second Sheet)"/"Form PCT/ISA/210 (continuation of second Sheet)," 2600 as illustrated in FIG. 26.

The system may extract data as part of an OCR operation in recognition of various document codes. According to one aspect of the represent disclosure the system may recognize more than one template for a given document code. However, each Document Code-Template combination would be unique. The system may returned as part of an OCR process, data types including: System Data; Reference Data with Section Names in the document; Searchable PDF (If Searchable PDF is available, same should be made available on UI subject to OCR confidence level above threshold and OCR validation result PASS. If Searchable PDF is not available, original PDF should be made available on UI subject to OCR confidence level above threshold and OCR validation result PASS; <Data Type 1> for Future Usage; <Data Type 2> for Future Usage; <Data Type 3> for Future Usage; and <Data Type 4> for Future Usage.

Table 22 below provides an example of a table structure for a capture via OCR of system data extracted from various templates.

TABLE 22

OCR Capture From Templates - System Data

| Doc ID from Correspondence Store | ID1 | ID2 | ID3 |
| --- | --- | --- | --- |
| Jurisdiction | US | US | US |
| Document Code | 892 | IDS | IDS |
| Template ID | TID 1 | TID 2 | TID 3 |
| Application No | Mapped to | Mapped to | Mapped to |

TABLE 22-continued

OCR Capture From Templates - System Data

| Doc ID from Correspondence Store | ID1 | ID2 | ID3 |
|---|---|---|---|
| Filing Date | Mapped to Template | Mapped to Template | Mapped to Template |
| First Name Inventor | Mapped to Template | Mapped to Template | Mapped to Template |
| Attorney Docket Number | Mapped to Template | Mapped to Template | Mapped to Template |
| Confirmation Number | Mapped to Template | Mapped to Template | Mapped to Template |
| Examiner Name | Mapped to Template | Mapped to Template | Mapped to Template |
| Art Unit | Mapped to Template | Mapped to Template | Mapped to Template |
| Mailing Date | Mapped to Template | Mapped to Template | Mapped to Template |
| Customer Number | Mapped to Template | Mapped to Template | Mapped to Template |
| Entity | Mapped to Template | Mapped to Template | Mapped to Template |
| Title | Mapped to Template | Mapped to Template | Mapped to Template |

Figure 27:
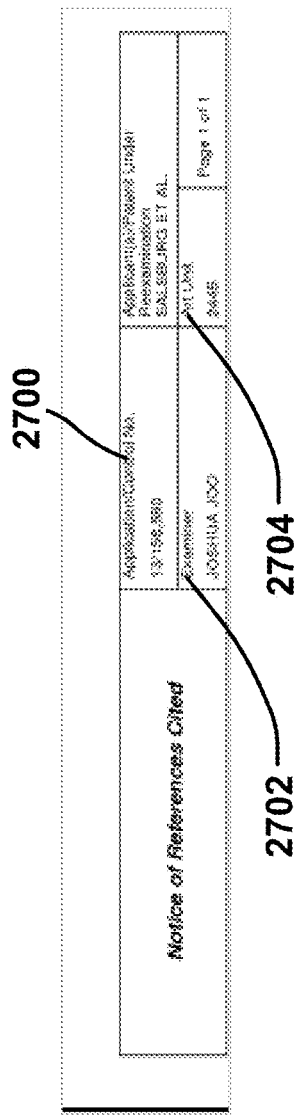
FIG. 27 is a diagram of an example interface according to aspects of the present disclosure.

Table 23 below provides an exemplary Template Mapping for system Data related to documents having a Doc Code 892, examples of which are illustrated in FIGS. 21 and 27.

TABLE 23

892 Template Mapping

| Doc ID from Correspondence Store | |
|---|---|
| Jurisdiction | |
| Document Code | 892 |
| Template ID | Template 1 |
| Application No | <Application/Control No.> 2702 |
| Filing Date | |
| First Name Inventor | |
| Attorney Docket Number | |
| Confirmation Number | |
| Examiner Name | <Examiner> 2700 |
| Art Unit | <Art Unit> 2704 |
| Mailing Date | |
| Customer Number | |
| Entity | |
| Title | |

Table 23 below provides an exemplary Template Mapping for system Data related to documents having a Doc Code IDS, an example of which being illustrated in FIG. 22.

TABLE 24

IDS Template Mapping

| Doc ID from Correspondence Store | |
|---|---|
| Jurisdiction | |
| Document Code | IDS |
| Template ID | Template 1 |
| Application No | <Application Number> |
| Filing Date | <Filing Date> |
| First Name Inventor | <First Named Inventor> |
| Attorney Docket Number | <Attorney Docket Number> |
| Confirmation Number | |
| Examiner Name | <Examiner Name> |
| Art Unit | <Art Unit> |
| Mailing Date | |
| Customer | Number |
| Entity | |
| Title | |

Figure 28:
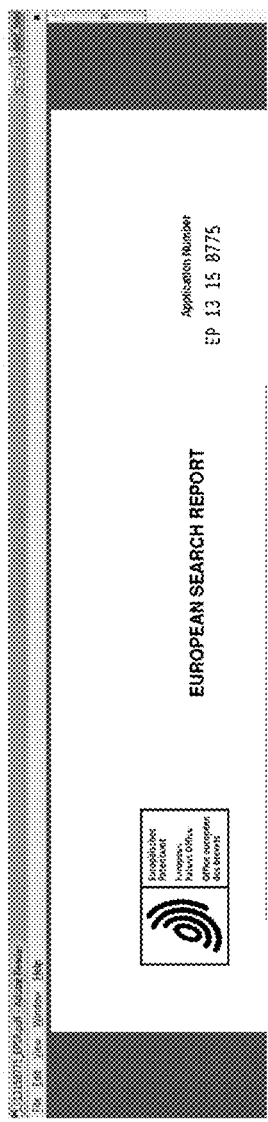
FIG. 28 is a diagram of an example interface according to aspects of the present disclosure.

Table 25 below provides an exemplary Template Mapping for Data related to documents having a Doc Code EP Search Report, examples of which being illustrated in FIGS. 23 and 28.

TABLE 25

EP Search Report Template Mapping

| Doc ID from Correspondence Store | |
|---|---|
| Jurisdiction | |
| Document Code | EP Search Report |
| Template ID | Template 1 |
| Application No | <Application Number> |
| Filing Date | |
| First Name Inventor | |
| Attorney Docket Number | |
| Confirmation Number | |
| Examiner Name | |
| Art Unit | |
| Mailing Date | |
| Customer Number | |
| Entity | |
| Title | |

Figure 29:
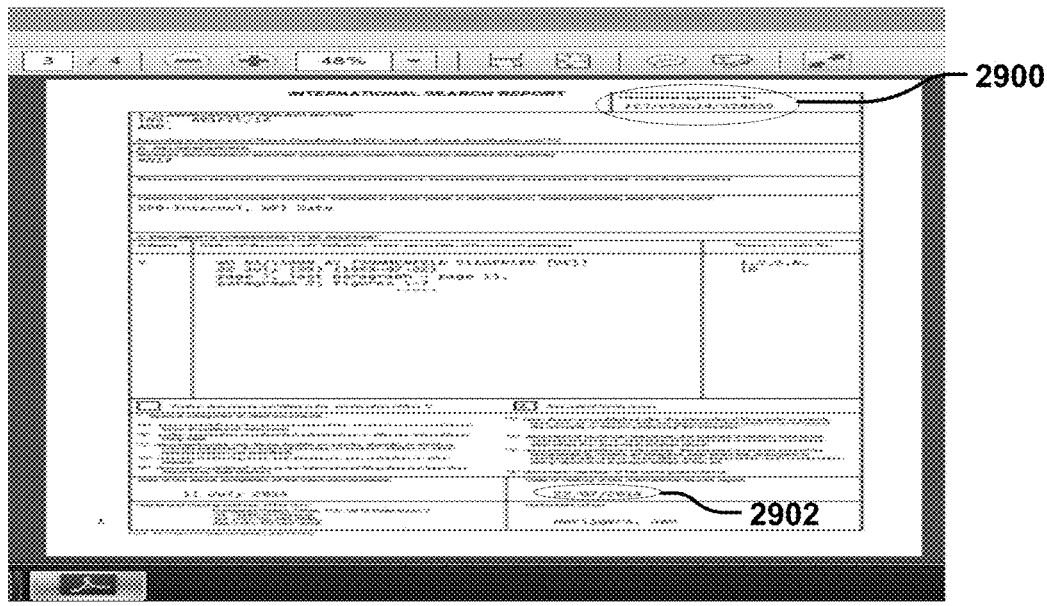
FIG. 29 is a diagram of an example interface according to aspects of the present disclosure.

Table 26 below provides an exemplary Template Mapping for systems related to documents having a Doc Code WO Search Report, examples of which being illustrated in FIGS. 24 and 29.

TABLE 26

WO Search Report Template Mapping

| Doc ID from Correspondence Store | |
|---|---|
| Jurisdiction | |
| Document Code | WO Search Report |
| Template ID | Template 1 |
| Application No | <Application Number> 2900 |
| Filing Date | |
| First Name Inventor | |
| Attorney Docket Number | |
| Confirmation Number | |
| Examiner Name | |
| Art Unit | |
| Mailing Date | <mailing date> 2902 |
| Customer Number | |
| Entity | |
| Title | |

The system may extract data via template matching according to the following exemplary steps:
Step 1: Reference Data extracted from each template would be generated as a XML File. The system may extract data corresponding to the following exemplary data structure scheme:

\<Client ID\> System generated Client ID for each client installation
\<Document Description\> VALUE: For the document, from correspondence Base Table
\<Template ID\> VALUE: For the Template. Document Code—Template ID is an Unique combination
\<Request Type\> VALUE: Fetch Reference
\<Source\> VALUE: OCR
\<Jurisdiction\> VALUE: For the document, from correspondence Base Table
\<Mailing Date\> VALUE: For the document, from correspondence Base Table
\<Application Number\> VALUE: For the document, from Base Table
\<Filing Date\> VALUE: For the document, from Base Table
\<Section\> VALUE: SECTION1—Section Name Extracted from template
  \<Sub Section\> VALUE: SUB SECTION 1—Sub Section Name Extracted from template
  \<Ref\> VALUE: REF 1—Reference String extracted from the template
    \<Additional Info\> VALUE: INFO 1—Additional Information for the reference
    \<Additional Info\> VALUE: INFO 2—Additional Information for the reference
  \<Ref\> VALUE: REF 2—Reference String extracted from the template
  \<Ref\> VALUE: REF 3—Reference String extracted from the template
\<Section\> VALUE: SECTION 2—Section Name Extracted from template
  \<Ref\> VALUE: REF 4—Reference String extracted from the template
    \<Additional Info\> VALUE: INFO 3—Additional Information for the reference
    \<Additional Info\> VALUE: INFO 4—Additional Information for the reference
  \<Ref\> VALUE: REF 5—Reference String extracted from the template
  \<Ref\> VALUE: REF 6—Reference String extracted from the template Step 2: Populate REFERENCE EXTRACT from XML FILE to IDS SYSTEM QUEUE—MAPPING OF XML REFERENCE EXTRACT to IDS SYSTEM QUEUE according to the following exemplary process:

1. Each Reference String is inserted into the IDS System Queue as a separate Row
2. XML Reference Extract for a document is populated into IDS System Queue, when OCR Validation—Application Number Match with correspondence record is successful
3. While Inserting the record, if Document code is 892 as illustrate in FIG. 29: Check whether for this application number, a document (code: CTEQ or CTFR or CTNF or CTRS) is available in the correspondence base table with the same mailing date. If not available, insert an entry in IFW QUEUE: Mailing date=892 mailing date, application number=all Table 27 below provides an exemplary set of mapping rules for different fields of an XML file discuss above.

TABLE 27

| IDS System Queue Field Name | XML File VALUES | | Mapping Rule |
|---|---|---|---|
| Client ID | C1 | C1 | \<Client ID \> This ID is unique to every client IDS System and will come as a part of incoming request |
| Client Request ID | R123 | R124 | SYSTEM SEQUENCE: Generated for each Request |
| Request ID | C1_R123 | C1_R124 | Client ID_Client Request ID |
| Request Type | FETCH REFERENCE | FETCH REFERENCE | \<Request Type\> FETCH REFERENCE - Same value for all requests coming from OCR Template |
| Source | OCR | OCR | \<Source\> OCR - Same value for all requests coming from OCR Template |
| Jurisdiction | US | US | \<Jurisdiction\> Value fetched for the document from correspondence base table |
| Application Number | U5123 | U5123 | \<Application Number\> Value fetched for the document |
| Application Date | Application Filing Date | Application Filing Date | \<FilingDate\> Value fetched for the document |
| Document Description | XXXXXX | XXXXXXXX | \<Document Description\> Value fetched for the document from correspondence base table |
| Mailing Date | Document Mailing Date | Document Mailing Date | \<Mailing Date\> Value fetched for the document from correspondence base table |
| Template ID | Template id | Template id | \<Template ID\> Document Code-Template ID would be a unique combination |
| Document Section | Section1:Sub Section1 | Section1:Sub Section1 | Section and subsection information colon (:) separated |
| Publication | REF 1: INFO 1: | REF2 | \<Ref\> |

TABLE 27-continued

XML File Mapping Rules

| IDS System Queue Field Name | XML File VALUES | | Mapping Rule |
|---|---|---|---|
| Number | INFO 2 | | Reference String (This Field should be long enough to contain up to 20 words) |
| Publication Kind Code | NULL | NULL | |
| Family Id | NULL | NULL | |
| Time Stamp | Time of Request creation | Time of Request creation | SYSTEM GENERATED. Data Verifier System will serve the requests FIFO |
| Status | NULL | NULL | Value populated by Data Verifier System |

An example of data that may be extracted for an 892 according above data fields/source of the XML includes:
 <Document Description> 892
 <Template ID> Template 1
 <Request Type> VALUE: Fetch Reference
 <Source> VALUE: OCR
 <Jurisdiction> VALUE: For the document, from correspondence Base Table
 <Mailing Date> VALUE: For the document, from correspondence Base Table
 <Application Number> VALUE: For the document, from Base Table
 <Filing Date> VALUE: For the document, from Base Table
  <Section> U.S. PATENT DOCUMENTS
  <Ref> values in COLUMN 3—under header DOCUMENT NUMBER (Multiple values would be available. Ignore fields that have only value "US-")
  <Section> FOREIGN PATENT DOCUMENTS
  <Ref> values in COLUMN 3—under header DOCUMENT NUMBER (Multiple values would be available. Ignore fields that have only value "US-")
  <Section> NON-PATENT DOCUMENTS
  <Ref> values in COLUMN 3—Under header Include as applicable: (Multiple values would be available. Ignore fields that have only value "US-")

Figure 31:
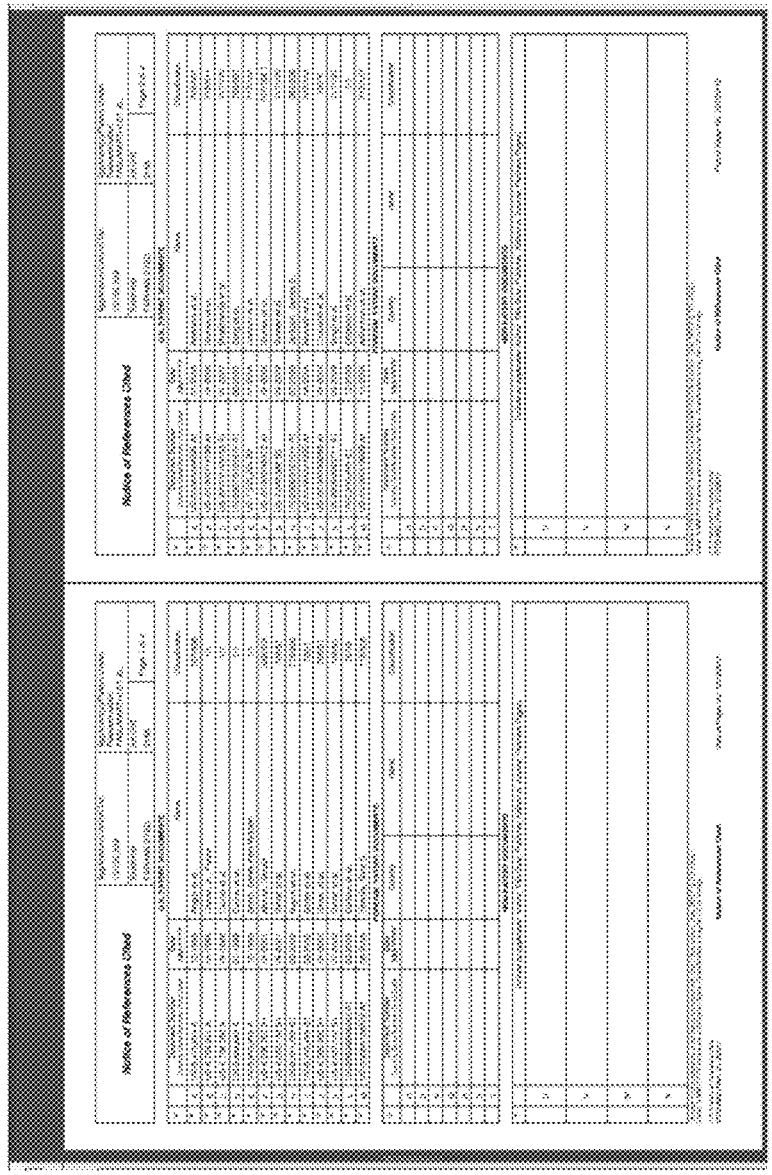
FIG. 31 is a diagram of an example interface according to aspects of the present disclosure.

The above data structure would repeat for an 892 having multiple pages as illustrated in FIG. 31

An example of a data structure that may be extracted for an IDS according to the above data structure scheme for the XML includes:
 <Client ID> System generated Client ID for each client installation
 <Document Description> IDS
 <Template ID> Template 1
 <Request Type> VALUE: Fetch Reference
 <Source> VALUE: OCR
 <Jurisdiction> VALUE: For the document, from correspondence Base Table
 <Mailing Date> VALUE: For the document, from correspondence Base Table
 <Application Number> VALUE: For the document, from Base Table
 <Filing Date> VALUE: For the document, from Base Table
  <Section> U.S. PATENTS
  <Ref> values in COLUMN 3—under header PATENT NUMBER (Multiple values would be available)
  <Section> U.S. PATENT APPLICATION PUBLICATIONS
  <Ref> values in COLUMN 3—under header PUBLICATION NUMBER (Multiple values would be available)
  <Section> FOREIGN PATENT DOCUMENTS
  <Ref> values in COLUMN 3—Under header FOREIGN DOCUMENT NUMBER: (Multiple values would be available.)
   <Additional Info> values in COLUMN 4—Under header COUNTRY CODE: (Multiple values would be available.)
   <Additional Info> values in COLUMN 5—Under header KIND CODE: (Multiple values would be available.)
  <Section> NON PATENT LITERATURE DOCUMENTS
  <Ref> values in COLUMN 3—Under header INCLUDE NAME OF THE AUTHOR (Multiple values would be available.)

The above data structure would not repeat for an IDS because data flows to next page (does not repeat)

An example of a data structure that may be extracted for an EP Search Report according to the above data structure scheme for the XML includes:
 <Client ID> System generated Client ID for each client installation
 <Document Description> EP Search Report
 <Template ID> Template 1
 <Request Type> VALUE: Fetch Reference
 <Source> VALUE: OCR
 <Jurisdiction> VALUE: For the document, from correspondence Base Table
 <Mailing Date> VALUE: For the document, from correspondence Base Table
 <Application Number> VALUE: For the document, from Base Table
 <Filing Date> VALUE: For the document, from Base Table
  <Section> Documents Considered to be Relevant
   <Ref> values in COLUMN 2—under header Citation of Document with (Multiple values would be available)

The above data structure would repeat for an EP Search Report having multiple pages.

An example of a data structure that may be extracted for a WO Search Report according to the above data structure scheme for the XML includes:
 <Client ID> System generated Client ID for each client installation
 <Document Description> WO Search Report
 <Template ID> Template 1
 <Request Type> VALUE: Fetch Reference
 <Source> VALUE: OCR <Jurisdiction> VALUE: For the document, from correspondence Base Table
<Mailing Date> VALUE: For the document, from correspondence Base Table
<Application Number> VALUE: For the document, from Base Table
<Filing Date> VALUE: For the document, from Base Table
<Section> Documents Considered to be Relevant
<Ref> values in COLUMN 2—under header Citation of Document, with (Multiple values would be available)

The above data structure would not repeat for a WO Search Report having multiple pages for pages 1 and 2, but would repeat after page 2.

According to certain aspects of the present disclosure, the system may perform a duplicate check of NPL references. Exemplary processes the system may execute for a duplicate check may include breaking down strings into words for comparison and matching. As a result of the comparison process the system may determine a relationship between, for example, a first NPL reference ("N1") and a second NPL reference ("N2") is one of a Superset/Subset ("Sp/Sb"), NOT EQUAL TO ("NET"), or a Sp/Sb/NET relationship. According to one aspect of the present disclosure, the system may determine there is a Sp/Sb relationship where for example, N1 includes at least all of the words of N2, i.e. N1 is a superset and N2 is a subset of N1. Where it is determined N1 does not include at least all of the words of N2, the system will determine there is a NET relationship between N1 and N2 as to N1. However, N2 may still include all the words in N2, and therefore the system may determine the Sp/Sb/NET relationship exists between N1 and N2.

During a matching process, the system may employ word match % thresholds in combination with a relationship determination to determine if a reference is or is not a duplicate of another reference, or if a user should be provided with a prompt indicating the two references may be duplicates. The system may determine a match % between two references based on the relationship there between.

According to one aspect of the present disclosure, for a reference that is a superset to another reference, a match % is determined according the following formula:

$$\frac{Sp\text{-}w\# - Sb\text{-}w\#}{Sp\text{-}w\#} \times 100$$

where:

$Sp\text{-}w\#$ = Total number of words in Superset reference $Sb\text{-}w\#$ = Total number of words in Subset reference According to another aspect of the present disclosure, for a reference that is a subset to another reference, a match % is determined according the following formula:

$$\frac{Sb\text{-}w\# - Sp\text{-}w\#}{Sb\text{-}w\#} \times 100$$

According to another aspect of the present disclosure, a match % for a reference, for example N1 as mentioned above, with a NET relationship with, for example N2, is determined according the following formula:

$$\frac{cw\#}{N1\text{-}w\#} \times 100$$

where:

$cw\#$ = Total number of common words between $N1$ and $N2$ $N1\text{-}w\#$ = Total number of words in $N1$ Conversely, if N2 was NET to N1, a match % of N2 would be determined according to the following formula:

$$\frac{cw\#}{N2\text{-}w\#} \times 100$$

where:

$N2\text{-}w\#$ = Total number of words in $N1$

According to another aspect of the present disclosure, where there is an Sp/Sb relationship and a match %>50%, the system determines a there is duplicate reference, otherwise if the match %<50%, the system determines there is a new reference. In case of a NET relationship, if match %>80%, the system determines a there is duplicate reference, otherwise a new reference determination is made. If both an Sp/Sb relationship and a NET relationship are present, and a match %>respective threshold for each relationship, the Superset/subset relationship with take precedence. If both an Sp/Sb relationship and a NET relationship are present and the Sp/Sb match %<threshold, and the NET match %>threshold, the NET relationship takes precedence. If both an Sp/Sb relationship and a NET relationship are present and a match %<respective threshold for each relationship, a new reference determination is made.

The above rules are illustrated in the exemplary scenarios which follow:

Scenario 1—N1 is NPL string being entered into reference base table 300; only one New REF NPL (N2) is present in base table.

Process:
Split String N1 to words/Word Set (Remove special characters except. AND -);
Split String N2 to words/Word Set (Remove special characters except. AND -);
Check if N1 is Duplicate with respect to N2 by comparing words of each String irrespective of word sequence of words.

Potential Conditions and System Determination Results:
Case 1: Condition—N1 exactly matches with N2; Result—N1 is entered as DUPLICATE of N2
Case 2: Condition—N1 is subset of N2 (All words of N1 are present in N2 and All words of N2 are NOT present in N1)
If 100*(N2-w#−N1-w#)/N2-w#<=50%; Result—N1 is entered as DUPLICATE of N2;
If 100*(N2-w#−N1-w#)/N2-w#>50%; Result—N1 is entered as NEW REF;
Case 3: Condition—N1 is Superset of N2 (All words of N1 are not present in N2 however All words of N2 are present in N1).
If 100*(N1-w#−N2-w#)/N1-w#<=50%; Result—Send NPL DUPLICATE CHECK Notification to user.
If 100*(N1-w#−N2-w#)/N1-w#>50%; Result—N1; Result is entered as NEW REF.

Case 4: Condition—If N1 is NET as to N2 (N1 is neither a Subset nor a Superset of N2)
If 100*(cw#) /N1-w#>80%; Result—Send NPL DUPLICATE CHECK Notification to user.
If 100*(cw#) /N1-w#<=80%; Result—N1 is entered as NEW REF.

Scenario 2—N1 is NPL String being entered into reference base table 300;
More than One New REF NPL is present in base table: e.g. N2, N3
Process:
Split String N1 to words/Word Set (Remove special characters except. AND -);
Split String N2 and N3 to words/Word Set (Remove special characters except. AND -);
Check if N1 is Duplicate with respect to N2, N3, N4 by comparing words of each String.

Case 1: Condition—If N1 exactly matches with N2 or N3 or N4; Result—N1 is entered as DUPLICATE of N2 OR N3 OR N4.

Case 2: Condition—If N1 is subset of All notifications—N2, N3, N4
Find 100*(Nx-w#–N1-w#)/Nx-w#—For each Notification
If the % for All NPLs are NOT Same (i.e. some are same and some different or all are different), then take the Lowest %;
If the lowest % is <=50%; Result—N1 is entered as DUPLICATE of N2 or N3 (corresponding to the lower %).
If the lowest % is >50%; Result—N1 is entered as a NEW REF.
If the % for All NPLs are same then compare for All Notifications (N2, N3, N4): Self Citation creation date (If reference type is self-citation) and Document Mailing Date (if reference type is PTO Correspondence) and select the NPL Reference with the earliest Date. If earliest Self Citation Creation date and Document Mailing Date are same on more than one records, find out the record which has earliest RECORD CREATION DATE+TIME STAMP;
If the % is <=50%; Result—Create N1 as DUPLICATE of N2 or N3 or N4 (Corresponding to the NPL Reference with the earliest Date);
If the % is >50%; Result—N1 is entered as NEW REF Case 3: If N1 is superset of All notifications—N2, N3, N4
Find 100*(N1-w#–Nx-w#)/Nx-w#—For each Notification;
If the % for All NPLs are NOT Same (i.e. some are same and some different or all are different) then take the Lowest %;
If the lowest % is <=50%; Result—Send NPL DUPLICATE CHECK Notification to user for N2 or N3 or N4 (corresponding to the lower %)
If the lowest % is >50%; Result—N1 is entered as a NEW REF
If the % for All NPLs are same then Compare for All Notifications (N2, N3, N4): Self Citation creation date (If reference type is self-citation) and Document Mailing Date (if reference type is PTO Correspondence) and select the NPL Reference with the earliest Date
If the % is <=50%; Result—Send NPL DUPLICATE CHECK Notification to user for N2 or N3 or N4 (Corresponding to the NPL Reference with the earliest Date)
If the % is >50%; Result—N1 is entered as NEW REF Case 4: If N1 is subset of some notifications and Superset of Some notifications
If % for ALL is <50% then Take the Lowest %;
If the lowest % belongs to a NPL (Say N2) and N1 is subset of N2; Result—Then Create N1 as DUPLICATE of N2.
If the lowest % belongs to a NPL (Say N2) and N1 is superset of N2; Result—Send NPL DUPLICATE CHECK Notification to user for N2

If % for ALL is same and=50%
If there is one NPL which is subset of N1; Result—Send NPL DUPLICATE CHECK Notification for this NPL to user;
If there are multiple NPLs which are subsets of N1 then:
Compare for All these Notifications (N2, N3, N4): Self Citation creation date (If reference type is self-citation) and Document Mailing Date (if reference type is PTO Correspondence) and select the NPL Reference with the earliest Date. If earliest Self Citation Creation date and Document Mailing Date are same on more than one records, find out the record which has earliest RECORD CREATION DATE+TIME STAMP; and
Result—Send NPL DUPLICATE CHECK Notification to user for N2 or N3 or N4 (Corresponding to the NPL Reference with the earliest Date).

If % for ALL is >50%; Result—Create N1 as NEW REF
If % for Some NPLs are <50% and for some >50% then take the Lowest % of all NPLSs that are <50%;
If the NPL is Subset of N1; Result—Send NPL DUPLICATE CHECK Notification to user for this NPL;
If the NPL is Superset of N1; Result—Create N1 as DUPLICATE of this NPL Case 5: If N1 is subset OR Superset of some notifications and NOT EQUAL to others: If both Superset/Subset relationship and NOT EQUAL TO relationship present, and both cases match %>threshold; Result—Superset/subset relationships take precedence.
If both Superset/Subset relationship and NOT EQUAL TO relationship present, and SUPRESET/SUBSET match %<threshold and NOT EQUAL TO match %>Threshold; Result—NOT EQUAL TO relationship takes precedence.
If both Superset/Subset relationship and NOT EQUAL TO relationship present, and both cases match %<threshold; Result—Ref created as NEW REF.

One or more documents uploaded into a correspondence store 3200 may be processed through OCR (OCR—Sprint 3). Documents may be input in block to the correspondence store 3200 manually or automatic by accessing, for example, the USPTO or EPO (databases/websites?). Following an OCR processing of a document, automatic reference extraction in block may be completed by the system for some document codes. If the OCR quality (confidence level) is low for one of these "automatic" documents, then the document may be queued and a notification sent to a user ("CREATE MANUAL REFERENCE") for manual reference extraction. Documents which are not setup for automatic reference extraction are queued for processing manually to extract reference data and a notification sent to the user. The system may perform the automatic reference extraction process on multiple document types (codes) from multiple jurisdictions. Table 28 provided below is an example of a table setup by the system which includes document codes corresponding to respective document types that the system may automatically extract reference data from. Table 28 includes information with respect to the document code and the jurisdiction of each respective document type and may be configured and reconfigured by the system to include other/new document types. The table may be created by Sprint 2 and values may be defined by sprint 3 of the system.

TABLE 28

Exemplary Table of Automatic Reference Extraction Documents

| Document Code | JURISDICTION |
|---|---|
| 892 | US |
| 1449 | US |
| CTEQ | US |
| CTFR | US |
| CTNF | US |
| CTRS | US |
| N417 | US |
| NOA | US |
| NPL | US |

The system will que these document for OCR after the document has been successfully uploaded. The system will update the above table as other/new document types are mapped for OCR.

Correspondences with any document code not recognized by the system will trigger a notification to a user for manual reference creation. More specifically, the notification to create a reference manually will be triggered based on the OCR PROCESS STATUS of the document in OCR_PROCESS_DATA_EXTRACTION table. Notification is triggered when OCR PROCESS STATUS="OCR done" or "OCR Failed". The OCR PROCESS STATUS value is sent along with the notification. The system will perform the notification, recipient, outcome, and display routine with the notification being "CREATE REFERENCE MANUAL."

Table 29 below provides an exemplary correspondence data structure including rules for proceeding information corresponding to the fields of the data structure that may be executed by the system. Reference to mandatory is for example only and is not intended to be limiting.

TABLE 29

Correspondence Data Structure

| Field Name | Mandatory | Display in Form | Field Type | Format | Validation | Business Rule |
|---|---|---|---|---|---|---|
| Jurisdiction | YES | YES | List of Values | | Values from Jurisdiction - Setup | |
| Application No. | YES | YES | List of Values | | Values from Patents | |
| Mailing Date | YES | YES | Date Field | MIM-DD-YYYY | Date Field - US Data Format | |
| Document Code | YES | NO | List of Values | | Document Codes - setup | Document Code value set dependent on Jurisdiction value |
| Document Description | YES | YES | List of Values | | Default from Document Code - Setup | Document Code will not be displayed on UI. Only document description would be displayed. Mapping from Document code to document description would be available in configuration |
| Attachment | YES | YES | Attachment | | | only PDF Files to be Accepted |
| Correspondence Document Status | NO | YES | List of Values | | Correspondence Store - Setup | DROPPED ACTIVE ERROR CODE |
| Size of Attachment in Bytes | YES | NO | FREE TEXT | | | Derived from files uploaded |
| PRIVATE PAIR Upload Date | NO | NO | Date Field | MM-DD-YYYY | | Derived from files uploaded (Logic in Scraping Program - user Story) |
| N417 EFS ID | CONDITIONAL | NO | Free Text | NUMERIC | | When N417 record is populated from US Private Pair, this field is auto populated. |

TABLE 29-continued

Correspondence Data Structure

| Field Name | Mandatory | Display in Form | Field Type | Format | Validation | Business Rule |
|---|---|---|---|---|---|---|
| Document Page Count | YES | NO | FREE TEXT | NUMERIC | System Populated | When Record is submitted, Page count of the attached document is populated. |
| Correspondence ID | YES | NO | System Generated | | | Unique Sequence generated for each record |
| Source of Correspondence | YES | NO | System Generated | | AUTOMATIC/ MANUAL | MANUAL - For Manual Single record entry or bulk upload |
| Sub Source of Correspondence | YES | NO | System Generated | | | SOURCE: MANUAL SUB SOURCE: MANUAL BULK SOURCE: AUTOMATIC SUB SOURCE: Pair outgoing correspondence IFW EP PTO Third Party |
| Split ID | NO | NO | System Generated | Numeric | | To be populated when a record is split. Same ID to be populated in parent as well as split records File Name of a Split Record would be File Name of Original Record_1/2/3 ETC. |
| Parent Child | NO | NO | SYSTEM GENERATED | Alphabet | | P - Parent Record C - Child Record Main record becomes P Record Split Records become C Records |
| Comment | NO | YES | user Enterable | Alpha Numeric | | |

The system may store PDF attachments as URL in a database. Document may be stored in a File System and users may be able to retrieve the document when they click on the attachment link in the application. Every document (Attachment) in the correspondence store is attached to an application in the system. A user may be able to view the attachment only after the system verifies one or more criteria have been met. For example, where the system verifies that an Export Control value for the application associated with the document is set to NO in the system, the system will permit the attachment to be viewed by all users. On the other hand, where the system determines the Export Control value for the application associated with the document is set to YES, then the system may limit the document to be viewed only by a user whose nationality is US NATIONAL or US GREEN CARD HOLDER.

While the system accesses correspondence records for viewing, the system may only display those records where a user has access to the associated application no. of the correspondence record. If Data Access of the Role attached to the user does not allow access to the associated application no. the system may not permit the user to access the correspondence record. The system may apply this rule in all places in the application where correspondence records are queried and presented to user for view. For example, the system may block a user's access to attachment links if the system determines an associated application no. is export controlled and a user is neither a US NATIONAL nor a US GREEN CARD HOLDER. This logic may be applied in all places in the application where correspondence attachments are queried and presented to user for view Thus the system may determine that an export control flag is checked for an application in the system and only a user with a nationality according to the ROLE data input into the system is US NATIONAL or GREEN CARD HOLDER can view the Attachment link. Otherwise the user cannot view the attachment and the system may generate a message to be displayed on the user interface 400, for example, "This Document is Export Controlled. You do not have access."

While entering a correspondence record manually through the user interface 400, A user may enter an application number. If the application number exists in the system, but the user does not have access to the application because of DATA ACCESS restriction in ROLE, show message: "You Do Not have access to this application."

According to one aspect of the present disclosure, each file in a file system should contain a record ID, along with audit columns.

File Category
  CORRESPONDENCE
    Application No.
      Original Image
        File 1/File 2/File 3 . . .
      OCRed Image
        File 1/File 2/File 3 . . .
    REFERENCE
    File 1/File 2/File 3

The system may execute rules for a manual correspondence upload. For example, the system may not permit a Correspondence Records with DOCUMENT CODE: N417 to be allowed to be entered through the manual correspondence form user interface 400.

Table 30 an exemplary record status rule that may be executed by the system.

TABLE 30

| End-to-End Record Status #2 CORRESPONDENCE STATUS | |
|---|---|
| In DB | On UI |
| ACTIVE | No Status Display |
| DROPPED | DELETED |
| ERROR | ERROR - Error Code |

For a DROPPED status, a user can Manually change status of a Correspondence to DROPPED. The DROPPED correspondence record can't be edited or updated, and the DROPPED status can't be reversed. The system can also change status of a correspondence record to DROPPED, for example when the system record attached with the correspondence is dropped. A dropped correspondence may not be included in a Duplicate Check and a Dropped correspondence should be displayed in IDS drill down. A Correspondence Record created MANUALLY can only be dropped, but records created in AUTOMATIC route may not be dropped.

For an ERROR status, the status of a correspondence record may be updated (along with error description) when there is validation failure on the record. A record with an Error status may be included in duplicate check.

For an Active status, a correspondence that is not in Dropped nor in Error Status will is in ACTIVE status, and an active record may be included in a duplicate check.

The system may execute a DUPLICATE CHECK VALIDATION, which as discussed above would not include a Correspondence with a DROPPED status. Data in Correspondence Store may be from multiple sources, e.g. manual and automatic sources. One source for example, may be a manual source of a SINGLE RECORD entry or a BULK UPLOAD for both US and NON US Records. For a Duplicate Check, a composite key may be:

Jurisdiction+application number_converted+Document Code+mailing date+size of PDF in bytes+ Document Page Count An Application Number may be converted using conversion logic.

In the case of an AUTOMATIC Source, Duplicate Check will be executed as discussed above.

Where a correspondence record is dropped, the system may or may not change downstream transactions as well. For example, when a correspondence record is dropped a related record may not be impacted. However, the system may drop all OPEN NOTIFICATIONS associated with the Correspondence Record (Doc ID) that was dropped. The system drop related references in the reference base table 300 as shown in Table 33, and a reference flow flag for those related references may be changed to NO, and the system may then prevent subsequent Reference Flow to Family Members or SML.

When a correspondence record is dropped, the system may drop related references in the IDS Reference Flow Table 308 where the system determines for example, that a reference in the IDS Reference Flow Table 308 related to the dropped correspondence record has a status of EXAMINER CITED, UNCITED, or CITED IN PARENT.

With EXAMINER CITED status, the related reference gets DROPPED. For example, a first set of applications X1, X2, and X3 belong to a family F1, and a second set of applications X4, X5, X6 belong to another family F2. In this example, applications X1 and X4 have a SML both ways, and an IDS correspondence record ID1 is a correspondence from X1. If ID1 is dropped, then references flows for X1-ID1 with status EXAMINER CITED will also be DROPPED.

With respect to an UNCITED status, references with this status that are related to the dropped correspondence record only as family members or subject matter linkage, will be dropped. As an example: applications X1, X2, and X3 belong to family F1, and applications X4, X5, X6 belong to family F2. Where applications X1 and X4 have a SML both ways, and correspondence record ID1 is a correspondence from X1, if correspondence record ID1 is dropped, then reference flows in X2, X3 and X4 sourced from X1-ID1 and in UNCITED status, are dropped.

With CITED IN PARENT status, references with this status that are related to the dropped correspondence record only as family members or subject matter linkage, will be dropped. As an example: applications X1, X2, and X3 belong to family F1, and applications X4, X5, X6 belong to family F2. Where applications X1 and X4 have a SML both ways, and correspondence record ID1 being dropped is a correspondence from X1, then references flows in X2, X3 and X4 sourced from X1-ID1 and in CITED IN PARENT status, are dropped.

Source References IDS Source Reference Flow Table 308, derived from a correspondence that is dropped, are also DROPPED if the "Filed" Flag for the record is NO.

The system may drop related transactions in one or more sequences. For example, when a correspondence record is DROPPED the system may drop the related transactions as follows: Pending Notifications/Triggers for Correspondence Record>Reference Base Record+Pending Notifications/Triggers for Reference Record>IDS Reference Flow and IDS Source Reference Flow Records+Pending Notifications/Triggers for Reference Flows.

Tables 32 and 33 provide an example of a data flow in IDS Process from the system until Reference Flow to IDS in which a record (ID1-X1) is dropped according the following exemplary scenario:

Applications X1, X2, and X3 belong to family F1.
Applications X4, X5, X6 belong to family F2.
Applications X1 and X4 have a SML (Both ways).
Correspondence record ID1 is a correspondence from X1.
References R1 and R2 have been extracted from Correspondence record ID1.
References R1 and R2 have flown into related family and SML.
References R3 has not flown yet.
Correspondence record ID1 dropped.

For a manual correspondence record entry, the system may validate the correspondence record in the reference base table 300. According to an aspect of the present disclosure, the system may recognize a validation error upon determining whether an application number of a newly created record exists in the system in block S3202. Where it is determined the application number does not exist in the system, the system may display a pop up with validation failure message and determine whether a user has access to create a New Application in the system in block S3204.

The system may determine the user does not have access and send a notification that an application cannot be created in block S3206. Conversely, the system may determine the user has access, send a notification request to the user, display a link for the user to create a new application, and add to a queue of pending tasks on the system in block S3208. The notification may include "CREATE NEW APPLICATION," and an option to accept or reject the creation of the request. Where the user rejects the option, the system will close the notification. Where CREATE RECORD is the value of the option selected, the user will be required to create the Record for the application number and on completion of transaction the system will close the notification, and populate the Data fields from CREATE APPLICATION REQUESTS to create the CORRESPONDENCE Record in Correspondence base table 300. According to one aspect of the present disclosure, a closed Notification gets removed from the Pending task list on user interface 400.

Where the system determines the application number of the record does exist in the system in block S3202, the system will determine whether the record is to be submitted in block S3206 by performed one or more submission validations. In block S3206 the system will perform a Field Level Validation for entered data, a check of an Attachment type (e.g. check that the new record is a pdf), a Duplicate Check for all jurisdictions, and a book mark validation. If the system cannot validate the new record for any of these categories, the record will not be submitted and the system may display validation failure message on the user interface 400 in block S3210.

With respect to the book mark validation, the system may validate whether bookmarks exist for the US jurisdiction, and, where application number starts with PCT US, for the WIPO Jurisdiction. For these jurisdictions, the attachment must have contain a bookmark. Where a bookmark does not exist, the system may display a Validation failure message: "US Correspondence Doesn't have Bookmark." The system may perform a multiple bookmark validation for the new record in the case of the US Jurisdiction.

Where the system determines the attachment has multiple bookmarks, the record will not be submitted and the system may display a validation failure message including: "Attachment has multiple bookmarks. Please use Bulk Upload."

Figure 32:
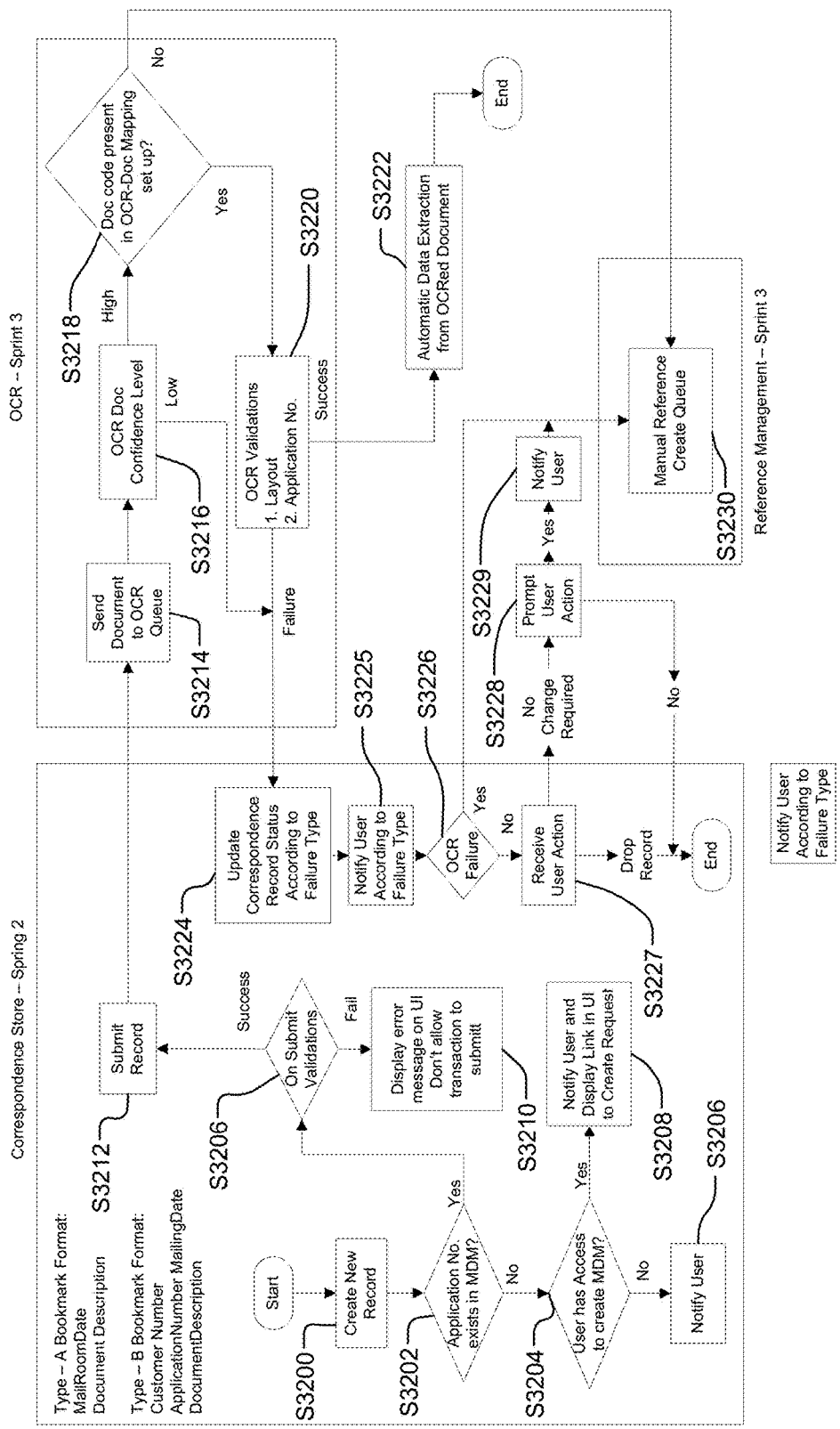
FIG. 32 is a schematic diagram of an example data flow according to aspects of the present disclosure.

The system may perform a bookmark format validation only allow records including bookmarks having a bookmark format of a certain type to be submitted. Examples of bookmark formats that the system may determine are acceptable may include Type A or Type B as illustrated in FIG. 32. Type A may include a format including MailRoomDate Document Description (e.g. "2015-09-16 Filing Receipt"), and Type B may include Customer Number ApplicationNumber Mailing Date and DocumentDescription ("69316 62211600 09-16-2015 Filing Receipt").

The system may perform a bookmark match with entered values in the record for different combinations of fields. The system may perform bookmark match on the combination of Mailing Date, Document Code, and Document Description. As another example, the system may perform the bookmark match of the combination of application number, Customer no. of the application (fetched from the system) mailing date, Document description, and Document Code. The combination of fields may be determined by the system according the format of the bookmarks as determined in the bookmark format validation.

Where the system determines the record has been validated according to the submission validations, the record may be submitted by the system in block S3212. As a result, the system may perform a series of OCR related validations in blocks S3214-S3220. More specifically, the documents corresponding to the new record will be send to an OCR que and OCRed in block S3214. As discussed above, OCR is done for all documents in the correspondence store, irrespective of their jurisdiction, and irrespective of whether a document code present in the document is in "OCR Document Mapping List." In block S3216, the system may execute an OCR check to determine an OCR confidence level for the now OCRed document. Where system determines the OCR confidence level is below a predetermined value, an OCR status of the OCRed document is set to OCR FAILED, and in block S3224, the system maintains the status of the correspondence record as active. In block S3225 the system notifies the user to create reference manually while disabling a drag and tag capability for the OCRed document. The notification to the user may include "MANUALLY CREATE REFERENCE_OCR DOCUMENT QUALITY BELOW THRESHOLD—Action Required." The system may display the notification only when it is determined that the user has access to create REFERENCE RECORD.

The system may determine the OCR confidence level is above the predetermined level in block S3216 and extract, if present, a document code of the OCRed Document for evaluation in block S3218. In block S3218, the system determines whether a document code, if identified, is present in an OCR-Doc mapping setup. More specifically, the system may determine based on the OCR data, if a document code is present in the OCRed document which is a match for a document code of a correspondence record that is in the system's setup for template matching. Where the system determines a document code is not present or part of the mapping set up, the system may prompt a user to create a reference manually and send the record to the manual reference creation que in block S3230. Alternatively the system may determine that an identified document code is present in the OCR-Doc mapping setup and preform one or more OCR validations in block S3220.

In block S3220, the system may perform a document layout match with a document code in the correspondence record (OCRed document?). In particular, the system may perform a validation of layout according to a Document Code on the Layout and the Title of the document. In case the system determines there is a mismatch, the system will updated the Correspondence Record status to "ERROR-DOCUMENT TEMPLATE MISMATCH" in block S3224, and in block S3225, send an FYI Error Notification to the user who has created the CORRESPONDENCE Record including "ERROR-DOCUMENT TEMPLATE MISMATCH (FYI)."

Where the system determines there is a layout match, the system performs Document Application No. Match validation with Correspondence Record Application No. in block S3220. The system may extract an application number from the OCRed document as discussed above, and determine if the application number is matched with the application number on the correspondence record. Where system determines the application numbers do not match, the system changes a Correspondence Record status to ERROR—DOCUMENT APPLICATION NO. MISMATCH in block S3224. As a result, in block S3225, the system sends an FYI Error Notification to user who has created the CORRESPONDENCE Record which may include: Record you have created is errored out—ERROR—OCR RESULT—CORRESPONDENCE ENTRY DOCUMENT APPLICATION NO. MISMATCH (FYI).

Accordingly a sequence of validation checks performed by the system may include checking Document Confidence level post OCR>>> performing a document layout match with the document code in the correspondence record>>> and performing the document application no. match with correspondence record application no.

In block S3226, the system verifies that OCR validation failure was due to an OCR Doc Confidence level and, in block S3230, creates a pending task in a create reference queue. Where the validation failure was due to a layout or application number mismatch the system receives a user action in block S3227. The system may receive a Drop or No Change Required as an action from a user. Where the system receives a drop action, the system will drop the record after prompting the user for a double confirmation including displaying the impacted transactions in a prompt confirmation via the user interface 400. Where the system receives a NO CHANGE REQUIRED action, this may indicate data may not have been correctly extracted in the OCR process. The system will prompt a user action in block S3228 by displaying a pop up a message—"If you select option, probably OCR has not been able to read this document correctly. References need to be extracted manually from this document. If you still want to go ahead, click YES else click NO." Where the system receives a No selection, the system will exit from the "NO CHANGE REQUIRED" option and prompt the user to select the option DROP THE TRANSACTION. Where the system receives a user selection of YES, the system will display a notification or send a message to a user having access to create REFERENCE RECORD in block S3229, which may include: "MANUALLY CREATE REFERENCE_OCR DOCUMENT QUALITY NOT GOOD—Action Required," and send the record to the manual reference creation que in block S3230.

In addition to sending the record to the manual reference creation que, the system, in block S3230, will produce an outcome in which a reference is either created, no reference is found, or it is determined that a reference is invalid and dropped. In creating a reference, the system will close a notification even if only one reference is created out of the document. Where no reference is found the system will add a null reference into reference records for the correspondence. In the case of an Invalid Correspondence, the system drops the correspondence and closes the notification. In each case the system display a result in IDS review.

The system may provide an Urgent create Function on a Correspondence user interface 400. When correspondence Submitted through URGENT CREATE, the record is immediately sent to OCR Queue and all scheduled programs including OCR Queue and OCR Data extraction, are immediately called.

Figure 33:
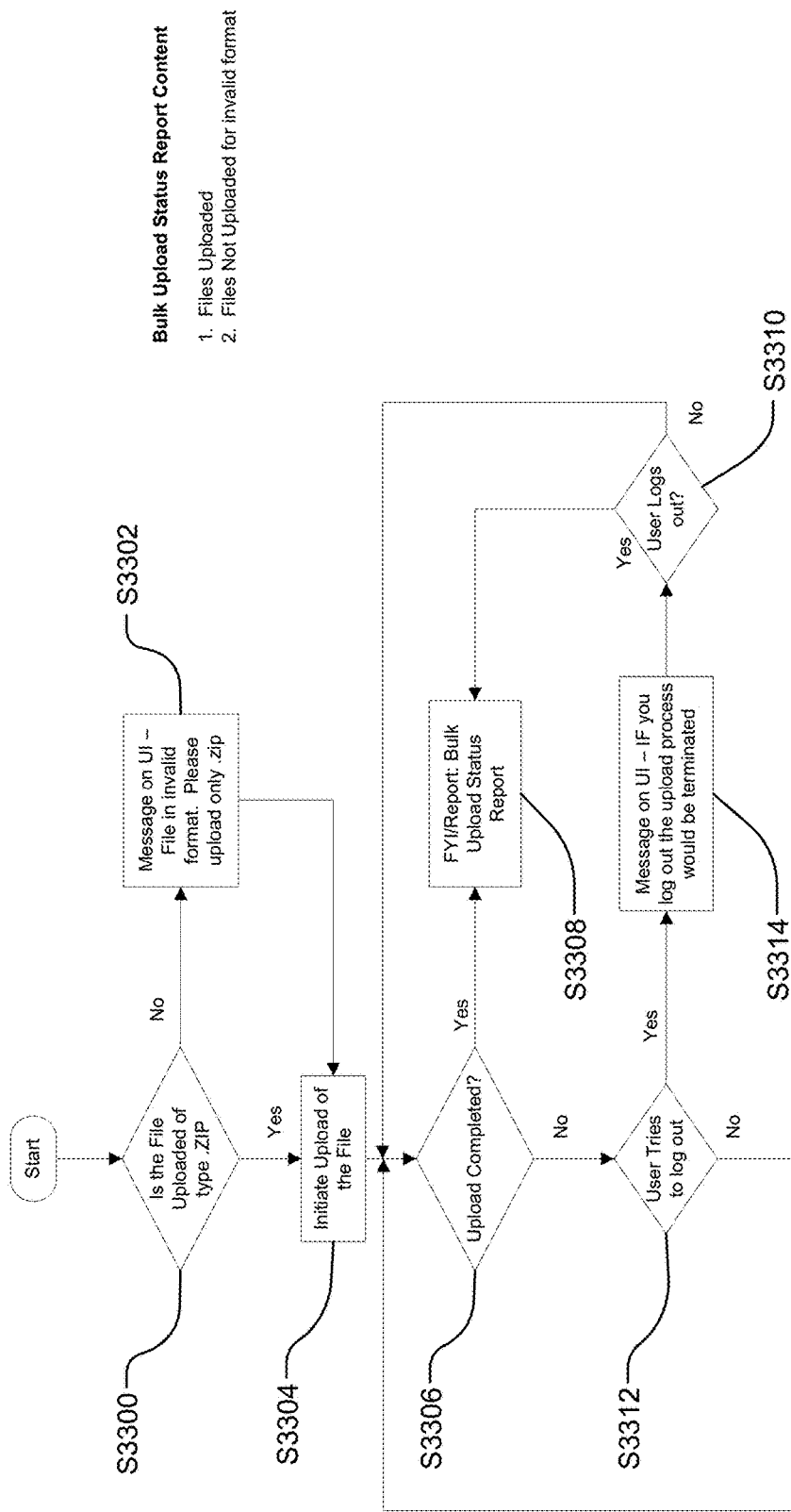
FIG. 33 is a schematic diagram of an example data flow according to aspects of the present disclosure.

The system may perform a bulk upload according the exemplary process illustrated in FIG. 33. In block S3300 the system determines whether a file format selected by user is zip File Format. Where the file format is not zip file format the system discards the non pdf file and displays the message on UI before the upload process gets started which may include "File in invalid format. Please upload only .zip" in block S3302. The system will initiate the upload of the file in block S3304 and determine if the upload has been completed in block S3306. While the upload process is in progress, if a user tries to log out as determined by the system in block S3312, the system prompts a Message: "Bulk upload in Progress. Process will be terminated if you log out. You still want to continue?" and if a session is ended in between then an upload process is interrupted. In block S3308, the system sends a bulk upload status report to user who initiated the bulk upload process in the event the upload process is successful or failed.

The system may split documents with multiple bookmarks, in particular for documents in US Jurisdiction with multiple bookmarks are split into multiple documents. For bulk uploads, split happen in staging tables and subsequently validated records are imported to base table 300. A split happens if the document passes the Multiple Bookmark validation successfully. After a split a CREATED BY value remains the same in the original record as well as in the Split records. For the an original record a Parent Child value is P, a Split ID is populated, and the original Record becomes not editable and not searchable on UI. For a split record UPDATED BY value will be SYSTEM, CREATED DATE and UPDATED DATE would by SYS DATE, COMMENT Field value—"Split, Originally created on <CREATE DATE OF ORIGINAL RECORD>, and Parent Child Value is C.

The system may perform validations in a staging table during a bulk upload. The system may only allow PDF Documents are allowed, and otherwise reject records in the staging table as "Invalid document format." The system may only place documents with bookmark and documents without bookmarks may be rejected in the staging table as "Invalid Document." The system may limit to only one bookmark type, for example Type B (("CustomerNumber ApplicationNumber MailingDate DocumentDescription), and if any other bookmark is found the document may rejected in the staging table as "Invalid Bookmark."

The system may perform multiple Bookmark validation in which each document goes through multiple bookmark validation. In case multiple bookmarks, if validation fails and the system drops the record in the staging table. All of the multiple bookmarks need to be consistent and if different types of bookmarks are found the system may reject record in the staging table as "Invalid Bookmark."

The system may perform application number (Extracted from Bookmark—check with Application Number_Converted) validation if not found in the system base table. If customer number extracted from bookmark has a private pair key mapped in application set up. Correspondence record in staging table will go into "pending application creation" state and an entry in "Create Application" queue will be created. If customer number extracted from bookmark DOES NOT have a private pair key mapped in application set up. Reject record in staging table—"Application Number not Found."

The system may audit the manual process. Only XML Files may be uploaded, and if any other file type uploaded, system may reject and display message "Invalid file type." Once a file is uploaded, if the file format is found to be incorrect, the system may display message "Invalid File Format." The system may compare a correct file is with correspondence records and send a comparison report to a user.

The system may provide an IDS Approval Dashboard (attorney dashboard) such that when an IDS sent for approval, the system will also send an email notification to an attorney that can approve the IDS. The email notification may include the IDS in a PDF file in a format similar to a file that is generated for filing at the appropriate patent office. The PDF may be secured, meaning non-editable, copy disabled, OCR not allowed, and with a watermark such as, for example 'FOR REVIEW ONLY.'

Figure 34:
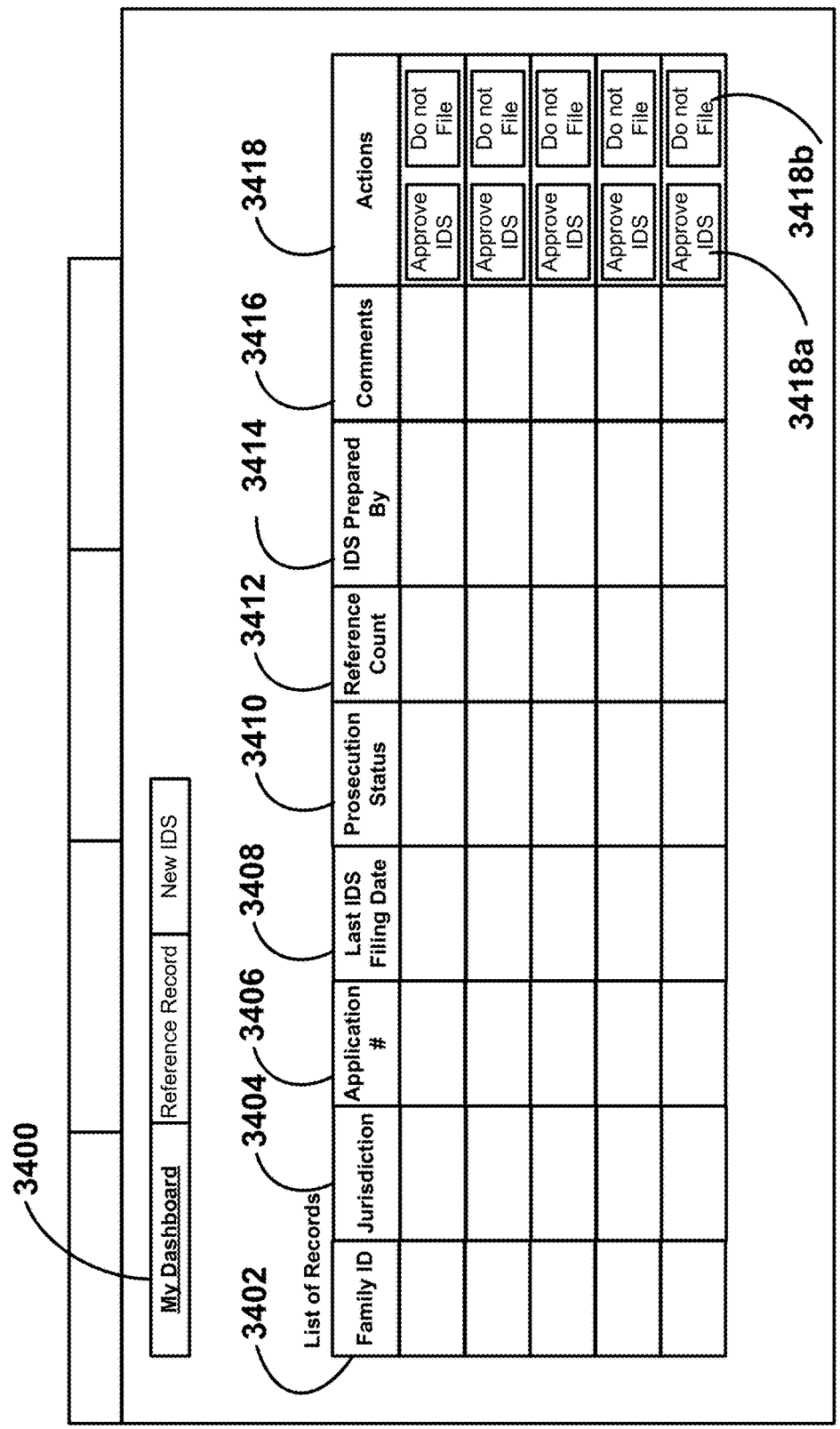
FIG. 34 is a schematic diagram of an example data flow according to aspects of the present disclosure.

If an attorney logs into application to, the attorney may come to a dashboard landing page 3400 as illustrated in FIG. 34. The user interface 400 provided by the dashboard landing page may display a Notification Message just above a grid, including an "IDS approval" Notification message value, and several information fields. The fields may include family ID 3402, Jurisdiction 3404, Application #3406, Last IDS filing date 3408, Prosecution Status 3410, Reference Count 3412, IDS prepared by 3414, Comments 3416, and Action 3418.

For each application in the dashboard landing page, a family ID may include a hyperlink to a list of family members, a last IDS filing date may include a hyperlink the date to IDS drill down, and the Action field may include hyperlinks Approve IDS 3400a and Do Not File 3400b. A reference count equal total references (US patents, US publications, Foreign patents, NPL & selected source references [if any]) in the IDS which is pending approval. The IDS prepared by field will include the name of the individual who had sent the IDS for approval, and Comments will include comments from the individual sending the IDS.

Figure 35:
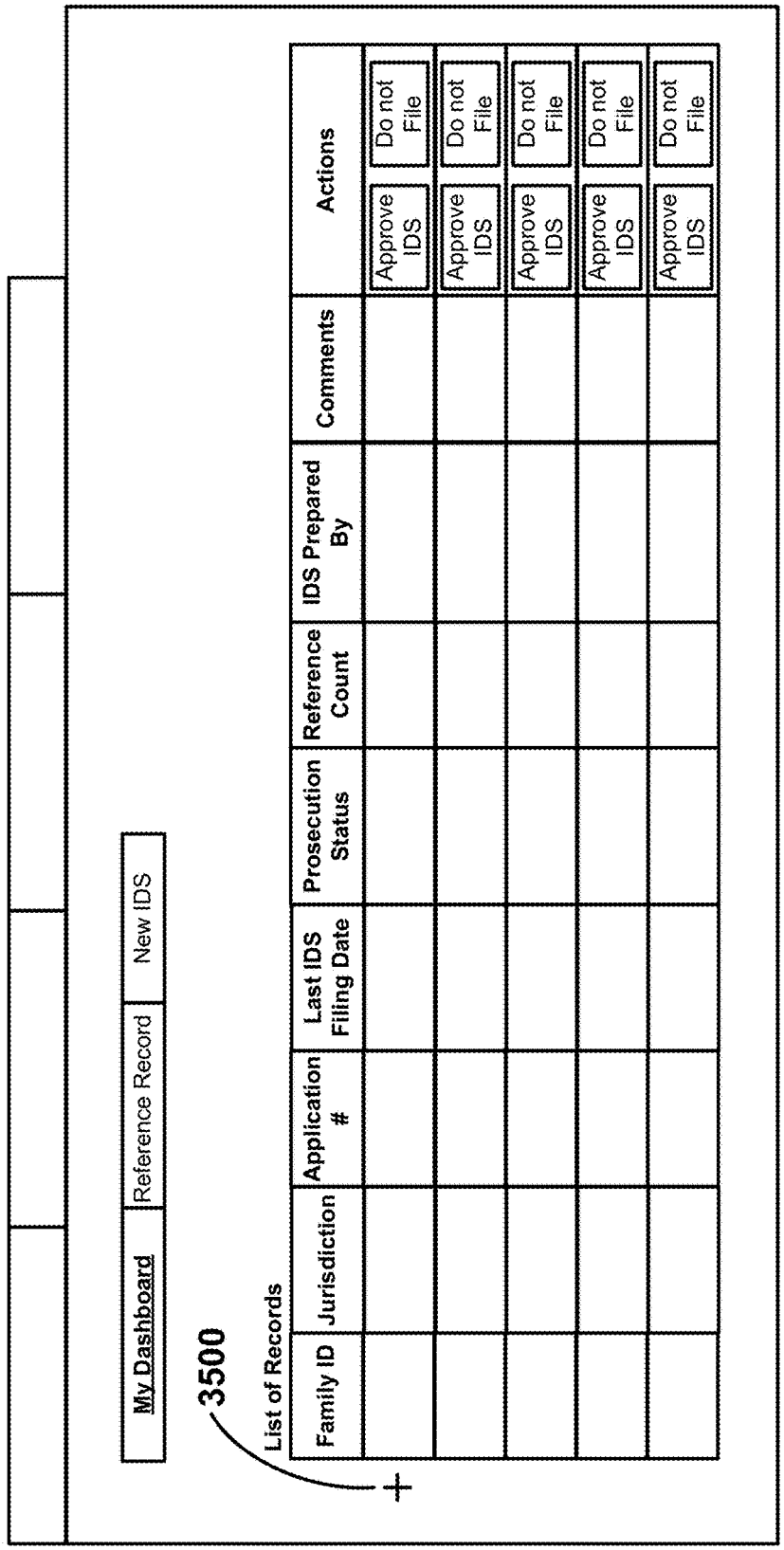
FIG. 35 is a schematic diagram of an example data flow according to aspects of the present disclosure.

As illustrated in FIGS. 35 and 36, a user can switch to Family View using a view toggle. The system may group 'IDS pending approval' by family ID. As expand button may ONLY appear if another IDS is pending approval, as illustrated in FIGS. 35-36.

The system may enable a user to disapprove and prevent an IDS from being filed or approve the IDS. When a user engages a 'Do not file' 3418b, the system may prompt the user for a double confirmation. If the user confirms that he/she does not intend to file this IDS, the notification will be closed. The individual who prepared the IDS for approval will be informed that the attorney does not want to file the IDS. Further, all references which had been attached to the prepared IDS, will be released and there status will be updated back to their Previous status—UNCITED—NULL or UNCITED—CITED IN PARENT. Where an attorney approves the IDS via the approve IDS link 3418a, the system may display a POPUP. If the IDS Contains either more than 300 US patents & US published applications and/or more than 50 Foreign and/or 50 NPL citations combined the system may display a message "Maximum of only 300 US patents & US published applications, 50 Foreign and/or 50 NPL citations combined are allowed in a single IDS. The system will generate 2 or more IDSs (depending on the total count of citations) to ensure acceptance @ USPTO."

Figure 37:
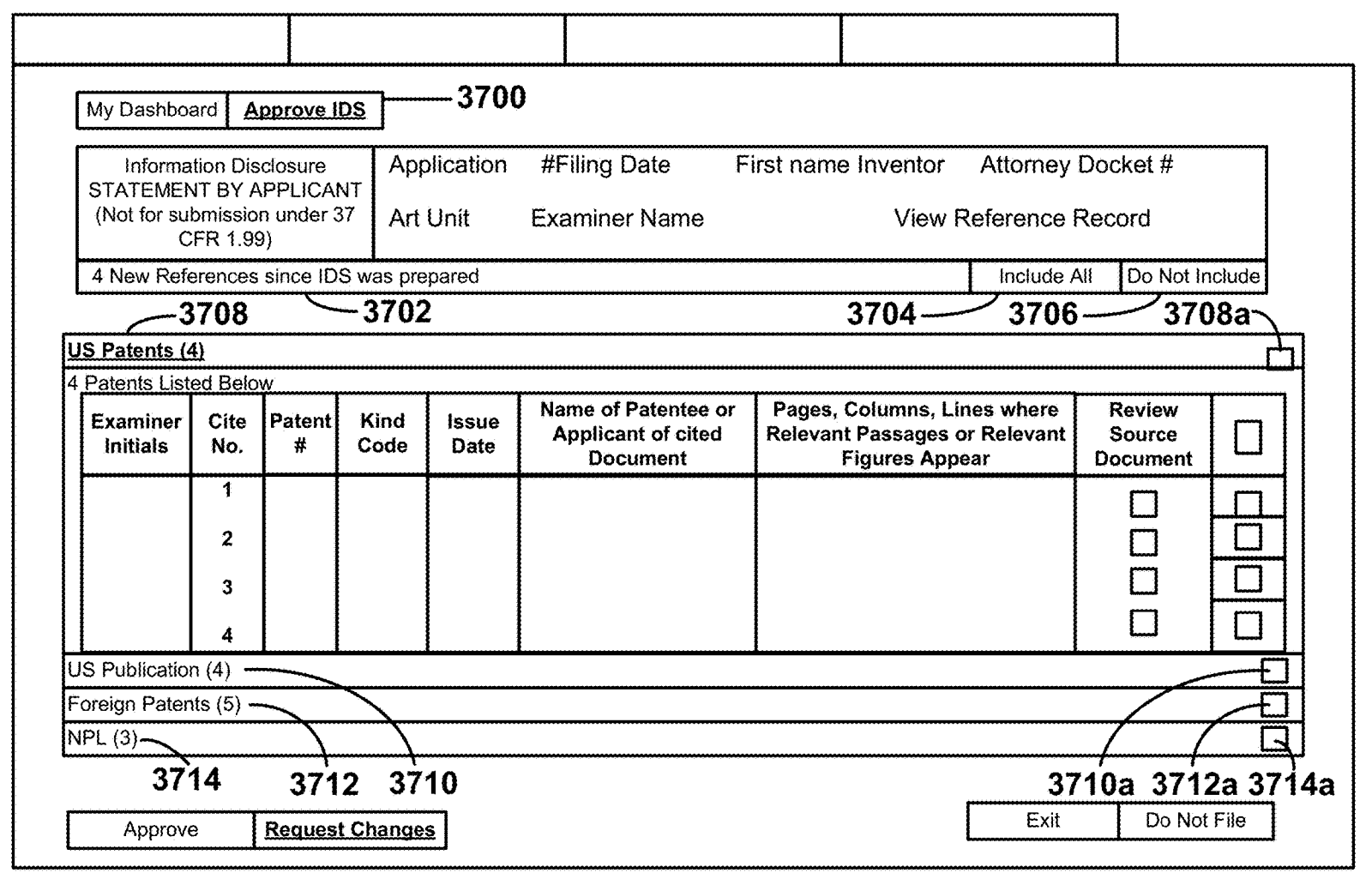
Figure 38:
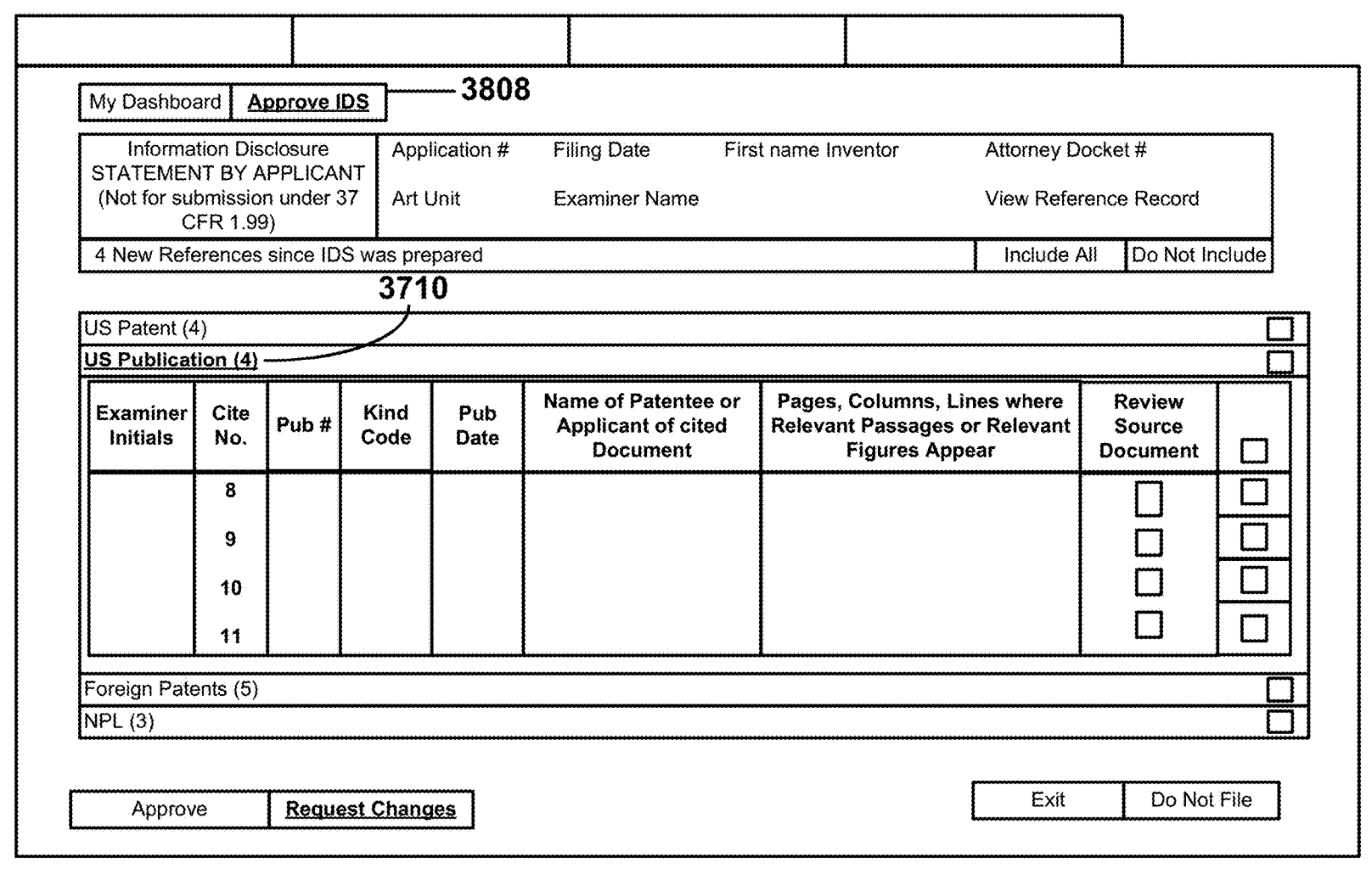
Figure 39:
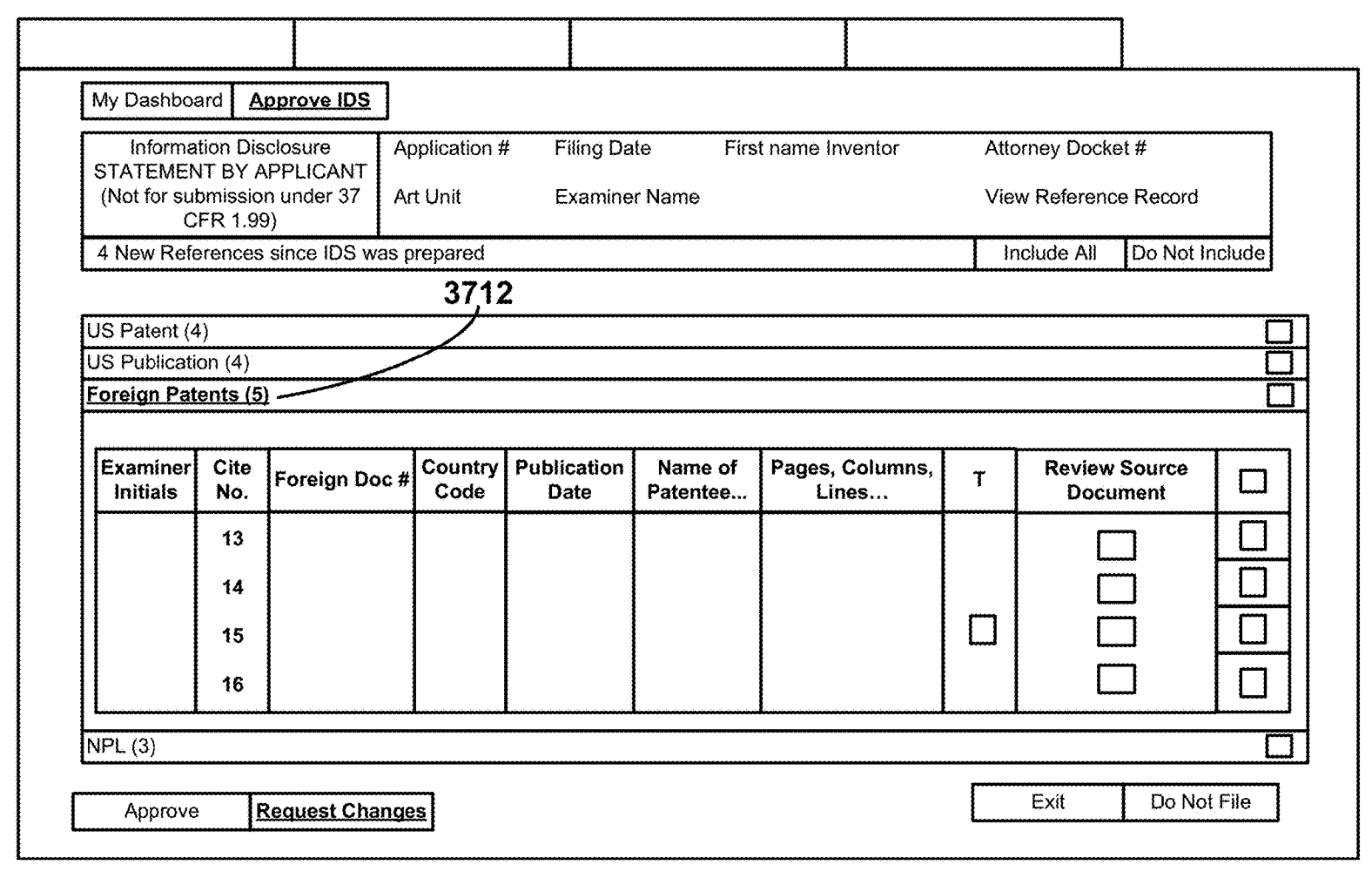

FIGS. 37-40 illustrate the an approve IDS user interface 400 3700. If any references have been reviewed by the paralegal (WHO HAS LAST SUBMITTED FOR APPROVAL) & the same paralegal had decided to 'NOTIFY THE ATTORNEY' at the time of review (refer to Pending Approval section for details), it will show-up as a message on this screen in RED. The system may generate New Reference Message 3702—"<count of references reviewed by the paralegal who had prepared the IDS (in the Interim)+count of source references> References since IDS was prepared." A user can take one of the 2 actions "INCLUDE ALL" 3704 & "DO NOT INCLUDE" 3706. If the user clicks on "Do not include", an IDS will remain as is. A user's decision to "Do Not Include reviewed references in this IDS" will go as comments to the Paralegal when the notification is approved or when changes are requested. If a user clicks on "Include All", the IDS will be updated to include all references. Further, the respective accordion widgets 3708, 3710, 3712, 3714 as illustrated in expanded forms in FIGS. 37-40 with engagement with respective accordion links 3708a, 3710a, 3712a, 3714a will indicate the # of references in their respective type of reference. When an accordion widget will be opened, new references will be highlighted in a different color. A cite no. will be associated to new references which will be added after a last row in the user interface 400. The system may display the references in descending order so new references 4100 as provide on top in each expand section 3708, 3710, 3712, 3714 as illustrated in FIG. 41. An IDS transaction ID will also be passed along with "INCLUDE ALL" action, the system will then attach the IDS ID to the reviewed references. Along with the reviewed references, source references will also be included in the IDS as NPL if while preparing the IDS, paralegal has included at least one source ref.

Where a user clicks cancel and exits the approve notification, and re-opens it at a later date, the system may show a count of any new reviewed references as illustrated in FIG. 41. If the user has previously clicked on "Do not include" 3704 as illustrated in FIG. 37, when the user opens it at a later date, references for which earlier "do not include" 3706 decision was taken may be included in this prompt. The system may display a number, for example 10, of references in an accordion widget and then pagination within the accordion widget. A user can add self-citation by engaging on the self-citation button 4104 and a user's decision to "Add <count> self-citation" may be store in comments to the Paralegal when the notification is approved or when changes are requested.

Figure 42:
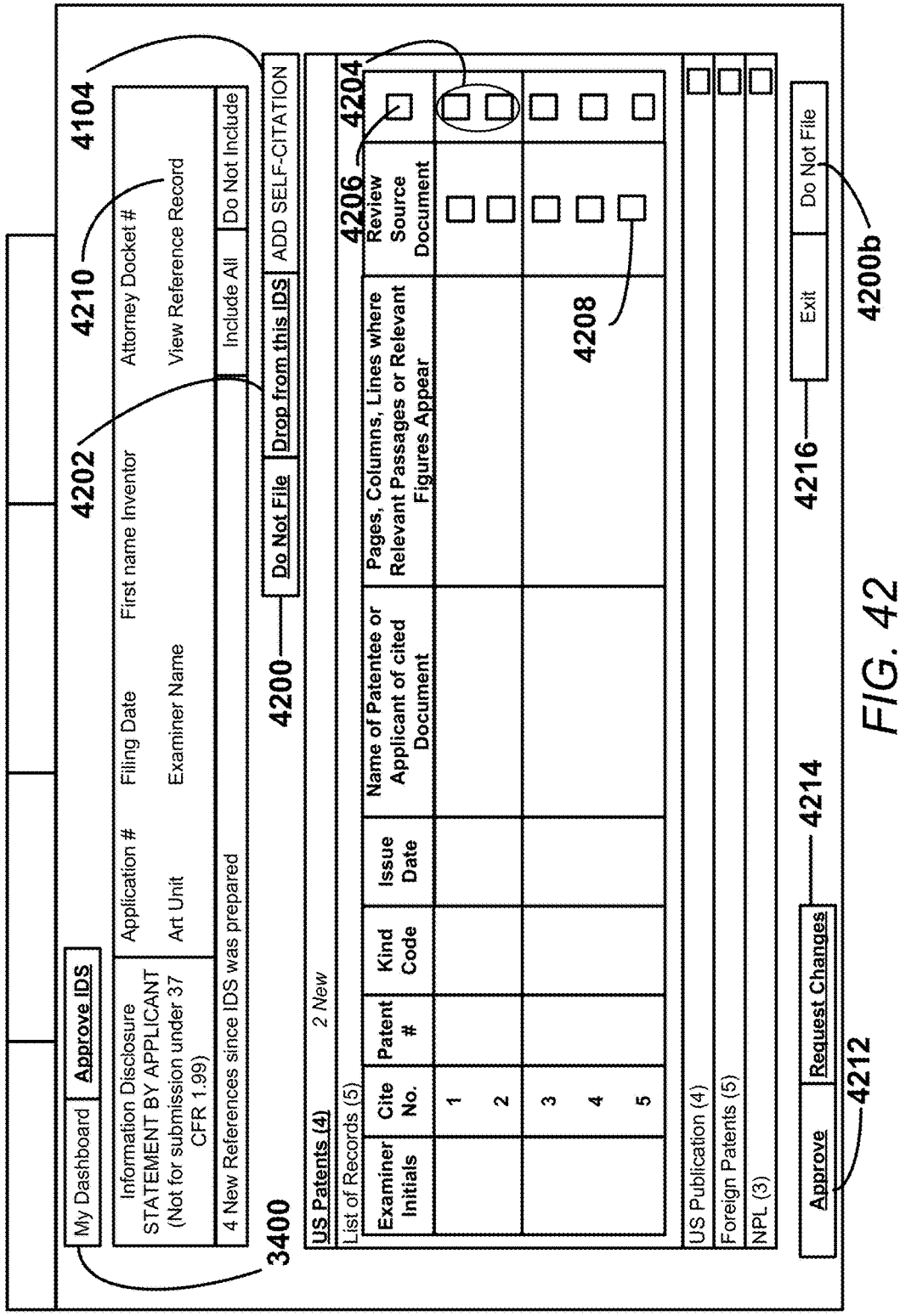
FIG. 42 is a schematic diagram of an example data flow according to aspects of the present disclosure.

A user can also decide whether a reference should be dropped from this IDS (but will be picked in a future IDS) or update the reference status to 'Do Not File' 4200 as illustrated in FIG. 42 (in this case, this reference will not be picked up in a future IDS relating to this application). When the user decides to take one of these actions, the system may prompt the user for a double confirmation and display appropriate message. The user can mark a reference by clicking on the checkbox 4204, as illustrated in FIG. 42. When the user engages the checkbox "add self-citation" 4104 this action will be deactivated and "Do Not File" 4200a and "Drop From this IDS" 4202 will be activated. A user can select all references which are displayed in the accordion widget by clicking on checkbox in the header. Both multiple and single selection is allowed and a user may engage one of the two activated actions. Double confirmation will be prompted.

The system may display a double confirmation message may be displayed when a user engages 'Do Not File' 4200a button. The system may display a double confirmation message when the user engages the 'Drop from this IDS' 4202 button. A user's decision to "<count> references Do Not File"/"<count> references Drop from this IDS" will go as comments to the Paralegal when the notification is approved or when changes are requested.

A user can also Review a source document by engaging a review source document 4208 button, or engage a reference record hyperlink 4210 to view a reference record of Jurisdiction and application # for which IDS is being prepared. In this case, the uncited tab will be by default open when reference record is opened.

However, if the user engages on Request changes 4212, the system may prompt the user for double confirmation. In the double confirmation, the user may add comments for the paralegal, and any previously included comments related to "Do Not Include" or "Drop from this IDS/Do Not File/Add self-citation" will be auto-populated by the system. An email will be sent to the user who had last submitted the IDS for approval as part of notification, when the user to which the IDS was sent for approval engages on the Request changes, along with any comments.

When the user approves the IDS, an email will be sent to the user who had last submitted the IDS for approval. When the user decides to click on 'Do Not File' 4200b button, an email will be sent to the user who had last submitted the IDS for approval.

The system may prompt the user for double confirmation where the user engages the 'Do Not File' 4200b button. Where a user confirms the system closes the notification. If the user clicks on Exit action button 4214, the system will prompt the user for double confirmation go come back to attorney dashboard page.

Figure 43:
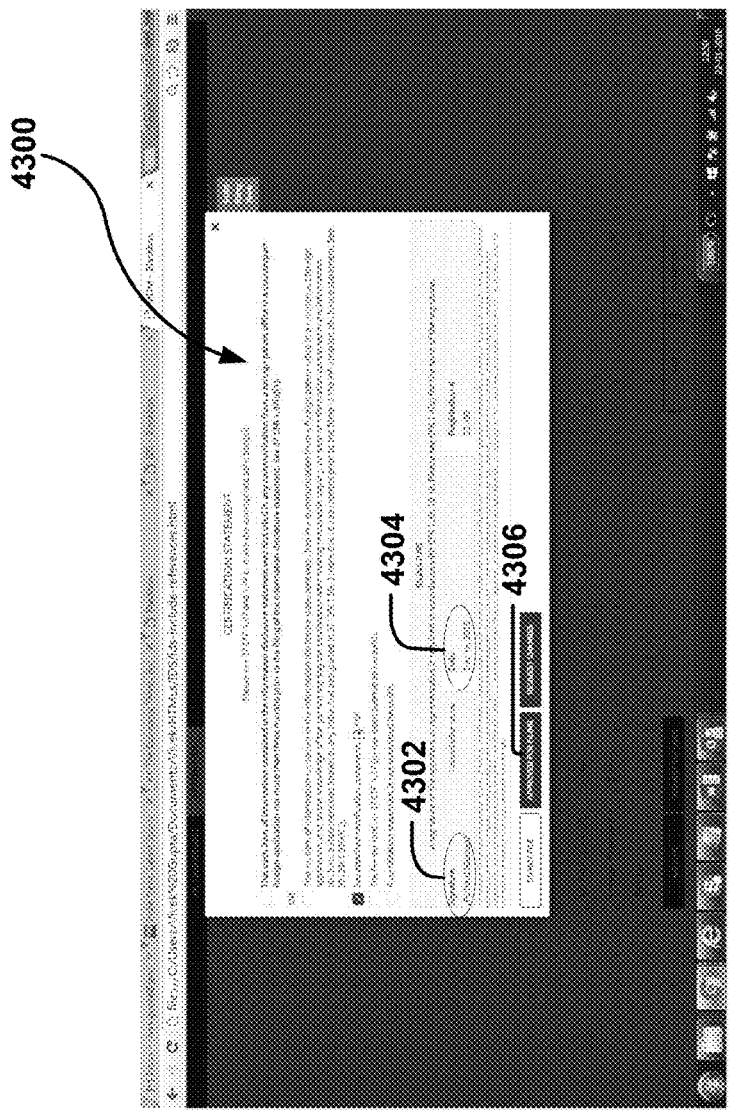
FIG. 43 is a schematic diagram of an example data flow according to aspects of the present disclosure.

Once a user has reviewed the IDS, the user can engage the approve 4210 button and the system may display a certification statement as illustrated in FIG. 43 for a user's review. Any statement that was previously attached to the IDS will be displayed to an approver. Further, the attorney name 4302 will be populated will forward slashes if no e-signature has been uploaded. If e-signature has been uploaded by the paralegal or is now uploaded by the attorney, it will show-up here. Date 4304 will be the current date. The user may approve for filing by engaging the approved for filing action 4306 button.

The system may display a new references will display a count of references which are pending review, excluding any uncited reference which was dropped from IDS (drop from this IDS' & 'DO NOT FILE'). When the user clicks on Review, the system may open a page similar to edit-reference.html discussed above, but a header having a drop down for new references originating from multiple documents (i.e. more than one document from a single Jurisdiction and application or from different Jurisdiction & application #). A user may engage the drop down 4400 to select the source document as illustrated in FIG. 44. Once the user selects a document, a review flag may be checked for the references for the reviewed references as illustrated in FIG. 45. A user can then take one of 2 actions: 'NOTIFY THE ATTORNEY' 4500 or 'DO NOT NOTIFY' 4502. These actions will be greyed-out by default & will be only be active once a user checks the review flag for at least one reference. Once the paralegal. When the user clicks on Notify the Attorney, these references will be prompted to the attorney when he/she opens the approval notification (refer to include all/do not include discussion in IDS approval). When the user clicks on "DO not Notify", references although will be reviewed but will still NOT be prompted to the attorney.

If there are more than one document having new references, once the user takes action on one of the documents by clicking on 'Notify the Attorney' or 'Do not Notify', it should open the second document. In case of last document, it should take the user back to pending approval→IDS page, FIG. 44. Once the paralegal has reviewed the reference, the count of reference will accordingly reduce. Further, the count on the 'IDS' tab, when the user has taken one of the 2 actions on 'NOTIFY THE ATTORNEY' or 'DO NOT NOTIFY' for all source documents. After the count of new reference has reduced to zero, & a new reference flows into the same Jurisdiction & application # (for which IDS approval is still pending), only then another email trigger will go to the paralegal. Count of reference will only reduce when the paralegal who has last submitted the IDS for approval performs the above mentioned action.

If another paralegal reviews an IDS and engages 'Notify the attorney' or 'do not notify' the system may display pop-up message that may include: "Decision to notify the attorney or not notify can only be taken by the paralegal who had last submitted the IDS for approval. The system will only save the information that you have reviewed any reference." The system may wave information that the paralegal has reviewed the reference.

Figure 46:
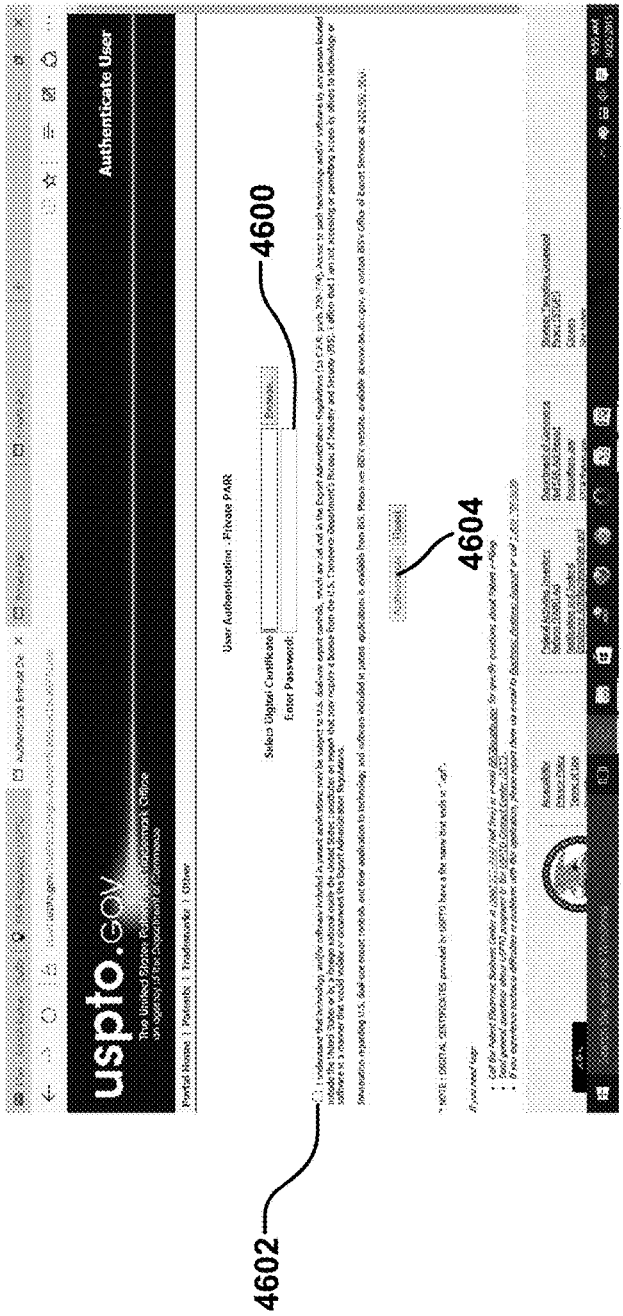
FIG. 46 is a schematic diagram of an example data flow according to aspects of the present disclosure.

The system may obtain a Family Linkage—From US Private Pair page 4600 as illustrated in FIG. 46. Applications are grouped by Family. Family ID has to be system generated when the first application of the family is added in the database. The system may run a crawler service on alternate days for US application number and US PCT number (Jurisdiction WO and application number starts with PCT/US). The system may run queries through crawler service to identify family linkages parent, child, and/or foreign Priority. The crawler service may therefore keep family data updated once record is added either manually or as a result of a "Fetch New Application—From US PTO Private Pair" service or a "Validate Application No. List—With US PTO Private Pair" service.

Figure 47:
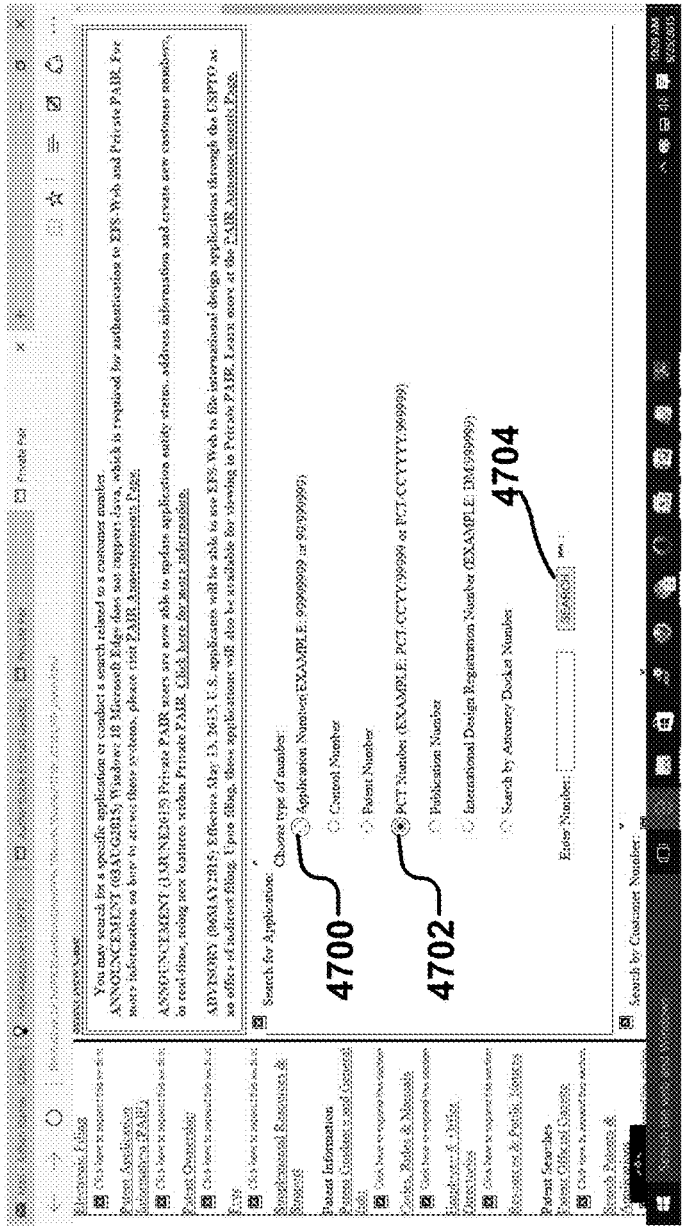
FIG. 47 is a schematic diagram of an example data flow according to aspects of the present disclosure.

The crawler service may scrape webpages of various patent offices (for example USPTO https://ppair.uspto.gov/TruePassSample/AuthenticateuserLocalEPF.html) as illustrated in FIGS. 46, 47.

Figure 48:
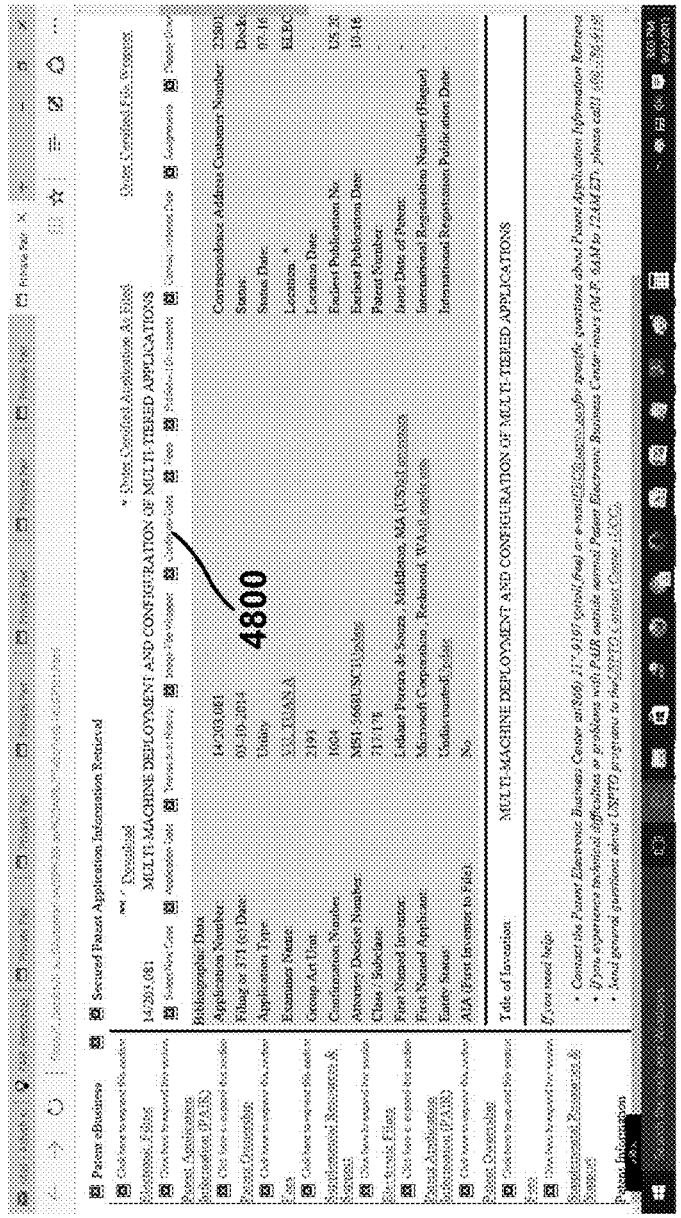
FIG. 48 is a schematic diagram of an example data flow according to aspects of the present disclosure.
Figure 49:
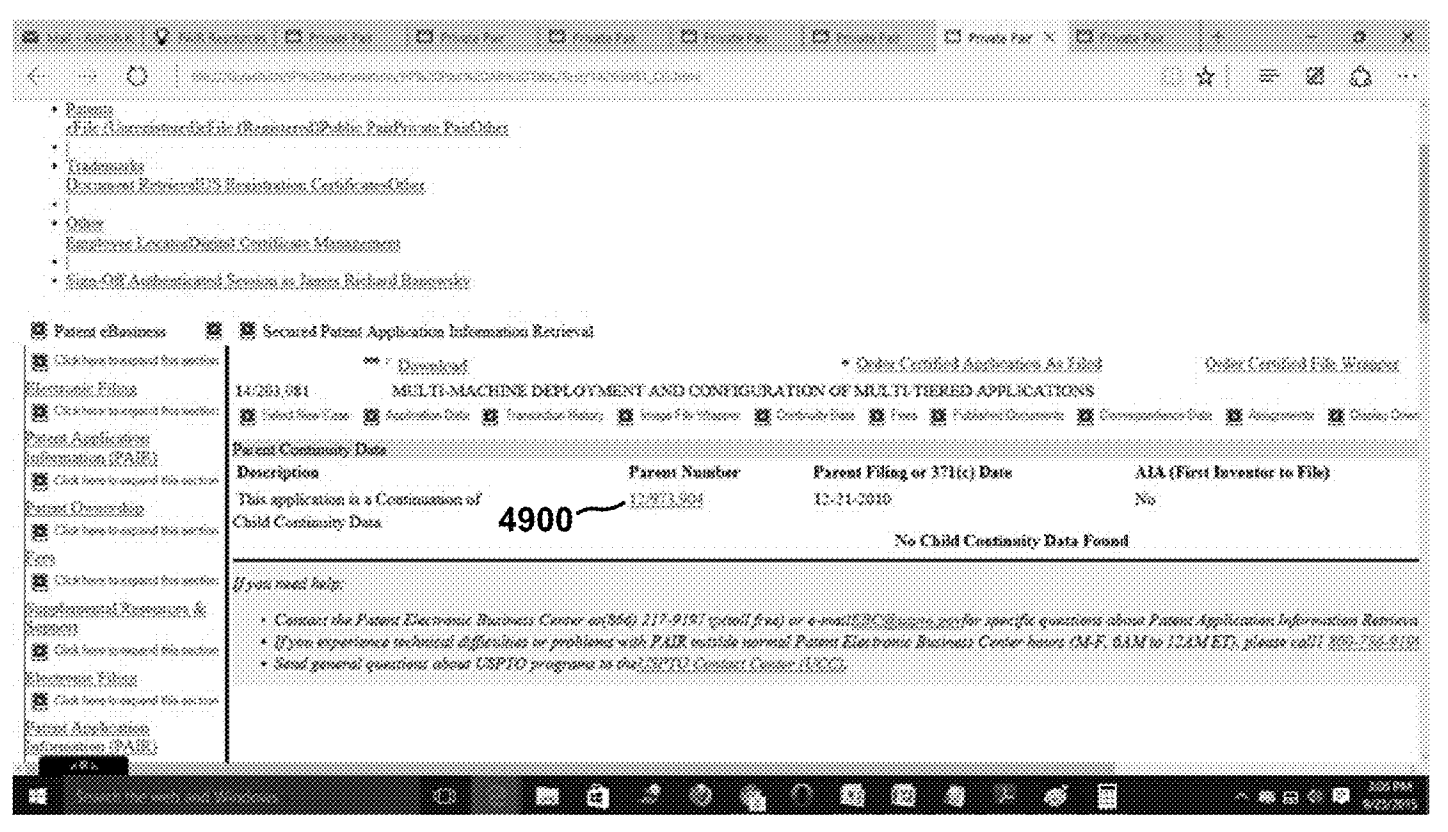

For a data download based on a parent query, a user may first go the base URL as mentioned above, FIG. 45, and once authenticated, click on "Search for Application." The user may enter "Application Number" in case of a national number or a "PCT Number" in case of PCT application as illustrated in FIG. 46. The application data page will appear as illustrated in FIG. 48. A user may engage click on a "Continuity Data" tab 4800 to access continuity data as illustrated in FIG. 49 and capture parent number 4900. There can be multiple parents which system will capture. A user may check all the parent numbers 4900 in the system and if all of them do not exist, create entries with Jurisdiction (US/WO), parent application number and Customer Number in "Create Application" queue. Where a parent number 4900 is not available on Private Pair then the system will case the pending record in the staging table, will get the status "Crawler Error," and new record will directly be created in base table through the user interface 400. The system may display a notification:

Create manual application entry in the system Along with Jurisdiction, Application Number, customer Number and Link of correspondence) as system is not able to found in US PTO private PAIR along with Jurisdiction and application number entry and mark error within the record in the system staging table.

If any of the parent exists in the system then the system will pass its family id to the family id of the application number for which parent search has been conducted. If an application has multiple parents listed on USPTO and those parent applications also exist in the system but with different family IDS, the system will create Error-Out the queue entry and send the create the system record notification For a data download based on a child query a user may go the URL as illustrated FIG. 46, browse the "private pair key", enter a password 4600, check a checkbox 4602 to agree on terms and conditions and click on "Authenticate" button 4604. The user may click on the "Continuity Data" tab 4800 and the system may track all child cases with the number available under child continuity data (There can be multiple child numbers and we need to capture all). If a child(s) is available in the system and its family id is different from a case's family id then the system may create a PAIR notification for each such child to user who are part of a recipient role. The notification may include:

Application Number(s) <Child application number> <child family id> linked with wrong family. Correct family is <Case application number> <Case application Id>

The system may return Child Number and create entry with Jurisdiction (US/WO), Child application number and Customer Number in "Create Application" queue if the child number doesn't exists in the system.

Figure 50:
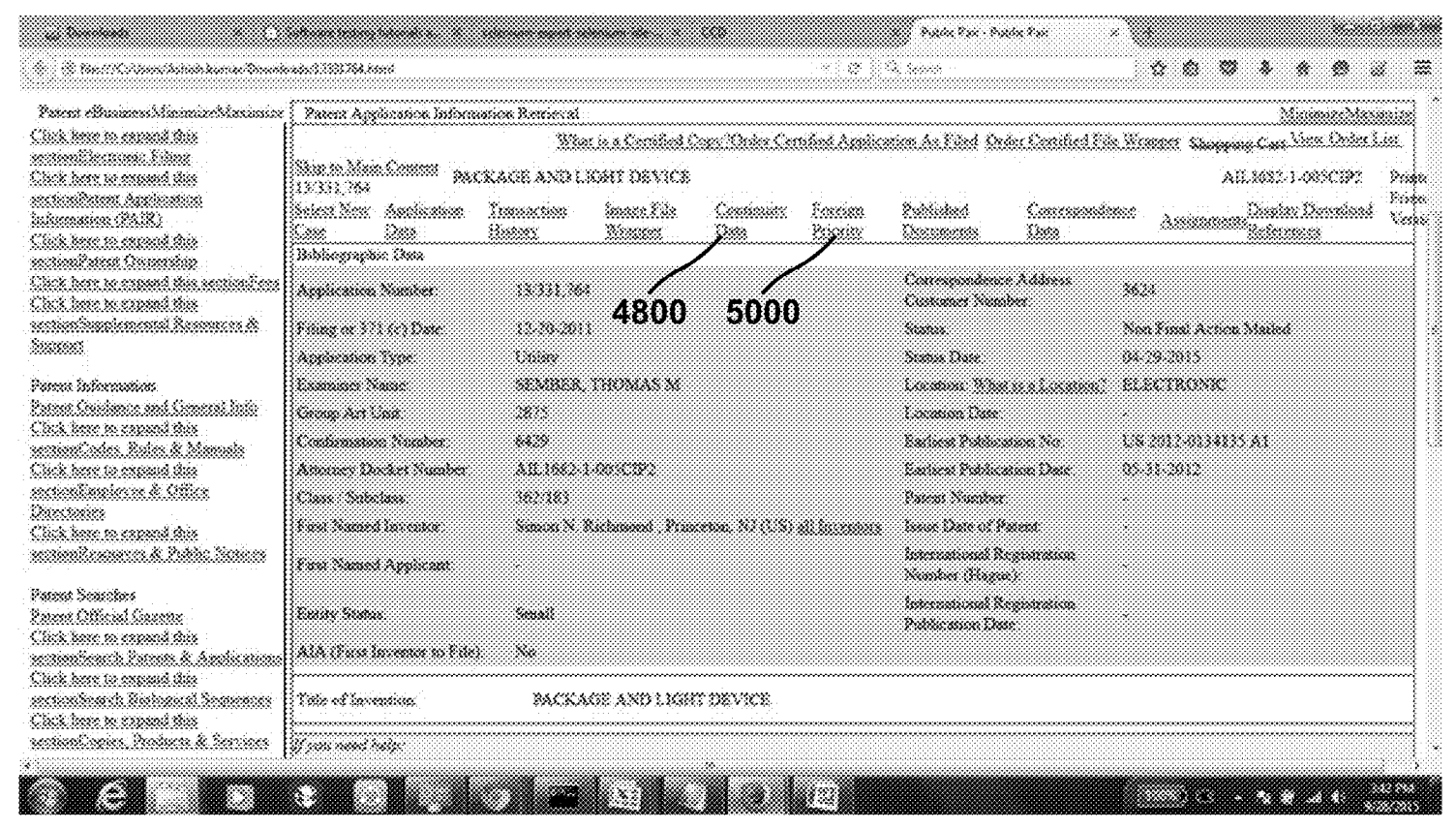
Figure 51:
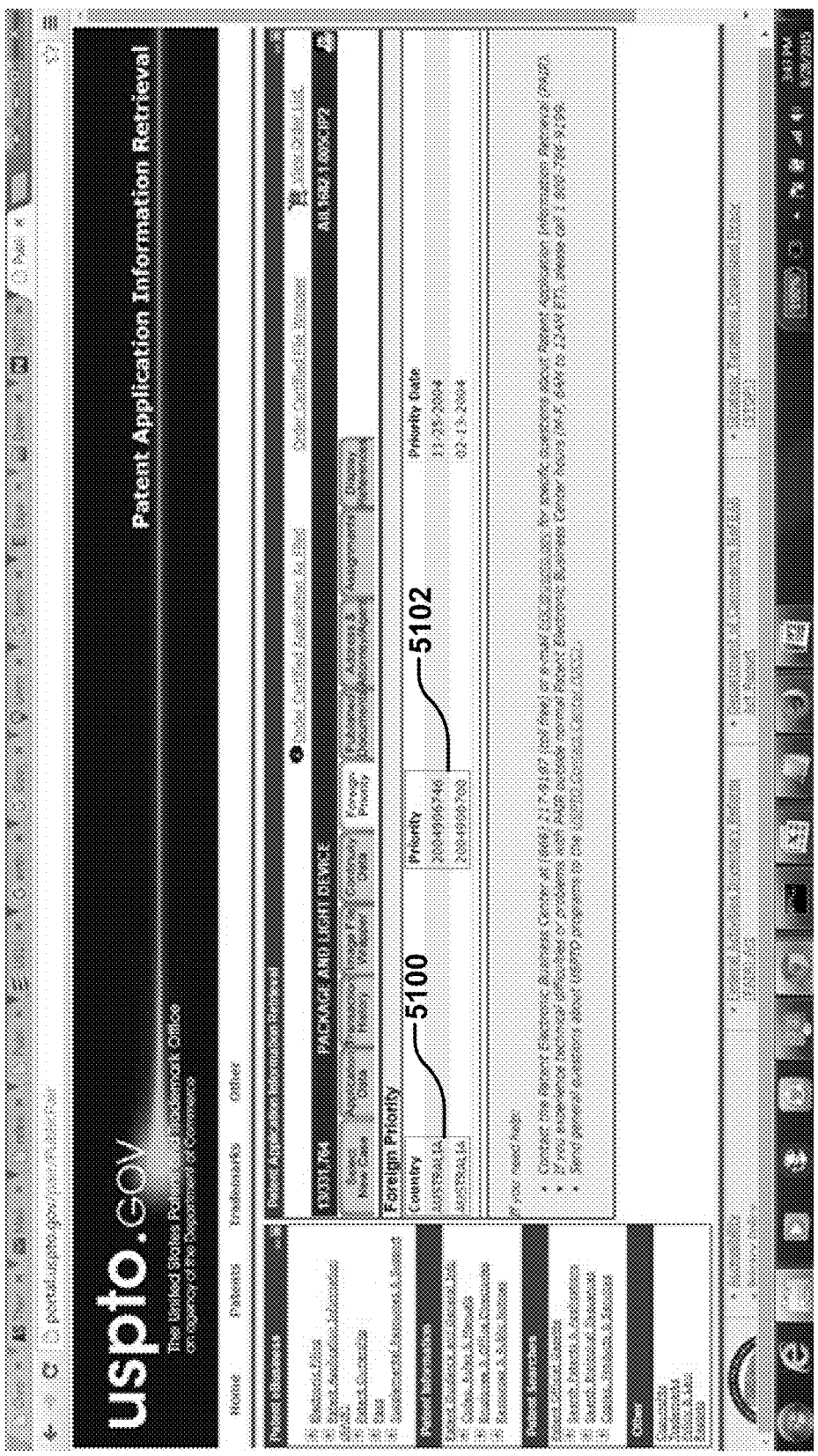
FIG. 51 is a schematic diagram of an example data flow according to aspects of the present disclosure.

For a data download based on a foreign priority query a user who is at an case page for an application with a foreign priority tab 5000 as illustrated in FIG. 50, engage the foreign priority link. Information regarding foreign priority may be displayed as illustrated in FIG. 51, that the system may parse the country information 5100 and priority information 5102 and create notification for all priorities if the priority number doesn't exist in the system as application. The notification may be sent to a user who has access to create a record and may include:

Create manual application entry in the system with Application number (Priority Number), Jurisdiction (Priority Country), US application number, and family id of US application number.

If priority number(s) are available in the system and a family id is different from the case's family id then the system may create a PAIR notification for users part of a recipient role for each such foreign priority application including:

Application Number(s) <priority application number> <priority number's family id> linked with wrong family, Correct family is <Case application number> <Case application Id>

The system may execute several rules for handling exceptions. For example if the system determines an input parameter is not acceptable the system may prompt the user to enter the application number again in in "Find Parent", "Find Child" and "Find Foreign Priority" queue. After several failed attempts the system may remove record from queue and a PAIR notification may be sent to the user interface 400. In that case the pending record in staging table, will get the status "Crawler Error" and new record will directly be created in base table through UI. The system may generate a notification to a user who has access to create the Record including:

Create manual application entry in the system (Along with Jurisdiction, Application Number, customer Number and Link of correspondence as system is not able to found in US PTO private PAIR along with Jurisdiction and application number entry and mark error within the record in the system staging table.

As expected Output data from the crawler service may include a Family id of any of the parent available in the system. An application record will be on hold in a staging table until the family id is not available. If no parent found then family field will be filled with system generated new family id and child application type will be—US first filing. The parameters for running the Service may include country code (US/WO), and Application/PCT numbers (As mentioned in input search parameters).

The systems and methods of the present disclosure may be configured to update prosecution status of generated IDS forms based on the incoming correspondences. For example, an event such as an office action being received or a response to an office action is filed may be tracked. When an uncited reference exist in the reference record, one or more triggers may be implemented to indicate an urgent IDS. In certain aspects, the following triggers may be implemented:

1. Trigger 1
a. At least one Uncited reference; &
b. Prosecution Status=Issue notification received or Issue Fee paid or Notice of Allowance Received or RCE filed or Advisory OA received or Final OA received or Ex-parte Quayle OA received
2. Trigger 2
a. New OA response filed @ USPTO; &
b. at least one Uncited reference (where reference source date<OA response filing date)

The following responses to office actions may be tracked:
1. Amendment/Req. Reconsideration-After Non-Final Reject
2. Amendment after Notice of Allowance (Rule 312)
3. Response After Final Action
4. Preliminary Amendment
5. Response after Ex Parte Quayle Action
6. Amendment Submitted/Entered with Filing of CPA/RCE
7. Response to Election/Restriction Filed
8. Applicant summary of interview with examiner
9. Request for Continued Examination (RCE)
10. Applicant Arguments/Remarks Made in an Amendment
3. Trigger 3
a. First OA action has been received or an RCE has been filed; &
b. aging of uncited references is greater than or equal to 30 days from:
   i. date of foreign document upload in the system in case of references extracted from foreign correspondences (assuming that a paralegal would upload the document within 2-3 days of receiving the same from Foreign agent)

ii. mailing date in case of references extracted from co-pending US applications (i.e. US applications within the same family)
4. Trigger 4
a. First OA has been received or an RCE has been filed; &
b. Aging of uncited references is greater than 75 days
5. Trigger 5
a. 75 days past application filing date; &
b. no IDS has been filed
6. Trigger 6
a. 75 days past application filing date;
b. at least one IDS has been filed; &
c. at least one uncited "cited in parent" reference As an example, at least triggers 3-6 may be configured based on a number of days.

The methods and systems can employ artificial intelligence (AI) techniques such as machine learning and iterative learning. Examples of such techniques include, but are not limited to, expert systems, case based reasoning, Bayesian networks, behavior based AT, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of managing documents associated with one or more patent applications, the method comprising:
   associating a first database record and a second database record with a patent family identifier, wherein the first database record corresponds to a first patent application and the second database record corresponds to a second patent application;
   retrieving a reference from a patent data resource using a crawler service based on one or more of the patent family identifier, the first patent application, and the second patent application;
   based on a determination that automatic text extraction is applicable to the reference, generating an optical character recognition (OCR) version of the reference, wherein generating the OCR version of the reference comprises converting the reference from a native file format to a format that facilitates automatic data extraction;
   based on a determination that the OCR version of the reference meets or exceeds a confidence level threshold, matching the OCR version of the reference to at least one of a plurality of reference templates, wherein matching the OCR version of the reference to at least one of the plurality of reference templates comprises comparing at least a portion of the extractable data in the OCR version of the reference to one or more of the plurality of reference templates to identify a match;
   extracting a select data from the OCR version of the reference based on the at least one of the plurality of reference templates identified as a match;
   validating the extracted data, wherein the validating the extracted data comprises determining that the extracted data is not already associated with one or more of the first database record and the second database record;
   populating a plurality of input fields of an information disclosure statement (IDS) form using at least the validated extracted data, wherein at least one of the plurality of input fields includes descriptive data corresponding to the reference;
   presenting an IDS generating interface to a generating user, the IDS generating interface comprising a representation of the populated IDS form and a reference flow rule option configured to allow the generating user to modify a reference flow rule associated with the patent family identifier, wherein the reference flow rule is configured to control a cross citation of the reference between database records;
   receiving a selection of the reference flow rule option via the IDS generating interface;
   presenting an IDS review interface to a reviewing user, the IDS review interface comprising a representation of a review version of the populated IDS form and a representation of the reference;
   presenting a set of selectable options to the reviewing user, wherein the set of selectable options includes an approve option and a do not file option;
   receiving, via the IDS review interface, a selection of the approve option; and
   notifying the generating user that the IDS form is ready to be filed.

2. The method of claim 1, wherein the associating a first database record and a second database record with a patent family identifier comprises a linkage type of: a parent linkage; a child linkage; or a foreign priority linkage.

3. The method of claim 1, wherein the reference flow rule option comprises the patent family identifier, a count of family members, a count of records related by subject matter, and an action.

4. The method of claim 3, wherein the action comprises a change status and a change status comment option.

5. The method of claim 1, wherein the determining that the extracted data is not already associated with one or more of the first database record and the second database record comprises:
   a. identifying a superset/subset relationship or a not equal relationship; and
   b. comparing the superset/subset relationship or the not equal relationship to a predetermined matching threshold.

6. The method of claim 1, wherein the IDS generating interface indicates the patent family identifier, jurisdiction associated with the first patent application, application number associated with the first patent application, attorney docket number associated with the first patent application, and filing date associated with the first patent application.

7. The method of claim 1, wherein the IDS generating interface comprises menu options including download, search, cited in IDS tab, uncited tab, examiner cited tab, cited in parent tab, do not file tab, and deleted tab.

8. The method of claim 1, wherein the IDS review interface indicates the patent family identifier, jurisdiction associated with the first patent application, application number associated with the first patent application, last IDS filing date; prosecution status associated with the first patent application, reference count, and an identifier associated with the generating user IDS.

9. The method of claim 1, further comprising generating a universal reference file including at least the data extracted from the OCR reference.

10. The method of claim 9, wherein the universal reference file is an XML file.

11. A method of managing documents associated with one or more patent applications, the method comprising:
   associating a first database record and a second database record with a patent family identifier, wherein the first database record corresponds to a first patent application and the second database record corresponds to a second patent application;
   retrieving a reference from a patent data resource using a crawler service based on one or more of the patent family identifier, the first patent application, and the second patent application;
   based on a determination that automatic text extraction is applicable to the reference, generating an optical character recognition (OCR) version of the reference, wherein generating the OCR version of the reference comprises converting the reference from a native file format to a format that facilitates automatic data extraction;
   based on a determination that the OCR version of the reference meets or exceeds a confidence level threshold, matching the OCR version of the reference to at least one of a plurality of reference templates, wherein matching the OCR version of the reference to at least one of the plurality of reference templates comprises comparing at least a portion of the extractable data in the OCR version of the reference to one or more of the plurality of reference templates to identify a match;
   extracting a select data from the OCR version of the reference based on the at least one of the plurality of reference templates;
   validating the extracted data, wherein the validating the extracted data comprises determining that the extracted data is not already associated with one or more of the first database record and the second database record;
   populating a plurality of input fields of an information disclosure statement (IDS) form using at least the validated extracted data, wherein at least one of the plurality of input fields includes descriptive data corresponding to the reference;
   presenting an IDS review interface to a reviewing user, the IDS review interface comprising a representation of a review version of the populated IDS form and a representation of the reference indicating a new reference; and
   presenting a set of selectable new reference options to the reviewing user, wherein the set of selectable new reference options comprise: a self-citation option; an include option; a don't include option; and a do not file option.

12. The method of claim 11, wherein the associating a first database record and a second database record with a patent family identifier comprises a linkage type of: a parent linkage; a child linkage; or a foreign priority linkage.

13. The method of claim 11, wherein the patent data resource is associated with a patent office of a jurisdiction.

14. The method of claim 11, wherein the determining that the extracted data is not already associated with one or more of the first database record and the second database record comprises:
   a. identifying a superset/subset relationship or a not equal relationship; and
   b. comparing the superset/subset relationship or the not equal relationship to a predetermined matching threshold.

15. The method of claim 11, wherein the IDS review interface indicates the patent family identifier, jurisdiction associated with the first patent application, application number associated with the first patent application, last IDS filing date; prosecution status associated with the first patent application, reference count, and an identifier associated with the generating user IDS.

16. The method of claim 11, further comprising generating a universal reference file including at least the data extracted from the OCR reference.

17. The method of claim 16, wherein the universal reference file is an XML file.

18. A method of managing documents associated with one or more patent applications, the method comprising:
   associating a first database record and a second database record with a patent family identifier, wherein the first database record corresponds to a first patent application and the second database record corresponds to a second patent application;
   retrieving a reference from a patent data resource using a crawler service based on one or more of the patent family identifier, the first patent application, and the second patent application;
   based on a determination that automatic text extraction is applicable to the reference, generating an optical character recognition (OCR) version of the reference, wherein generating the OCR version of the reference comprises converting the reference from a native file format to a format that facilitates automatic data extraction;
   based on a determination that the OCR version of the reference meets or exceeds a confidence level threshold, matching the OCR version of the reference to at least one of a plurality of reference templates, wherein matching the OCR version of the reference to at least one of the plurality of reference templates comprises comparing at least a portion of the extractable data in the OCR version of the reference to one or more of the plurality of reference templates to identify a match;
   extracting select data from the OCR version of the reference based on the at least one of the plurality of reference templates;
   validating the extracted data, wherein the validating the extracted data comprises determining that the extracted data is not already associated with one or more of the first database record and the second database record;
   populating a plurality of input fields of an information disclosure statement (IDS) form using at least the validated extracted data, wherein at least one of the plurality of input fields includes descriptive data corresponding to the reference;
   presenting an IDS generating interface to a generating user, the IDS generating interface comprising a representation of the populated IDS form and a reference flow rule option configured to allow the generating user to modify a reference flow rule associated with the patent family identifier, wherein the reference flow rule is configured to control a cross citation of the reference between database records, the reference flow rule comprising the patent family identifier, a count of family members, a count of records related by subject matter, and an action option including a change status and a change status comment option;
receiving a selection of the reference flow rule option via the IDS generating interface;
presenting an IDS review interface to a reviewing user, the IDS review interface comprising a representation of a review version of the populated IDS form and a representation of the reference;
presenting a set of selectable options to the reviewing user, wherein the set of selectable options includes an approve option and a do not file option;
receiving, via the IDS review interface, a selection of the approve option; and
notifying the generating user that the IDS form is ready to be filed.

* * * * *